US012231841B2

(12) United States Patent
Chen et al.

(10) Patent No.: US 12,231,841 B2
(45) Date of Patent: Feb. 18, 2025

(54) AUDIO DATA PROCESSING METHOD AND APPARATUS, AND SOUND BOX SYSTEM

(71) Applicant: Huawei Technologies Co., Ltd., Guangdong (CN)

(72) Inventors: Zhipeng Chen, Shenzhen (CN); Jiang Li, Shenzhen (CN); Shiqiang Peng, Shenzhen (CN); Xiangyu Zhao, Shenzhen (CN); Fan Fan, Shenzhen (CN); Haiting Li, Beijing (CN); Tizheng Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 190 days.

(21) Appl. No.: 18/173,625

(22) Filed: Feb. 23, 2023

(65) Prior Publication Data

US 2023/0199369 A1 Jun. 22, 2023

Related U.S. Application Data

(63) Continuation of application No. PCT/CN2021/103324, filed on Jun. 29, 2021.

(30) Foreign Application Priority Data

Aug. 27, 2020 (CN) ......................... 202010880205.9

(51) Int. Cl.
*H04R 1/26* (2006.01)
*H04R 1/28* (2006.01)

(52) U.S. Cl.
CPC ............. *H04R 1/26* (2013.01); *H04R 1/2834* (2013.01)

(58) Field of Classification Search
None
See application file for complete search history.

(56) References Cited

U.S. PATENT DOCUMENTS 9,762,999 B1 9/2017 Johnson et al.
D851,058 S 6/2019 Pupecki et al.
(Continued)

FOREIGN PATENT DOCUMENTS

CN 202395971 U 8/2012
CN 107197402 A 9/2017
(Continued)

*Primary Examiner* — Kenny H Truong
(74) *Attorney, Agent, or Firm* — WOMBLE BOND DICKINSON (US) LLP

(57) ABSTRACT

Embodiments of this application provide an audio data processing method and apparatus, and a sound box system, which are related to the field of audio technologies, and improve sound quality of an audio playing device. The sound box system includes a full-frequency sound box and a low-frequency sound box. The full-frequency sound box is physically connected to the low-frequency sound box by using a first fastening part of the full-frequency sound box and a second fastening part of the low-frequency sound box. Furthermore, the full-frequency sound box communicates with the low-frequency sound box by using a first communication part of the first fastening part and a second communication part of the second fastening part, where the first fastening part and the second fastening part are a group of paired connection parts, and the first communication part and the second communication part are a group of paired communication parts.

7 Claims, 28 Drawing Sheets

(56) References Cited

U.S. PATENT DOCUMENTS

| | | | | |
|---|---|---|---|---|
| 10,327,051 | B2 | 6/2019 | Kutil et al. | |
| D853,354 | S | 7/2019 | Demin | |
| D853,990 | S | 7/2019 | Eriksen | |
| D854,515 | S | 7/2019 | Fischer et al. | |
| 10,535,966 | B2 | 1/2020 | Tak et al. | |
| 2003/0219137 | A1 * | 11/2003 | Fincham .................. | H04R 5/02 381/86 |
| 2012/0099733 | A1 | 4/2012 | Wang et al. | |
| 2013/0259283 | A1 | 10/2013 | Gengler et al. | |
| 2015/0104037 | A1 | 4/2015 | Lee et al. | |
| 2016/0286313 | A1 | 9/2016 | Kofman et al. | |
| 2017/0105069 | A1 | 4/2017 | Mezzomo et al. | |
| 2017/0117865 | A1 | 4/2017 | Shimada et al. | |
| 2018/0352325 | A1 | 12/2018 | Family et al. | |
| 2019/0014401 | A1 | 1/2019 | Fustino et al. | |
| 2019/0230457 | A1 | 7/2019 | Warden et al. | |

FOREIGN PATENT DOCUMENTS

| | | | |
|---|---|---|---|
| CN | 107873135 | A | 4/2018 |
| CN | 208316973 | U | 1/2019 |
| CN | 208971816 | U | 6/2019 |
| CN | 110060675 | A | 7/2019 |
| CN | 209151329 | U | 7/2019 |
| CN | 110798760 | A | 2/2020 |
| CN | 210725224 | U | 6/2020 |
| CN | 211019216 | U | 7/2020 |
| CN | 114125650 | A | 3/2022 |
| GB | 2561341 | B | 4/2019 |
| JP | S5138353 | Y1 | 9/1976 |
| JP | 2000333297 | A | 11/2000 |
| JP | 2010021705 | A | 1/2010 |
| JP | 4819963 | B1 | 11/2011 |
| KR | 20130055649 | A | 5/2013 |
| KR | 20180003264 | A | 1/2018 |
| WO | 2020011372 | A1 | 1/2020 |
| WO | 2020253844 | A1 | 12/2020 |

* cited by examiner (a)

(b)

(c)

(d)

AUDIO DATA PROCESSING METHOD AND APPARATUS, AND SOUND BOX SYSTEM

CROSS-REFERENCE TO RELATED APPLICATIONS

This application is a continuation of International Application No. PCT/CN2021/103324, filed on Jun. 29, 2021, which claims priority to Chinese Patent Application No. 202010880205.9, filed on Aug. 27, 2020. The disclosures of the aforementioned applications are hereby incorporated by reference in their entireties.

TECHNICAL FIELD

Embodiments of this application relate to the field of audio technologies, and in particular, to an audio data processing method and apparatus, and a sound box system.

BACKGROUND

With the development of audio software and hardware technologies, audio playing devices (for example, full-frequency sound boxes) are increasing rapidly. An important performance index of an audio playing device is sound quality of the audio playing device.

For various existing full-frequency sound box products, currently it is hard to reach a good tradeoff between portability of a full-frequency sound box and sound quality of the full-frequency sound box. For example, for a full-frequency sound box with a small size, a small weight, and high portability, bass quality is affected because a sound cavity of the full-frequency sound box is small-sized. As a result, sound quality is poor. For another example, for a full-frequency sound box with high sound quality, because many audio units are integrated into the full-frequency sound box (including a medium- and high-frequency speaker/full-frequency speaker, and a low-frequency speaker), the full-frequency sound box has a large size, a large weight, and high power consumption, and is poor in portability.

Based on this, the research and development of portable full-frequency sound box products with superior sound quality is a difficult problem to overcome.

SUMMARY

Embodiments of this application provide an audio data processing method and apparatus, and a sound box system, to improve sound quality of an audio playing device.

To achieve the foregoing objectives, the following technical solutions are used in embodiments of this application.

According to a first aspect, an embodiment of this application provides a full-frequency sound box, including a full-frequency sound box body and a first fastening part. The full-frequency sound box body includes M speakers, the M speakers are planarly distributed in the full-frequency sound box body, and the M speakers constitute K pairs of acoustic dipoles, where M is a positive integer greater than 2, and K is a positive integer greater than or equal to 2. The first fastening part is disposed in a preset fastening region of the full-frequency sound box body, the first fastening part is configured to physically connect to or detach from a low-frequency sound box, the first fastening part includes a first communication part, the first communication part is configured to enable the full-frequency sound box to communicate with the low-frequency sound box, and the first communication part supports multi-channel audio data transmission.

Low-frequency playing effect of the low-frequency sound box is superior to low-frequency playing effect of the full-frequency sound box.

According to the full-frequency sound box provided in this embodiment of this application, because the M speakers included in the full-frequency sound box constitute a plurality of pairs of acoustic dipoles, playing, by using the full-frequency sound box, the audio data obtained through sound field extension processing (that is, target audio data) can achieve good sound field extension effect, and improve sound quality. Further, after the first fastening part of the full-frequency sound box is connected to the low-frequency sound box, the full-frequency sound box and the low-frequency sound box are used in a combined manner to play the audio data. This can significantly improve playing effect of the audio data. In addition, a user may flexibly choose to play the audio data by using the full-frequency sound box, or to play the audio data by using the full-frequency sound box and the low-frequency sound box. This can satisfy different requirements of the user.

In a possible embodiment, an arrangement direction of the K pairs of acoustic dipoles constituted by the M speakers includes at least two of the following directions: horizontal, vertical, or oblique upward.

To be specific, the K pairs of acoustic dipoles include at least two of the following types of acoustic dipoles: an acoustic dipole in the horizontal direction, an acoustic dipole in the vertical direction, or an acoustic dipole in the oblique upward direction. The horizontal direction is a direction parallel to a vertical projection of the full-frequency sound box body, and the vertical direction is a direction perpendicular to the vertical projection of the full-frequency sound box body. The oblique upward direction may include a plurality of different preset directions, and included angles between the different preset directions and the horizontal direction are different. The preset directions herein may be understood as directions pointing to the sky at different angles (sky directions for short).

In a possible embodiment, each pair of acoustic dipoles corresponds to one pair of speakers, and at least two pairs of acoustic dipoles in the K pairs of acoustic dipoles satisfy the following condition: $d_i \neq d_y$, where $d_i$ is a distance between two speakers constituting an $i^{th}$ pair of acoustic dipoles, $d_j$ is a distance between two speaker constituting a $j^{th}$ pair of acoustic dipoles, each of i and j is one of 1, 2, . . . , K, i≠j, and K is a positive integer greater than or equal to 2. The two speakers constituting the $i^{th}$ pair of acoustic dipoles are configured to play a first frequency band of the target audio data, and the two speaker pairs constituting the $j^{th}$ pair of acoustic dipoles are configured to play a second frequency band of the target audio data. The first frequency band and the second frequency band are different frequency bands.

In a possible embodiment, if $d_i > d_j$, a center frequency of audio data that can be played by the two speakers constituting the $i^{th}$ pair of acoustic dipoles is less than a center frequency of audio data that can be played by the two speakers constituting the $j^{th}$ pair of acoustic dipoles.

In this embodiment of this application, a frequency band of audio data played by a speaker pair constituting a pair of acoustic dipoles is related to a distance between two speakers included in the speaker pair. Specifically, center frequencies of audio data played by two speakers constituting a pair of acoustic dipoles decrease as a distance between the speakers increases. A speaker pair with a small distance has good playing effect on high-band audio data.

Speaker layout of the full-frequency sound box is adjusted, so that spacings between two speakers in speaker pairs constituting a plurality of pairs of acoustic dipoles are the same or different. Audio data of different frequency bands is played by using speaker pairs with different spacings, so that sound field effects of different frequency bands can be created.

In a possible embodiment, one speaker may be shared by one or more pairs of acoustic dipoles.

In a possible embodiment, a passive film is disposed on at least one of the M speakers, and the passive film is configured to extend a low-frequency response of the speaker. Each of the at least one speaker corresponds to one passive film, and the passive film is attached to the back of a cavity of the speaker. The passive film is disposed on the back of the cavity of the speaker, and the passive film and a cavity in a box body constitute an air spring whose resonance frequency is lower than a resonance frequency of the speaker. The speaker pushes the air spring to resonate at the resonance frequency. This can extend a low-frequency response of the speaker (for example, increase a range, energy, and an amplitude of the low-frequency response), and can improve bass quality of the full-frequency sound box. Alternatively, each of the at least one speaker corresponds to two passive films, and the two passive films are respectively located on sides of a cavity of the speaker. The passive films are disposed on the sides of the cavity of the speaker, to further increase effective resonance areas of the passive films, and improve bass quality of the full-frequency sound box more significantly.

In a possible embodiment, the full-frequency sound box provided in this embodiment of this application further includes N speakers, where N is a positive integer, and N is less than or equal to M. The N speakers are respectively disposed back-to-back with N speakers in the M speakers to constitute N back-to-back speaker pairs. The M speakers face a first plane, the N speakers face a second plane, the first plane and the second plane are two planes perpendicular to a vertical projection of the full-frequency sound box, and the first plane is parallel to the second plane. Alternatively, the N speakers are respectively disposed face-to-face with N speakers in the M speakers to constitute N face-to-face speaker pairs. Cavities of the M speakers face a first plane, cavities of the N speakers face a second plane, the first plane and the second plane are two planes perpendicular to a vertical projection of the full-frequency sound box, and the first plane is parallel to the second plane.

In a possible embodiment, two speakers in each of the N back-to-back speaker pairs share one cavity. A passive film is disposed on a cavity of at least one of the N back-to-back speaker pairs. One of the at least one speaker pair corresponds to two passive films. The two passive films are back-to-back, and are respectively attached to two sides that are adjacent to the speaker pair and that are in a cavity.

In a possible embodiment, a shape of the full-frequency sound box body is one of the following: a ring, a circle, a tree, or an W shape.

In a possible embodiment, the first fastening part is further configured to support the full-frequency sound box body.

For example, when the full-frequency sound box body is ring-shaped, the first fastening part may be used as a base to support the ring-shaped sound box body, so that the ring-shaped sound box body is securely placed on a tabletop.

In a possible embodiment, the first fastening part is a first sheet-like part connected to the full-frequency sound box body, and the first sheet-like part is configured to physically connect to or detach from a second sheet-like part of a low-frequency sound box body.

In a possible embodiment, the first fastening part is a concave part disposed in a preset fastening region of the full-frequency sound box body, and the concave part is configured to physically connect to or detach from a convex part of a low-frequency sound box body.

In a possible embodiment, the full-frequency sound box provided in this embodiment of this application includes a processor and a transceiver connected to the processor. The processor is configured to: perform multi-band filtering on to-be-played audio data, and perform sound field extension processing on filtered to-be-played audio data to obtain target audio data, where a medium-frequency component and/or a high-frequency component of the target audio data are or is played by the full-frequency sound box. The transceiver is configured to send a low-frequency component of the target audio data to the low-frequency sound box by using the first communication part, where the low-frequency component of the target audio data is played by the low-frequency sound box.

It should be noted that, in this embodiment of this application, the target audio data is audio data obtained through sound field extension processing. For ease of description, audio data that has not undergone sound field extension processing is referred to as raw audio data, and the audio data obtained through sound field extension processing is referred to as target audio data, that is, the target audio data is obtained by performing sound field extension processing is performed on the raw audio data. It should be understood that both the raw audio data and the target audio data are to-be-played audio data.

In this embodiment of this application, the transceiver of the full-frequency sound box is further configured to receive the to-be-played audio data. The to-be-played audio data may be the raw audio data or a component of a different frequency band of the raw audio data (for example, a medium-frequency component or a high-frequency component of the raw audio data). The to-be-played audio data may alternatively be the target audio data or a component of a different frequency band of the target audio data (for example, a medium-frequency component or a high-frequency component of the target audio data).

According to a second aspect, an embodiment of this application provides a low-frequency sound box, including a low-frequency sound box body and a second fastening part. The low-frequency sound box body includes one or more low-frequency speakers, and the second fastening part is disposed in a preset fastening region of the low-frequency sound box body. The second fastening part is configured to physically connect to or detach from a full-frequency sound box; and the second fastening part includes a second communication part, the second communication part is configured to enable the low-frequency sound box to communicate with the full-frequency sound box, and the second communication part supports multi-channel audio data transmission. Low-frequency playing effect of the low-frequency sound box is superior to low-frequency playing effect of the full-frequency sound box, and a frequency band range of the full-frequency sound box is greater than a frequency band range of the low-frequency sound box.

According to the low-frequency sound box provided in this embodiment of this application, one or more speakers of the low-frequency sound box play a low-frequency component of audio data. This can improve bass quality of the audio data. Further, the low-frequency sound box may be connected to the full-frequency sound box by using the second communication part, and is used with the full-frequency sound box in a combined manner. The low-frequency sound box sends a medium-frequency component and/or a high-frequency component of audio data obtained through sound field extension processing to the full-frequency sound box, and the full-frequency sound box plays the audio data. The full-frequency sound box and the low-frequency sound box are used cooperatively. This can improve audio data playing effect. In addition, a user may choose to play the audio data by using the full-frequency sound box, or to play the audio data by using the full-frequency sound box and the low-frequency sound box. This can satisfy different requirements of the user.

In a possible embodiment, a shape of the low-frequency sound box body may be a flat cylinder, a long cylinder, a cube, a cuboid, or another shape. This is not limited in this embodiment of this application.

In a possible embodiment, the second fastening part is a second sheet-like part connected to the low-frequency sound box body, and the second sheet-like part is configured to physically connect to or detach from a first sheet-like part of the full-frequency sound box body.

In a possible embodiment, the second fastening part is a convex part disposed in a preset fastening region of the low-frequency sound box body, and the concave part is configured to physically connect to or detach from a convex part of the full-frequency sound box body.

In a possible embodiment, the low-frequency sound box further includes a charging port. The charging port is configured to: connect to an external power supply to supply power to the low-frequency sound box, or charge the full-frequency sound box by using the low-frequency sound box when the low-frequency sound box is connected to the full-frequency sound box.

In a possible embodiment, the low-frequency sound box further includes a camera or a microphone. The camera is configured to capture an image of a user (a listener), to determine a location of the user based on the image of the user. Similarly, the microphone is configured to capture a sound signal of a user, to determine a location of the user based on the sound signal of the user.

In a possible embodiment, the low-frequency sound box provided in this embodiment of this application includes a processor and a transceiver connected to the processor. The processor is configured to: perform multi-band filtering on to-be-played audio data, and perform sound field extension processing on filtered to-be-played audio data to obtain target audio data, where a medium-frequency component and/or a high-frequency component of the target audio data are or is played by the full-frequency sound box. The transceiver is configured to send the medium-frequency component and/or the high-frequency component of the target audio data to the full-frequency sound box by using the second communication part, where a low-frequency component of the target audio data is played by the low-frequency sound box.

In this embodiment of this application, the transceiver of the low-frequency sound box is further configured to receive to-be-played audio data. The to-be-played audio data may be raw audio data or a low-frequency component of raw audio data; or the to-be-played audio data may be the low-frequency component of the target audio data.

According to a third aspect, an embodiment of this application provides a sound box system, including the full-frequency sound box according to any one of the first aspect and the possible embodiments of the first aspect and the low-frequency sound box according to any one of the second aspect and the possible embodiments of the second aspect. The full-frequency sound box is physically connected to the low-frequency sound box by using the first fastening part and the second fastening part, and the full-frequency sound box communicates with the low-frequency sound box by using the first communication part and the second communication part. The first fastening part and the second fastening part are a group of paired connection parts, and the first communication part and the second communication part are a group of paired communication parts.

According to the sound box system provided in this embodiment of this application, the full-frequency sound box in the sound box system may operate independently, or the full-frequency sound box and the low-frequency sound box operate cooperatively. Therefore, a user may flexibly choose to play audio data by using the full-frequency sound box, or to play audio data by using the full-frequency sound box and the low-frequency sound box. This can satisfy different requirements of the user.

In a possible embodiment, the full-frequency sound box is configured to play target audio data, or play a high-frequency component and/or a medium-frequency component of target audio data. The low-frequency sound box is configured to play a low-frequency component of the target audio data.

When the full-frequency sound box operates independently, playing the medium-frequency component and/or the high-frequency component of the target audio data by using the full-frequency sound box can improve sound quality because the full-frequency sound box has good playing effects on a medium frequency component and a high frequency component. When the full-frequency sound box and the low-frequency sound box operate cooperatively, playing the low-frequency component of the target audio data by using the low-frequency sound box can improve bass quality of the audio data because low-frequency playing effect of the low-frequency sound box is superior to low-frequency playing effect of the full-frequency sound box. In addition, playing the medium-frequency component and/or the high-frequency component of the target audio data by using the full-frequency sound box can improve playing effects of the medium-frequency component and/or the high-frequency component of the target audio data because the full-frequency sound box has good playing effects on the medium frequency and the high frequency. In this way, playing effect of the audio data can be improved in a full frequency band of the audio data.

In a possible embodiment, the full-frequency sound box is connected to the low-frequency sound box in a stacked or mounting mode by using the first fastening part and the second fastening part.

In a possible embodiment, when the first fastening part is a first sheet-like part, the second fastening part is a second sheet-like part, and the first sheet-like part is in contact with and coupled to the second sheet-like part, the full-frequency sound box is connected to the low-frequency sound box in a stacked mode. The first sheet-like part includes a first communication part, and the first communication part is located within a vertical projection of the full-frequency sound box body. The second sheet-like part is located on the low-frequency sound box body, and the second sheet-like part includes a second communication part. The second communication part is disposed on the second sheet-like part.

In a possible embodiment, when the first fastening part is a first sheet-like part that extends outward along one side of the full-frequency sound box body, the second fastening part is a second sheet-like part that extends outward along one side of the low-frequency sound box body, and the first sheet-like part is in contact with and coupled to the second sheet-like part, the full-frequency sound box is connected to the low-frequency sound box in a mounting mode. The first sheet-like part includes a first communication part, the first communication part is located outside the vertical projection of the full-frequency sound box body, the second sheet-like part includes a second communication part, and the second communication part is located outside the vertical projection of the low-frequency sound box body.

In a possible embodiment, the first fastening part is connected to the second fastening part in a buckle coupling or magnetic coupling mode.

In a possible embodiment, when the first fastening part is a concave part disposed in a preset fastening region of the full-frequency sound box body, the second fastening part is a convex part disposed in a preset fastening region of the low-frequency sound box body, and the concave part is in contact with and coupled to the convex part, the full-frequency sound box is connected to the low-frequency sound box in a stacked mode.

In a possible embodiment, the first fastening part is connected to the second fastening part in a buckle coupling or threaded coupling mode.

In conclusion, the first communication part is a magnetic suction female connector of a magnetic suction interface, and the second communication part is a magnetic suction male connector of a magnetic suction interface. Alternatively, the first communication part is a plug of a USB interface, and the second communication part is a socket of the USB interface. Alternatively, the first communication part and the second communication part may be other communication parts that have a matching relationship and have a detachable feature. This is not limited in this embodiment of this application.

In this embodiment of this application, the full-frequency sound box is small-sized and light-weighted, and is easy to carry. Compared with the full-frequency sound box, the low-frequency sound box has a slightly larger size and a larger weight, but has stronger data processing capability.

In a possible embodiment, the sound box system further includes at least one full-frequency sound box, and at least two full-frequency sound boxes included in the sound box system can operate cooperatively.

In a possible embodiment, the sound box system further includes at least one full-frequency sound box and at least one low-frequency sound box. In the sound box system, one full-frequency sound box corresponds to one low-frequency sound box to constitute one full-frequency sound box subsystem. In this case, at least two subsystems in the sound box system may operate cooperatively.

For descriptions of related content and technical effects of the full-frequency sound box and the low-frequency sound box in the sound box system in the third aspect, refer to related description in the first aspect. Details are not described herein again.

According to a fourth aspect, an embodiment of this application provides an audio data processing method. The method includes: A terminal detects whether the first communication part of the full-frequency sound box according to any one of the first aspect and the possible embodiments of the first aspect is connected to the second communication part of the low-frequency sound box according to any one of the second aspect and the possible embodiments of the second aspect. The terminal sends to-be-played audio data to the full-frequency sound box when the terminal finds, through detection, that the first communication part is not connected to the second communication part; when the terminal finds, through detection, that the first communication part is connected to the second communication part, the terminal sends first audio data to the full-frequency sound box, and sends second audio data to the low-frequency sound box, where the first audio data is a medium-frequency component and/or a high-frequency component of to-be-played audio data, and the second audio data is a low-frequency component of the to-be-played audio data; the terminal sends to-be-played audio data to the full-frequency sound box; or the terminal sends to-be-played audio data to the low-frequency sound box.

According to the audio data processing method provided in this embodiment of this application, the terminal determines, by detecting whether the first communication part of the full-frequency sound box of the terminal is connected to the second communication part of the low-frequency sound box, to send the audio data to the full-frequency sound box and/or the low-frequency sound box, so that the full-frequency sound box processes the audio data and/or the low-frequency sound box processes the audio data. This achieves good sound field extension effect and improves sound quality.

In a possible embodiment, the terminal may detect, through interaction with the full-frequency sound box, whether the first communication part is connected to the second communication part. For example, the terminal obtains, from the full-frequency sound box, status information of a first port that corresponds to the first communication part and that is of the full-frequency sound box; and determines, based on the status information of the first port, whether the first communication part is connected to the second communication part. The status information of the first port is “0” when the first communication part is not connected to the second communication part. In this case, after obtaining the status “0”, the terminal determines that the first communication part is not connected to the second communication part. When the first communication part is connected to the second communication part, the status information of the first port is “1”. In this case, after obtaining the status “1”, the terminal determines that the first communication part is connected to the second communication part.

The terminal may alternatively detect, by using another implementable method, whether the first communication part is connected to the second communication part. This is not limited in this embodiment of this application.

In a possible embodiment, that the terminal sends to-be-played audio data to the full-frequency sound box specifically includes: The terminal sends raw audio data to the full-frequency sound box. It should be understood that when the terminal sends the raw audio data to the full-frequency sound box, the full-frequency sound box performs frequency division on the original data, and performs sound field extension processing on components of different frequency bands, to obtain target audio data and play the target audio data.

In a possible embodiment, that the terminal sends to-be-played audio data to the full-frequency sound box specifically includes: The terminal sends target audio data to the full-frequency sound box. It should be understood that when the terminal sends the target audio data to the full-frequency sound box, the target audio data may be obtained by another device by performing frequency division and sound field extension processing on the raw audio data, and is sent to the full-frequency sound box. Then, the full-frequency sound box plays the target audio data. The another device may be the terminal, the low-frequency sound box, or a device other than the two devices. This is not limited in this embodiment of this application.

In a possible embodiment, that the terminal sends first audio data to the full-frequency sound box, and sends second audio data to the low-frequency sound box specifically includes: The terminal sends a medium-frequency component and/or a high-frequency component of the raw audio data to the full-frequency sound box, and sends a low-frequency component of the raw audio data to the low-frequency sound box. Specifically, the terminal may perform frequency division on the raw audio data to obtain the medium-frequency component and/or the high-frequency component, and the low-frequency component of the raw audio data, then the terminal sends the medium-frequency component and/or the high-frequency component of the raw audio data to the full-frequency sound box, and the full-frequency sound box performs sound field extension processing on the medium-frequency component and/or the high-frequency component of the original data to obtain a medium-frequency component and/or a high-frequency component of the target audio data. In addition, the terminal sends the low-frequency component of the raw audio data to the low-frequency sound box, the low-frequency sound box performs sound field extension processing on the low-frequency component of the raw audio data to obtain a low-frequency component of the target audio data, and the low-frequency sound box plays the low-frequency component of the target audio data.

In a possible embodiment, that the terminal sends first audio data to the full-frequency sound box, and sends second audio data to the low-frequency sound box specifically includes: The terminal sends a medium-frequency component and/or a high-frequency component of the target audio data to the full-frequency sound box, and sends a low-frequency component of the target audio data to the low-frequency sound box. Specifically, the terminal or another device may perform frequency division on the raw audio data, separately perform sound field extension processing on a medium-frequency component and/or a high-frequency component, and a low-frequency component that are obtained through frequency division, send the medium-frequency component and/or the high-frequency component of the target audio data to the full-frequency sound box, and send the low-frequency component of the target audio data to the low-frequency sound box. Then the full-frequency sound box plays the medium-frequency component and/or the high-frequency component of the target audio data, and the low-frequency sound box plays the low-frequency component of the target audio data.

In a possible embodiment, that the terminal sends to-be-played audio data to the low-frequency sound box specifically includes: The terminal sends raw audio data to the low-frequency sound box. It should be understood that when the terminal sends the raw audio data to the low-frequency sound box, the low-frequency sound box performs frequency division on the original data, and performs sound field extension processing on components of different frequency bands, to obtain the target audio data. Then the low-frequency sound box plays the low-frequency component of the target audio data, and sends the medium-frequency component and/or the high-frequency component of the target audio data to the full-frequency sound box, and the full-frequency sound box plays the medium-frequency component and/or the high-frequency component.

In a possible embodiment, that the terminal sends to-be-played audio data to the low-frequency sound box specifically includes: The terminal sends the target audio data to the low-frequency sound box. It should be understood that when the terminal sends the target audio data to the low-frequency sound box, the target audio data may be obtained by another device by performing frequency division and sound field extension processing on the raw audio data, and is sent to the low-frequency sound box. Then, the low-frequency sound box plays the low-frequency component of the target audio data, the low-frequency sound box sends the medium-frequency component and/or the high-frequency component of the target audio data to the full-frequency sound box, and the full-frequency sound box plays the medium-frequency component and/or the high-frequency component, and sends the medium-frequency component and/or the high-frequency component to the full-frequency sound box.

According to a fifth aspect, an embodiment of this application provides an audio data processing method. The method is applied to the full-frequency sound box according to any one of the first aspect and the possible embodiments of the first aspect, and includes: obtaining to-be-played audio data; performing multi-band filtering on the to-be-played audio data to obtain a medium-frequency component and/or a high-frequency component, and a low-frequency component of the to-be-played audio data; performing sound field extension processing on the medium-frequency component and/or the high-frequency component, and the low-frequency component of the to-be-played audio data, to obtain target audio data; and sending the low-frequency component of the target audio data to the low-frequency sound box, where the medium-frequency component and/or the high-frequency component of the target audio data are or is played by the full-frequency sound box, and the low-frequency component of the target audio data is played by the low-frequency sound box.

According to the audio data processing method provided in this embodiment of this application, after the full-frequency sound box completes sound field extension processing on audio data, in one aspect, the full-frequency sound box plays a high-frequency component and/or a medium-frequency component of audio data obtained through sound field extension processing. Sound quality of the medium-frequency component and/or the high-frequency component can be improved because the full-frequency sound box has good playing effects on a medium frequency and a high frequency. In another aspect, the full-frequency sound box sends a low-frequency component of the audio data obtained through sound field extension processing to the low-frequency sound box, and the low-frequency sound box plays the low-frequency component. Bass quality of the audio data can be improved because low-frequency playing effect of the low-frequency sound box is superior to low-frequency playing effect of the full-frequency sound box.

In a possible embodiment, the multi-band filtering may include high-frequency filtering, band-pass filtering, and low-frequency filtering, and/or the multi-band filtering includes high-frequency filtering and low-frequency filtering. It should be understood that high-frequency filtering is performed on audio data to obtain a high-frequency component of the audio data, band-pass filtering is performed on the audio data to obtain a medium-frequency component of the audio data, and low-frequency filtering is performed on the audio data to obtain a low-frequency component of the audio data.

When multi-band filtering is performed on the audio data, settings of a filtering frequency band are related to a distance between two speakers that are in a speaker pair constituting a dipole and that are in the full-frequency sound box. The filtering frequency band determines frequency bands corresponding to a filtered high-frequency component, medium-frequency component, and low-frequency component.

In a possible embodiment, sound field extension processing includes: The full-frequency sound box performs high-band dipole processing on a high-frequency component of filtered audio data, and/or performs medium-band dipole processing on a medium-frequency component of the filtered audio data.

It may be understood that a sweet point region exists in a sound field of a speaker of a full-frequency sound box. The sweet point region is a region in which good sound effect can be achieved. Generally, the sweet point region is a region deviating from the center of the full-frequency sound box by a preset angle. A user (or a listener) has good listening experience when the user is located in the sweet point region. Binaural crosstalk occurs when the user is away from the sweet point region (for example, an included angle between the user and the center of the full-frequency sound box is greater than the preset angle). As a result, the user's listening experience becomes poor.

In this embodiment of this application, one pair of acoustic dipoles correspond to one pair of speakers, and signals with a same amplitude but different phases are played by using a pair of speakers. A horizontal direction is used as an example. A right channel corresponds to one acoustic dipole, and a left channel corresponds to one acoustic dipole. For example, when a right channel signal has large energy upon arrival at the left ear of the user, crosstalk occurs in the left and right ears, that is, the right channel signal interferes with the left ear. As a result, the sound field becomes narrowed. Crosstalk between the left and right ears is small when energy of the right channel signal upon arrival at the left ear of the user is small.

In this embodiment of this application, sound field extension processing is performed on the high-frequency component of the audio data according to a high-band dipole algorithm, and sound field extension processing is performed on the medium-frequency component of the audio data according to a medium-band dipole algorithm. For the right channel signal, the energy of the right channel signal upon arrival at the left ear can be decreased while it is ensured that energy of the right channel signal upon arrival at the right ear is not decreased. For a left channel signal, energy of the left channel signal upon arrival at the right ear can be decreased while it is ensured that energy of the left channel signal upon arrival at the left ear is not decreased. In this way, binaural crosstalk is canceled. In this embodiment of this application, the energy of the right channel signal upon arrival at the right ear of the user is larger if the energy of the right channel signal upon arrival at the left ear of the user is smaller. In this case, better binaural crosstalk cancellation effect is achieved. Similarly, the energy of the left channel signal upon arrival at the left ear is greater if the energy of the left channel signal upon arrival at the right ear is smaller. In this case, better binaural crosstalk cancellation effect is achieved.

In a possible embodiment, sound field extension processing includes: processing a low-frequency component of the filtered audio data according to a bass enhancement algorithm. In this way, energy of a low-frequency signal (that is, the low-frequency component) is dynamically increased without damaging a speaker (without exceeding a maximum displacement of a diaphragm), and therefore bass quality of the audio data is significantly improved. It should be understood that a parameter (e.g., a TS parameter) of a speaker is obtained in advance according to the bass enhancement algorithm, and modeling is performed based on the parameter of the speaker, to obtain a processing model.

In a possible embodiment, one frequency band corresponds to one or more pairs of acoustic dipoles. For example, a high frequency band corresponds to a plurality of pairs of acoustic dipoles. In this way, after being processed according to a high-band dipole algorithm, a high-frequency component obtained through high-frequency filtering is played by using speakers corresponding to the plurality of pairs of dipoles.

In a possible embodiment, in this embodiment of this application, the audio data is multi-channel audio data. For example, multi-channel is dual-channel, including a left channel (L) and a right channel (R). For another example, multi-channel includes a left channel (L), a left surround channel (Ls), a left rear channel (Lb), an upper left channel (Lh), a right channel (R), a right surround channel (Rs), a right rear channel (Rb), an upper right channel (Rh), a center channel (C).

According to a sixth aspect, an embodiment of this application provides an audio data processing method. The method is applied to the low-frequency sound box according to any one of the second aspect and the possible embodiments of the second aspect, and includes: obtaining to-be-played audio data; performing multi-band filtering on the to-be-played audio data to obtain a medium-frequency component and/or a high-frequency component, and a low-frequency component of the to-be-played audio data; performing sound field extension processing on the medium-frequency component and/or the high-frequency component, and the low-frequency component of the to-be-played audio data, to obtain target audio data; and sending the medium-frequency component and/or the high-frequency component of the target audio data to the full-frequency sound box, where the medium-frequency component and/or the high-frequency component of the target audio data are or is played by the full-frequency sound box, and the low-frequency component of the target audio data is played by the low-frequency sound box.

In this embodiment of this application, after the low-frequency sound box completes sound field extension processing on the audio data, in one aspect, a low-frequency component obtained through bass enhancement processing is played by using a woofer of the low-frequency sound box. Bass quality of the audio data can be improved because low-frequency playing effect of the low-frequency sound box is superior to low-frequency playing effect of the full-frequency sound box. In another aspect, the low-frequency sound box sends a high-frequency component and/or a medium-frequency component of audio data obtained through sound field extension processing to the full-frequency sound box, and then the full-frequency sound box plays the high-frequency component and/or the medium-frequency component. Sound quality of the medium-frequency component and/or the high-frequency component can be improved because the full-frequency sound box has good playing effects on a medium frequency and a high frequency.

In a possible embodiment, the audio data processing method provided in this embodiment of this application further includes: capturing image information of a listener by using a camera of the low-frequency sound box, or capturing a sound signal of a listener by using a microphone, where the image information of the listener or the sound signal of the listener is used to perform sound field extension processing on filtered to-be-played audio data. Specifically, the low-frequency sound box analyzes the image information or the sound signal of the listener, to determine location information of the listener. The location information of the user includes an included angle between the user and the central axis of the sound box system. In addition, a difference between phases for playing a signal by two speakers that constitute a pair of acoustic dipoles is adjusted based on the location information of the listener. The phase difference is a configuration parameter for high-band dipole processing and/or medium-band dipole processing.

In this embodiment of this application, to improve listening experience of the user, a configuration parameter (that is, the configuration parameter is the difference between the phases for playing the signal by the two speakers that constitute the pair of acoustic dipoles) in a high-band dipole algorithm or a medium-band dipole algorithm may be adjusted in a process of performing sound field extension on the audio data. In this way, binaural crosstalk cancellation effect is improved, so that the user achieves good listening experience at a current location. Specifically, because the phase difference is related to the current location of the user, the phase difference is adjusted by performing the foregoing operation A to operation C. In this way, sound field extension processing is performed on audio data by using an adjusted phase difference, to eliminate binaural crosstalk. In this way, sound field extension is performed at the current location of the user, and listening experience of the user is improved in real time.

According to a seventh aspect, an embodiment of this application provides an audio data processing method. The method is applied to a scenario in which a terminal establishes communication connection to the sound box system according to any one of the third aspect and the possible embodiments of the third aspect, and includes: When the terminal receives a first operation of a user, the terminal controls, in response to the first operation, a full-frequency sound box to operate independently; or when the terminal receives a second operation of the user, the terminal controls, in response to the second operation, a full-frequency sound box and a low-frequency sound box to operate cooperatively.

According to the audio data processing method provided in this embodiment of this application, the user performs a corresponding operation on the terminal. In this case, in response to the operation of the user, the terminal controls the full-frequency sound box in the sound box system to operate independently, or controls the full-frequency sound box and the low-frequency sound box to operate cooperatively. This can improve user experience, and achieve good sound field extension effect.

When the full-frequency sound box operates independently, playing a medium-frequency component and/or a high-frequency component of target audio data by using the full-frequency sound box can improve sound quality because the full-frequency sound box has good playing effects on a medium frequency and a high frequency. When the full-frequency sound box and the low-frequency sound box operate cooperatively, playing a low-frequency component of the target audio data by using the low-frequency sound box can improve bass quality of the audio data because low-frequency playing effect of the low-frequency sound box is superior to low-frequency playing effect of the full-frequency sound box. In addition, playing the medium-frequency component and/or the high-frequency component of the target audio data by using the full-frequency sound box can improve playing effects of the medium-frequency component and/or the high-frequency component of the target audio data because the full-frequency sound box has good playing effects on the medium frequency and the high frequency. In this way, playing effect of the audio data can be improved in a full frequency band of the audio data.

In a possible embodiment, specifically, that the terminal controls, in response to the first operation, a full-frequency sound box to operate independently includes: The terminal sends a first instruction to the sound box system in response to the first operation. The first instruction is used to control the full-frequency sound box to operate independently, and that a full-frequency sound box operates independently means that the full-frequency sound box plays target audio data.

In a possible embodiment, that the terminal sends a first instruction to the sound box system specifically includes: The terminal sends the first instruction to the low-frequency sound box.

Specifically, when the full-frequency sound box in the sound box system is connected to the low-frequency sound box (a first fastening part is connected to a second fastening part, and a first communication part is connected to a second communication part), the low-frequency sound box controls and manages the entire sound box system, that is, that the terminal sends a first instruction to the sound box system means sending the first instruction to the low-frequency sound box in the sound box system.

In a possible embodiment, specifically, that the terminal controls, in response to the second operation, a full-frequency sound box and a low-frequency sound box to operate cooperatively includes: The terminal sends a second instruction to the sound box system in response to the second operation. The second instruction is used to control the full-frequency sound box and the low-frequency sound box system to operate. That a full-frequency sound box and a low-frequency sound box operate cooperatively means: The full-frequency sound box plays a medium-frequency component and/or a high-frequency component of the target audio data, and the low-frequency sound box plays a low-frequency component of the target audio data.

In a possible embodiment, that the terminal sends a second instruction to the sound box system specifically includes: The terminal sends the second instruction to the low-frequency sound box.

In a possible embodiment, the first operation is a selection operation performed by the user on a first option in a first interface of the terminal, and the first option corresponds to that the full-frequency sound box operates independently. The second operation is a selection operation performed by the user on a second option in the first interface of the terminal, and the second option corresponds to that the full-frequency sound box and the low-frequency sound box operate cooperatively.

In a possible embodiment, when the full-frequency sound box operates independently, the audio data processing method provided in this embodiment of this application further includes: If the terminal determines that audio data to be played currently is deep-low-frequency audio data, the terminal displays first prompt information, where the first prompt information is used to prompt that the full-frequency sound box and the low-frequency sound box operate cooperatively.

In a possible embodiment, the audio data processing method provided in this embodiment of this application further includes: The terminal receives a third operation; and controls, in response to the third operation, a camera or a microphone of the low-frequency sound box to start.

In a possible embodiment, the sound box system includes a plurality of full-frequency sound boxes. The audio data processing method provided in this embodiment of this application further includes: The terminal determines a correspondence between a channel of the audio data and the plurality of full-frequency sound boxes based on location information of the plurality of full-frequency sound boxes, and displays information about the correspondence between the channel of the audio data and the plurality of full-frequency sound boxes.

According to an eighth aspect, an embodiment of this application provides an audio data processing method. The method is applied to a scenario in which a terminal establishes communication connection to the sound box system according to any one of the third aspect and the possible embodiments of the third aspect, and includes: The terminal determines a type of target audio data, where the type of the target audio data includes a deep-low frequency or a non-deep-low frequency; and when the type of the target audio data is the non-deep-low frequency, the terminal controls a full-frequency sound box to operate independently; or when the type of the target audio data is the deep-low frequency, the terminal controls a full-frequency sound box and a low-frequency sound box to operate cooperatively.

According to the audio data processing method provided in this embodiment of this application, the terminal controls, based on the type of the target audio data, the full-frequency sound box in the sound box system to operate independently, or controls the full-frequency sound box and the low-frequency sound box to operate cooperatively. This can achieve good sound field extension effect.

When the full-frequency sound box operates independently, playing a medium-frequency component and/or a high-frequency component of target audio data by using the full-frequency sound box can improve sound quality because the full-frequency sound box has good playing effects on a medium frequency and a high frequency. When the full-frequency sound box and the low-frequency sound box operate cooperatively, playing a low-frequency component of the target audio data by using the low-frequency sound box can improve bass quality of the audio data because low-frequency playing effect of the low-frequency sound box is superior to low-frequency playing effect of the full-frequency sound box. In addition, playing the medium-frequency component and/or the high-frequency component of the target audio data by using the full-frequency sound box can improve playing effects of the medium-frequency component and/or the high-frequency component of the target audio data because the full-frequency sound box has good playing effects on the medium frequency and the high frequency. In this way, playing effect of the audio data can be improved in a full frequency band of the audio data.

In a possible embodiment, specifically, that the terminal controls the full-frequency sound box to operate independently includes: The terminal sends a first instruction to the sound box system. The first instruction is used to control the full-frequency sound box to operate independently, and that a full-frequency sound box operates independently means that the full-frequency sound box plays the target audio data.

In a possible embodiment, that the terminal sends a first instruction to the sound box system specifically includes: The terminal sends the first instruction to the low-frequency sound box.

In a possible embodiment, specifically, that the terminal controls the full-frequency sound box and a low-frequency sound box to operate cooperatively includes: The terminal sends a second instruction to the sound box system. The second instruction is used to control the full-frequency sound box and the low-frequency sound box system to operate. That a full-frequency sound box and a low-frequency sound box operate cooperatively means: The full-frequency sound box plays a medium-frequency component and/or a high-frequency component of the target audio data, and the low-frequency sound box plays a low-frequency component of the target audio data.

In a possible embodiment, that the terminal sends a second instruction to the sound box system specifically includes: The terminal sends the second instruction to the low-frequency sound box.

According to a ninth aspect, an embodiment of this application provides a terminal, including a detection module and a sending module. The detection module is configured to detect whether the first communication part of the full-frequency sound box according to any one of the first aspect and the possible embodiments of the first aspect is connected to the second communication part of the low-frequency sound box according to any one of the second aspect and the possible embodiments of the second aspect. The sending module is configured to send to-be-played audio data to the full-frequency sound box when the detection module finds, through detection, that the first communication part is not connected to the second communication part. Alternatively, the sending module is configured to: when the detection module finds, through detection, that the first communication part is connected to the second communication part, send first audio data to the full-frequency sound box, and send second audio data to the low-frequency sound box, where the first audio data is a medium-frequency component and/or a high-frequency component of to-be-played audio data, and the second audio data is a low-frequency component of the to-be-played audio data. Alternatively, the sending module is configured to send to-be-played audio data to the full-frequency sound box. Alternatively, the sending module is configured to send to-be-played audio data to the low-frequency sound box.

According to a tenth aspect, an embodiment of this application provides a full-frequency sound box, including an obtaining module, a filtering module, a processing module, and a sending module. The obtaining module is configured to obtain to-be-played audio data. The filtering module is configured to perform multi-band filtering on the to-be-played audio data to obtain a medium-frequency component and/or a high-frequency component, and a low-frequency component of the to-be-played audio data. The processing module is configured to perform sound field extension processing on the medium-frequency component and/or the high-frequency component, and the low-frequency component of the to-be-played audio data, to obtain target audio data. The sending module is configured to send the low-frequency component of the target audio data to the low-frequency sound box, where the medium-frequency component and/or the high-frequency component of the target audio data are or is played by the full-frequency sound box, and the low-frequency component of the target audio data is played by the low-frequency sound box.

According to an eleventh aspect, an embodiment of this application provides a low-frequency sound box, including an obtaining module, a filtering module, a processing module, and a sending module. The obtaining module is configured to obtain to-be-played audio data. The filtering module is configured to perform multi-band filtering on the to-be-played audio data to obtain a medium-frequency component and/or a high-frequency component, and a low-frequency component of the to-be-played audio data. The processing module is configured to perform sound field extension processing on the medium-frequency component and/or the high-frequency component, and the low-frequency component of the to-be-played audio data, to obtain target audio data. The sending module is configured to send the medium-frequency component and/or the high-frequency component of the target audio data to the full-frequency sound box, where the medium-frequency component and/or the high-frequency component of the target audio data are or is played by the full-frequency sound box, and the low-frequency component of the target audio data is played by the low-frequency sound box.

In a possible embodiment, the low-frequency sound box provided in this embodiment of this application further includes an image capture module or an audio capture module. The image capture module is configured to capture image information of a listener; or the audio capture module is configured to capture a sound signal of a listener, where the image information of the listener or the sound signal of the listener is used to perform sound field extension processing on filtered to-be-played audio data.

According to a twelfth aspect, an embodiment of this application provides a terminal. The terminal is used in a scenario in which the sound box system according to any one of the third aspect and the possible embodiments of the third aspect establishes communication connection, and includes a receiving module and a control module. The control module is configured to: when the receiving module receives a first operation of a user, control, in response to the first operation, a full-frequency sound box to operate independently; or the control module is configured to: when the receiving module receives the second operation of the user, control, in response to the second operation, a full-frequency sound box and a low-frequency sound box to operate cooperatively.

In a possible embodiment, the terminal provided in this embodiment of this application further includes a sending module. The control module is specifically configured to: control, in response to the first operation, the sending module to send a first instruction to the sound box system. The first instruction is used to control the full-frequency sound box to operate independently, and that a full-frequency sound box operates independently means that the full-frequency sound box plays target audio data.

In a possible embodiment, the sending module is specifically configured to send the first instruction to the low-frequency sound box.

In a possible embodiment, the control module is specifically configured to control, in response to the second operation, the sending module to send a second instruction to the sound box system. The second instruction is used to control the full-frequency sound box and the low-frequency sound box system to operate. That a full-frequency sound box and a low-frequency sound box operate cooperatively means: The full-frequency sound box plays a medium-frequency component and/or a high-frequency component of the target audio data, and the low-frequency sound box plays a low-frequency component of the target audio data.

In a possible embodiment, the sending module is specifically configured to send the second instruction to the low-frequency sound box.

In a possible embodiment, the first operation is a selection operation performed by the user on a first option in a first interface of the terminal, and the first option corresponds to that the full-frequency sound box operates independently. The second operation is a selection operation performed by the user on a second option in the first interface of the terminal, and the second option corresponds to that the full-frequency sound box and the low-frequency sound box operate cooperatively.

In a possible embodiment, the terminal provided in this embodiment of this application further includes a display module. The display module is configured to display first prompt information when the full-frequency sound box operates independently and the terminal determines that audio data to be played currently is deep-low-frequency audio data. The first prompt information is used to prompt that the full-frequency sound box and the low-frequency sound box operate cooperatively.

In a possible embodiment, the receiving module is further configured to receive a third operation. The control module is further configured to control, in response to the third operation, a camera or a microphone of the low-frequency sound box to start.

In a possible embodiment, the terminal provided in this embodiment of this application further includes a determining module. When the sound box system includes a plurality of full-frequency sound boxes, the determining module is configured to determine a correspondence between a channel of the audio data and the plurality of full-frequency sound boxes based on location information of the plurality of full-frequency sound boxes. The display module is further configured to display information about the correspondence between the channel of the audio data and the plurality of full-frequency sound boxes.

According to a thirteenth aspect, an embodiment of this application provides a terminal. The terminal is used in a scenario in which the sound box system according to any one of the third aspect and the possible embodiments of the third aspect establishes communication connection, and includes a determining module and a control module. The determining module is configured to determine a type of the target audio data, where the type of the target audio data includes a deep-low frequency or a non-deep-low frequency. The control module is configured to: when the type of the target audio data is the non-deep-low frequency, control a full-frequency sound box to operate independently; or the control module is configured to: when the type of the target audio data is the deep-low frequency, control a full-frequency sound box and a low-frequency sound box to operate cooperatively.

In a possible embodiment, the terminal provided in this embodiment of this application further includes a sending module. The control module is specifically configured to control the sending module to send a first instruction to the sound box system. The first instruction is used to control the full-frequency sound box to operate independently, and that a full-frequency sound box operates independently means that the full-frequency sound box plays the target audio data.

In a possible embodiment, the sending module is specifically configured to send the first instruction to the low-frequency sound box.

In a possible embodiment, the terminal provided in this embodiment of this application further includes a sending module. The control module is specifically configured to control the sending module to send a second instruction to the sound box system. The second instruction is used to control the full-frequency sound box and the low-frequency sound box system to operate. That a full-frequency sound box and a low-frequency sound box operate cooperatively means: The full-frequency sound box plays a medium-frequency component and/or a high-frequency component of the target audio data, and the low-frequency sound box plays a low-frequency component of the target audio data.

In a possible embodiment, the sending module is specifically configured to send the second instruction to the low-frequency sound box.

According to a fourteenth aspect, an embodiment of this application provides a full-frequency sound box, including a memory and at least one processor connected to the memory. The memory is configured to store instructions, and the method according to the fifth aspect is performed after the instructions are read by the at least one processor.

According to a fifteenth aspect, an embodiment of this application provides a computer-readable storage medium, including a computer program. The method according to the fifth aspect is performed when the computer program is run on a computer.

According to a sixteenth aspect, an embodiment of this application provides a computer program product including instructions. When the computer program product is run on a computer, the computer is enabled to perform the method according to the fifth aspect.

According to a seventeenth aspect, an embodiment of this application provides a chip, including a memory and a processor. The memory is configured to store computer instructions. The processor is configured to invoke and run the computer instructions from the memory, to perform the method according to the fifth aspect.

According to an eighteenth aspect, an embodiment of this application provides a low-frequency sound box, including a memory and at least one processor connected to the memory. The memory is configured to store instructions, and the method according to the sixth aspect is performed after the instructions are read by the at least one processor.

According to a nineteenth aspect, an embodiment of this application provides a computer-readable storage medium, including a computer program. The method according to the sixth aspect is performed when the computer program is run on a computer.

According to a twentieth aspect, an embodiment of this application provides a computer program product including instructions. When the computer program product is run on a computer, the computer is enabled to perform the method according to the sixth aspect.

According to a twenty-first aspect, an embodiment of this application provides a chip, including a memory and a processor. The memory is configured to store computer instructions. The processor is configured to invoke and run the computer instructions from the memory, to perform the method according to the sixth aspect.

According to a twenty-second aspect, an embodiment of this application provides a terminal, including a memory and at least one processor connected to the memory. The memory is configured to store instructions, and the method according to any one of the fourth aspect, the seventh aspect, the eighth aspect, and the possible embodiments of the fourth aspect, the seventh aspect, and the eighth aspect is performed after the instructions are read by the at least one processor.

According to a twenty-third aspect, an embodiment of this application provides a computer-readable storage medium, including a computer program. The method according to any one of the fourth aspect, the seventh aspect, the eighth aspect, and the possible embodiments of the fourth aspect, the seventh aspect, and the eighth aspect is performed when the computer program is run on a computer.

According to a twenty-fourth aspect, an embodiment of this application provides a computer program product including instructions. When the computer program product is run on a computer, the computer is enabled to perform the method according to any one of the fourth aspect, the seventh aspect, the eighth aspect, and the possible embodiments of the fourth aspect, the seventh aspect, and the eighth aspect.

According to a twenty-fifth aspect, an embodiment of this application provides a chip, including a memory and a processor. The memory is configured to store computer instructions. The processor is configured to invoke and run the computer instructions in the memory, to perform the method according to any one of the fourth aspect, the seventh aspect, the eighth aspect, and the possible embodiments of the fourth aspect, the seventh aspect, and the eighth aspect.

It should be understood that, for beneficial effects achieved by the technical solutions in the ninth aspect to the twenty-fifth aspect of embodiments of this application and the corresponding possible embodiments, refer to the technical effects of the first aspect to the eighth aspect and the corresponding possible embodiments of the first aspect to the eighth aspect. Details are not described herein again.

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first fastening part and a second fastening part are used to distinguish between different parts, instead of describing a specific order of parts. First audio data and second audio data are used to distinguish between different audio data, instead of describing a specific order of audio data.

In addition, in embodiments of this application, terms such as "for example" or "example" is used to represent giving an example, an illustration, or a description. Any embodiment or design scheme described as an "example" or "for example" in embodiments of this application should not be explained as being more preferred or having more advantages than another embodiment or design scheme. Exactly, use of the terms such as "for example" or "example" is intended to present a related concept in a specific manner.

In the description of the embodiment of this application, unless otherwise statedi "a plurality of" means two or more than two. For example, a plurality of processing units are two or more processing units, and a plurality of systems are two or more systems.

Figure 1:
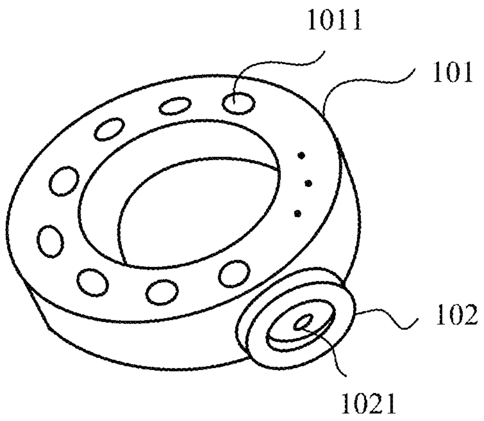
FIG. 1 is a schematic diagram of a structure of a full-frequency sound box according to an embodiment of this application.

As shown in FIG. 1, an embodiment of this application provides a full-frequency sound box. The full-frequency sound box includes a full-frequency sound box body 101 and a first fastening part 102. The full-frequency sound box body includes M speakers 1011, the M speakers 1011 are planarly distributed in the full-frequency sound box body, and the M speakers 1011 constitute K pairs of acoustic dipoles, where M is a positive integer greater than 2, and K is a positive integer greater than or equal to 2. The first fastening part 102 is located in a preset fastening region of the full-frequency sound box body 101, the first fastening part 102 is configured to physically connect to or detach from a low-frequency sound box, the first fastening part 102 includes a first communication part 1021, the first communication part 1021 is configured to enable the full-frequency sound box to communicate with the low-frequency sound box, and the first communication part supports multi-channel audio data transmission. Low-frequency playing effect of the low-frequency sound box is superior to low-frequency playing effect of the full-frequency sound box.

It should be noted that FIG. 1 is merely a schematic diagram of locations of the first fastening part 102 and the first communication part 1021, instead of limiting other features such as shapes of the first fastening part 102 and the first communication part 1021.

In this embodiment of this application, the full-frequency sound box is configured to play target audio data; or the full-frequency sound box is configured to play a high-frequency component and/or a medium-frequency component of target audio data, and the low-frequency sound box is configured to play a low-frequency component of the target audio data.

It should be noted that, in this embodiment of this application, the target audio data played by using a speaker of the full-frequency sound box is audio data obtained through sound field extension processing. For ease of description, audio data that has not undergone sound field extension processing is referred to as raw audio data, and the audio data obtained through sound field extension processing is referred to as target audio data, that is, the target audio data is obtained by performing sound field extension processing on the raw audio data. It should be understood that both the raw audio data and the target audio data are to-be-played audio data. That is, the to-be-played audio data obtained by the full-frequency sound box or the low-frequency sound box may be raw audio data (or a component of a different frequency band of the raw audio data, for example, a medium-frequency component, a high-frequency component, or a low-frequency component), or may be target audio data obtained by performing sound field extension processing on the raw audio data.

In this embodiment of this application, if the to-be-played audio data obtained by the full-frequency sound box is the raw audio data (or the medium-frequency component and/or the high-frequency component of the raw audio data), the full-frequency sound box performs sound field extension processing on the raw audio data (or the medium-frequency component and/or the high-frequency component of the raw audio data). If the to-be-played audio data obtained by the full-frequency sound box is the target audio data (or the medium-frequency component and/or the high-frequency component of the target audio data), the target audio data (or the medium-frequency component and/or the high-frequency component of the target audio data) is obtained by another device by performing frequency division on the raw audio data (which is specifically implemented by using a multi-band filtering technology) and performing sound field extension processing on components of different frequency bands of the raw audio data.

Similarly, if the to-be-played audio data obtained by the low-frequency sound box is the raw audio data (or the low-frequency component of the raw audio data), the low-frequency sound box performs sound field extension processing on the raw audio data (or the low-frequency component of the raw audio data). If the to-be-played audio data obtained by the low-frequency sound box is the low-frequency component of the target audio data, the low-frequency component of the target audio data is obtained by another device by performing frequency division on the raw audio data (which is specifically implemented by using a multi-band filtering technology), and performing sound field extension processing on components of different frequency bands of the raw audio data.

In some embodiments, a shape of the full-frequency sound box body is one of the following: a ring, a circle, a tree, or an W shape. That the full-frequency sound box body shown in FIG. 1 is in a shape of a ring is used as an example, instead of limiting the shape of the full-frequency sound box body. Certainly, when the M speakers constitute a plurality of pairs of acoustic dipoles, the shape of the full-frequency sound box body may alternatively be designed to be another shape other than the ring, the circle, the tree, or the W shape. This is not limited in this embodiment of this application.

Figure 2:
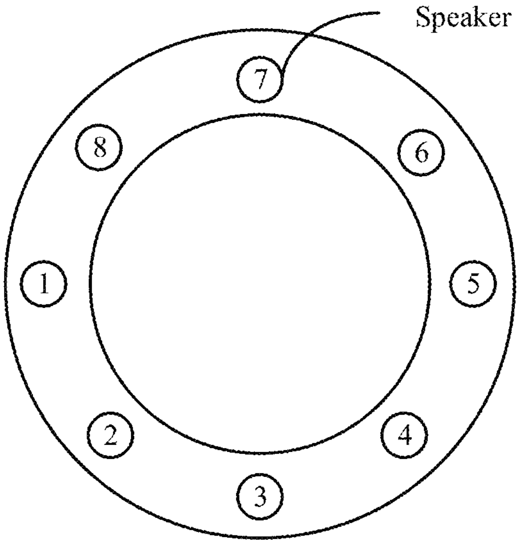
FIG. 2 is a schematic diagram of a shape of a full-frequency sound box body according to an embodiment of this application.
Figure 2:
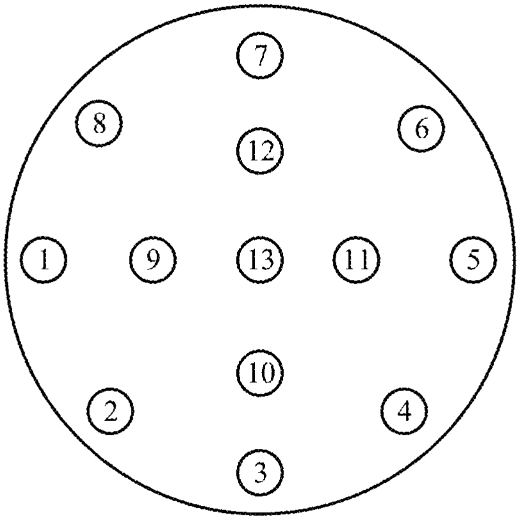
Figure 2:
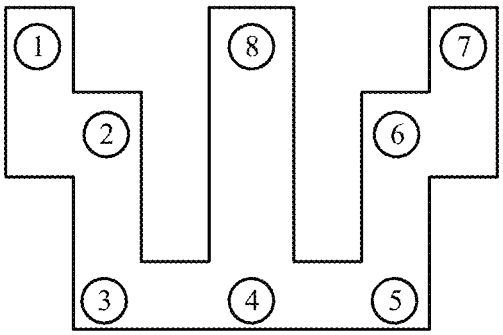
Figure 2:
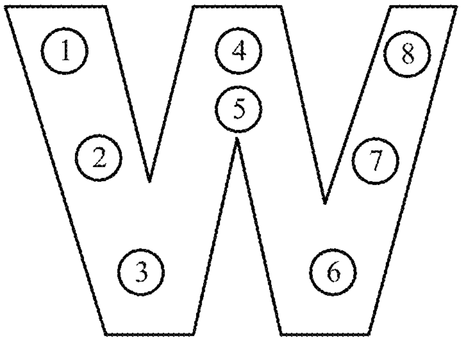

FIG. 2 is a schematic front view of full-frequency sound box bodies in several shapes. (a) in FIG. 2 is a ring-shaped full-frequency sound box (that is, a sound ring), and the M speakers are deployed in the ring; (b) in FIG. 2 is a circular full-frequency sound box, and the M speakers are deployed on a circular surface; (c) in FIG. 2 is a tree-shaped full-frequency sound box; and (d) in FIG. 2 is a W-shaped full-frequency sound box. In this embodiment of this application, the M speakers are arranged on one plane of the full-frequency sound box body, that is, the M speakers are co-planar, and face a same surface of the full-frequency sound box.

Figure 3:
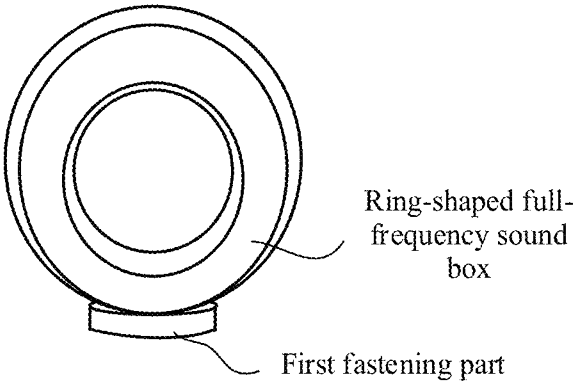
FIG. 3 is a schematic diagram of a structure of a full-frequency sound box according to an embodiment of this application.

In this embodiment of this application, the first fastening part is further configured to support the full-frequency sound box body. For example, as shown in FIG. 3, when the full-frequency sound box body is ring-shaped, the first fastening part may be used as a base to support the ring-shaped sound box body, so that the ring-shaped sound box body is securely placed on a tabletop.

In this embodiment of this application, the M speakers of the full-frequency sound box constitute K pairs of acoustic dipoles, and one pair of acoustic dipoles correspond to one pair of acoustic speakers. For example, the ring-shaped full-frequency sound box shown in (a) in FIG. 2 includes eight speakers. A speaker 1 and a speaker 5 constitute a pair of acoustic dipoles, and a speaker 2 and a speaker 4 constitute a pair of acoustic dipoles, a speaker 6 and a speaker 8 constitute a pair of acoustic dipoles, and a speaker 3 and a speaker 7 constitute a pair of acoustic dipoles.

It should be understood that an arrangement direction of the K pairs of acoustic dipoles constituted by speakers in the full-frequency sound box includes at least two of the following directions: horizontal, vertical, or oblique upward. To be specific, the K pairs of acoustic dipoles include at least two of the following types of acoustic dipoles: an acoustic dipole in the horizontal direction, an acoustic dipole in the vertical direction, or an acoustic dipole in the oblique upward direction. With reference to FIG. 3, the horizontal direction is a direction parallel to a vertical projection of the full-frequency sound box body, and the vertical direction is a direction perpendicular to the vertical projection of the full-frequency sound box body. For example, the full-frequency sound box is the ring-shaped full-frequency sound box shown in (a) in FIG. 2. In the ring-shaped full-frequency sound box, the speaker 1 and the speaker 5 constitute a pair of acoustic dipoles in the horizontal direction, and the speaker 3 and the speaker 7 constitute a pair of acoustic dipoles in the vertical direction.

Figure 4:
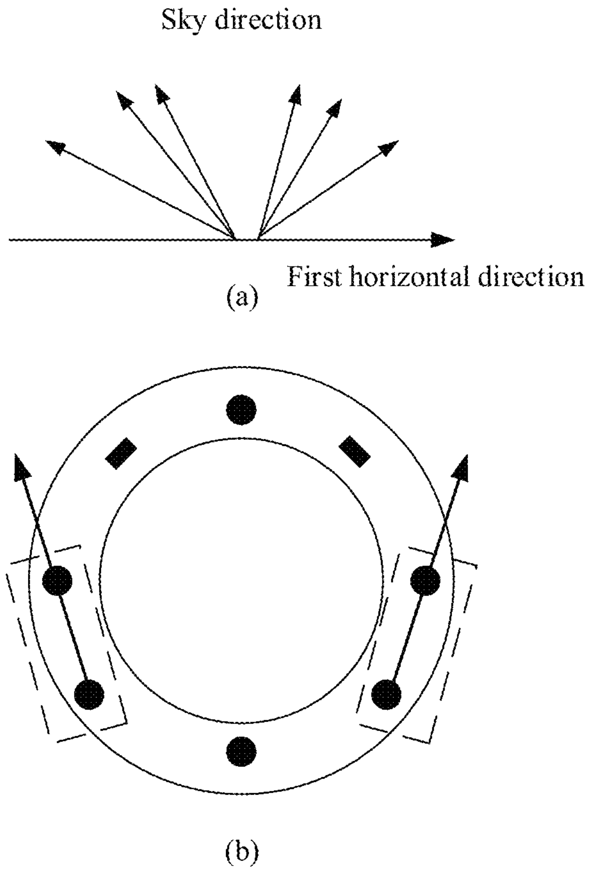
FIG. 4 is a schematic diagram of a dipole in a full-frequency sound box according to an embodiment of this application.

In this embodiment of this application, an included angle of the foregoing preset direction, and the preset direction herein may be understood as a direction pointing to the sky at different angles (e.g., a sky directions). For example, a direction that is shown in (a) in FIG. 4 and in which an included angle between the direction and the first direction is less than 180 degrees is a sky direction. For example, in the ring-shaped full-frequency sound box shown in (b) in FIG. 4, two speakers in a dashed-line box constitute an acoustic dipole in a sky direction. For ease of description, in this embodiment of this application, acoustic dipoles in other preset directions are collectively referred to as acoustic dipoles in the sky direction.

In this embodiment of this application, the target audio data played by the full-frequency sound box is audio data obtained by performing sound field extension processing on the raw audio data. It should be noted that the audio data obtained through sound field extension processing corresponds to dipoles in different directions of the full-frequency sound box. For example, a speaker pair constituting an acoustic dipole in the horizontal direction is configured to play audio data obtained through sound field extension processing in the horizontal direction, a speaker pair constituting an acoustic dipole in the vertical direction is configured to play audio data obtained through sound field extension processing in the vertical direction, and a speaker pair constituting an acoustic dipole in the sky direction is configured to play audio data obtained through sound field extension processing in the sky direction. Performing sound field extension in the vertical direction and sound field extension in another preset direction on the audio data can improve 3D effect of audio data playback. In this embodiment of this application, sound field extension includes: performing high-band dipole processing on a high-frequency component of audio data, performing medium-band dipole processing on a medium-frequency component of the audio data, and performing bass enhancement processing on a low-frequency component of the audio data. Details are described in detail in the following method embodiments.

In some embodiments, a quantity M of speakers included in the full-frequency sound box is not limited in this embodiment of this application, and is specifically set based on an actual requirement. For example, in an embodiment, the full-frequency sound box provided in this embodiment of this application includes six speakers or eight speakers.

The full-frequency sound box provided in this embodiment of this application has good playing effects on the medium-frequency component and the high-frequency component of the audio data. One or more of the M speakers is a full-frequency speaker, or one or more of the M speakers is a medium- and high-frequency speaker. This is not limited in this embodiment of this application. For example, the full-frequency sound box includes eight speakers, where all the eight speakers may be full-frequency speakers; or four of the eight speakers are full-frequency speakers, and four speakers are medium- and high-frequency speakers.

In an embodiment, the M speakers in the full-frequency sound box provided in this embodiment of this application constitute K pairs of acoustic dipoles, one pair of acoustic dipoles correspond to one pair of speakers, and at least two pairs of acoustic dipoles in the K pairs of acoustic dipoles satisfy the following condition: $d_i \neq d_j$, where $d_i$ is a distance between two speakers constituting an $i^{th}$ pair of acoustic dipoles, d is a distance between two speaker constituting a $j^{th}$ pair of acoustic dipoles, each of i and j is one of 1, 2, . . . , K, i≠j, and K is a positive integer greater than or equal to 2. In addition, the two speakers constituting the $i^{th}$ pair of acoustic dipoles play a first frequency band of the target audio data, and the two speaker pairs constituting the $j^{th}$ pair of acoustic dipoles play a second frequency band of the target audio data. The first frequency band and the second frequency band are different frequency bands.

It should be understood that a frequency band of audio data played by a speaker pair constituting a pair of acoustic dipoles is related to a distance between two speakers included in the speaker pair. Specifically, center frequencies of audio data played by two speakers constituting a pair of acoustic dipoles decrease as a distance between the speakers increases. If $d_i > d_j$, a center frequency of audio data that can be played by the two speakers constituting the $i^{th}$ pair of acoustic dipoles is less than a center frequency of audio data that can be played by the two speakers constituting the $j^{th}$ pair of acoustic dipoles.

For example, a frequency band of audio data played by a speaker pair constituting the $i^{th}$ pair of acoustic dipoles may be 600 Hz to 2600 Hz, and a frequency band of audio data played by a speaker pair constituting the $j^{th}$ pair of acoustic dipoles may be 2600 Hz to 12 kHz. A speaker pair with a small distance has good playing effect on high-band audio data.

In this embodiment of this application, speaker layout of the full-frequency sound box is adjusted, so that spacings between two speakers in speaker pairs constituting a plurality of pairs of acoustic dipoles are the same or different. Audio data of different frequency bands is played by using speaker pairs with different spacings, so that sound field effects of different frequency bands can be created.

Figure 5:
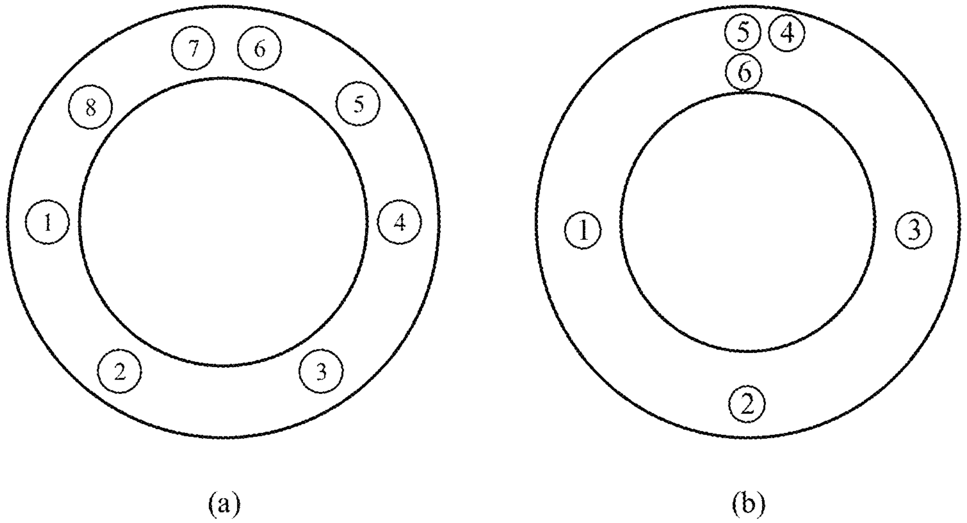
FIG. 5 is a schematic layout diagram of speakers of a ring-shaped full-frequency sound box according to an embodiment of this application.

For example, FIG. 5 shows two types of different layout of speakers of a ring-shaped full-frequency sound box. As shown in (a) in FIG. 5, the ring-shaped full-frequency sound box includes four pairs of acoustic dipoles in a horizontal direction with different spacings. A speaker 1 and a speaker 4 constitute a first pair of acoustic dipoles in the horizontal direction, a speaker 8 and a speaker 5 constitute a second pair of acoustic dipoles in the horizontal direction, a speaker 2 and a speaker 3 constitute a third pair of acoustic dipoles in the horizontal direction, a speaker 7 and a speaker 6 constitute a fourth pair of acoustic dipoles in the horizontal direction. The ring-shaped full-frequency sound box shown in (b) in FIG. 5 includes two pairs of acoustic dipoles in a horizontal direction and two pairs of acoustic dipoles in a vertical direction. A speaker 1 and a speaker 3 constitute a pair of acoustic dipoles in the horizontal direction that are remote from each other, a speaker 5 and a speaker 4 constitute a pair of acoustic dipoles in the horizontal direction that are close to each other, the speaker 5 and a speaker 2 constitute a pair of acoustic dipoles in the vertical direction that are remote from each other, and the speaker 5 and a speaker 6 constitute a pair of acoustic dipoles in the vertical direction that are close to each other.

Based on descriptions of the foregoing embodiment, because center frequencies of audio data played by a speaker pair decrease as a distance between two speakers included in the speaker pair increases, with reference to (a) in FIG. 5, center frequencies of audio data played by the four speaker pairs constituting the four pairs of acoustic dipoles in the horizontal direction increase sequentially, that is, a center frequency of audio data corresponding to the first pair of acoustic dipoles in the horizontal direction is smallest, a center frequency of audio data corresponding to the second pair of acoustic dipoles in the horizontal direction is greater than the center frequency of the audio data corresponding to the first pair of acoustic dipoles in the horizontal direction, a center frequency of audio data corresponding to the third pair of acoustic dipoles in the horizontal direction is greater than the center frequency of the audio data corresponding to the second pair of acoustic dipoles in the horizontal direction, and a center frequency of audio data corresponding to the fourth pair of acoustic dipoles in the horizontal direction is highest.

In some embodiments, in this embodiment of this application, one speaker may be shared by one or more pairs of acoustic dipoles. For example, with reference to (b) in FIG. 4, the speaker 5 and the speaker 4 constitute a pair of acoustic dipoles in the horizontal direction, the speaker 5 and the speaker 2 constitute a pair of acoustic dipoles in the vertical direction, and the speaker 5 and the speaker 6 constitute another pair of acoustic dipoles in the vertical direction. It can be learned that the speaker 5 is shared by a plurality of pairs of acoustic dipoles.

Figure 6:
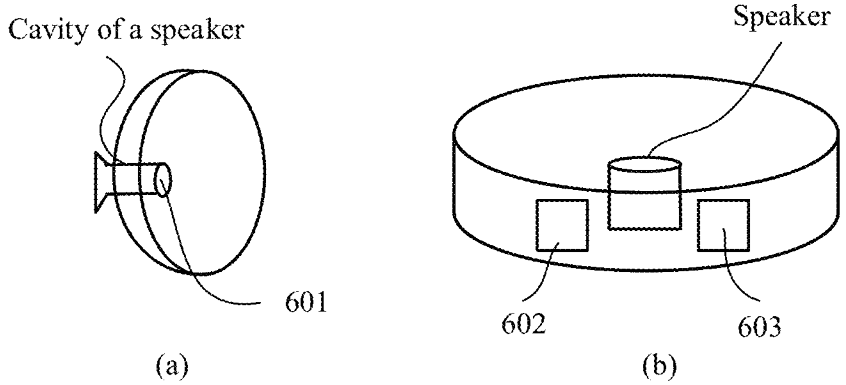
FIG. 6 is a schematic diagram of locations of passive films in a full-frequency sound box according to an embodiment of this application.

In some embodiments, in this embodiment of this application, a passive film is disposed on at least one of the M speakers of the full-frequency sound box, and the passive film is configured to extend a low-frequency response of the speaker. In an embodiment, each of the at least one speaker corresponds to one passive film. As shown in (a) in FIG. 6, the passive film is attached to the back of a cavity of a speaker, and 601 in the figure represents a passive film. The passive film is disposed on the back of the cavity of the speaker, and the passive film and a cavity in a box body constitute an air spring whose resonance frequency is lower than a resonance frequency of the speaker. The speaker pushes the air spring to resonate at the resonance frequency. This can extend a low-frequency response of the speaker (for example, increase a range, energy, and an amplitude of the low-frequency response), and can improve bass quality of the full-frequency sound box. In another embodiment, each of the at least one speaker corresponds to two passive films. As shown in (b) in FIG. 6, two passive films are respectively located on sides of a cavity of a speaker, and 602 and 603 in the figure represent the two passive films. The passive films are disposed on the sides of the cavity of the speaker, to further increase effective resonance areas of the passive films, and improve bass quality of the full-frequency sound box more significantly. It should be noted that FIG. 6 is merely a schematic diagram of locations of the passive films.

Figure 7:
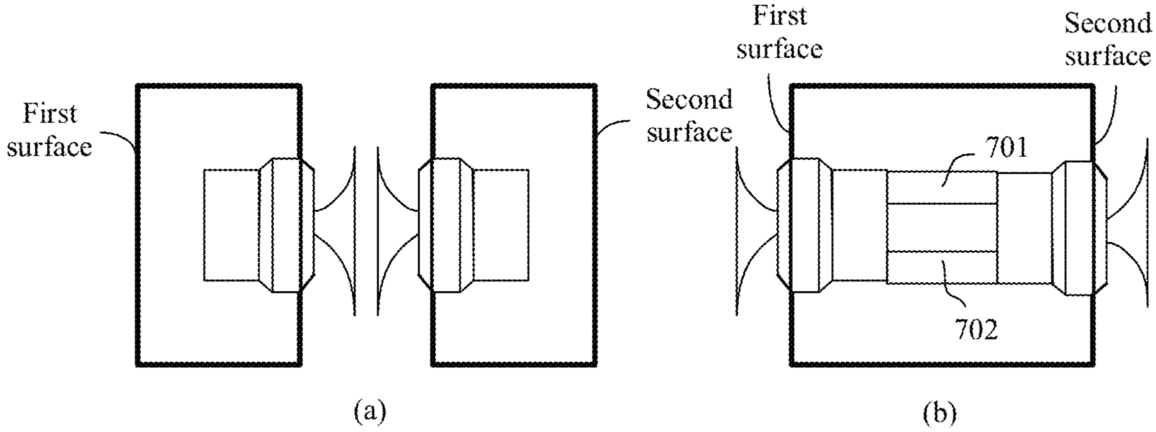
FIG. 7 is a schematic diagram of a face-to-face speaker pair and a back-to-back speaker pair according to an embodiment of this application.

In some embodiments, the full-frequency sound box provided in this embodiment of this application further includes N speakers (N is a positive integer, and N is less than or equal to M), and the N speakers are respectively disposed back-to-back with N speakers in the M speakers to constitute N back-to-back speaker pairs. The M speakers face a first plane, the N speakers face a second plane, the first plane and the second plane are two planes perpendicular to a vertical projection of the full-frequency sound box body, and the first plane is parallel to the second plane. Alternatively, the N speakers are respectively disposed face-to-face with N speakers in the M speakers to constitute N face-to-face speaker pairs. Cavities of the M speakers face a first plane, cavities of the N speakers face a second plane, the first plane and the second plane are two planes perpendicular to a vertical projection of the full-frequency sound box body, and the first plane is parallel to the second plane. Correspondingly, the N speakers are also co-planar. For example, one speaker pair is used as an example. (a) in FIG. 7 is a schematic diagram of two face-to-face speakers, and (b) in FIG. 7 is a schematic diagram of two back-to-back speakers.

In this embodiment of this application, two speakers in each of the N back-to-back speaker pairs share one cavity. In an embodiment, a passive film is disposed on a cavity of at least one of the N back-to-back speaker pairs. One of the at least one speaker pair corresponds to two passive films. One speaker pair is used as an example. Two passive films corresponding to the speaker pair are back-to-back, and are respectively attached to two sides that are adjacent to the speaker pair and that are in a cavity. For example, 701 and 702 in (b) in FIG. 7 represent two passive films.

In some embodiments, the first fastening part may be a first sheet-like part connected to the full-frequency sound box body, and the first sheet-like part is configured to physically connect to or detach from a second sheet-like part of a low-frequency sound box body. Alternatively, the first fastening part is a concave part disposed in a preset fastening region of the full-frequency sound box body, and the concave part is configured to physically connect to or detach from a convex part of a low-frequency sound box body.

According to the full-frequency sound box provided in this embodiment of this application, because the M speakers included in the full-frequency sound box constitute a plurality of pairs of acoustic dipoles, playing, by using the full-frequency sound box, the audio data obtained through sound field extension processing (that is, the target audio data) can achieve good sound field extension effect, and improve sound quality. Further, after the first fastening part of the full-frequency sound box is connected to the low-frequency sound box, the full-frequency sound box and the low-frequency sound box are used in a combined manner to play the audio data. This can significantly improve playing effect of the audio data. In addition, the user may flexibly choose to play the audio data by using the full-frequency sound box, or to play the audio data by using the full-frequency sound box and the low-frequency sound box. This can satisfy different requirements of the user.

Figure 8:
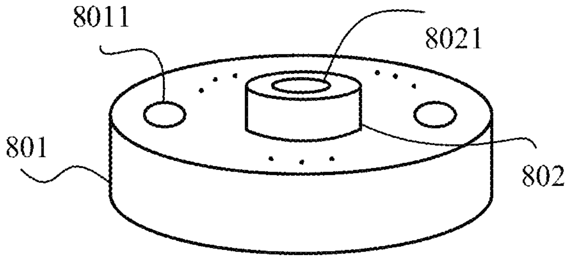
FIG. 8 is a schematic diagram of a structure of a low-frequency sound box according to an embodiment of this application.

An embodiment of this application provides a low-frequency sound box. As shown in FIG. 8, the low-frequency sound box includes a low-frequency sound box body 801 and a second fastening part 802. The low-frequency sound box body includes one or more low-frequency speakers 8011. The second fastening part 802 is located in a preset fastening region of the low-frequency sound box body, the second fastening part 802 is configured to physically connect to or detach from a full-frequency sound box, and the second fastening part 802 includes a second communication part 8021. The second communication part 8021 is configured to enable the low-frequency sound box to communicate with the full-frequency sound box, and the second communication part supports multi-channel audio data transmission. Low-frequency playing effect of the low-frequency sound box is superior to low-frequency playing effect of the full-frequency sound box, and a frequency band range of the full-frequency sound box is greater than a frequency band range of the low-frequency sound box.

It should be noted that FIG. 8 is merely a schematic diagram of locations of the second fastening part 802 and the second communication part 8021, instead of limiting other features such as shapes of the second fastening part 802 and the second communication part 8021.

The low-frequency sound box is configured to play a low-frequency component of target audio data, and the full-frequency sound box is configured to play the target audio data or a high-frequency component and/or a medium-frequency component of the target audio data. Similarly, the target audio data is audio data obtained through sound field extension processing.

In some embodiments, a shape of the low-frequency sound box body may be a flat cylinder, a long cylinder, a cube, a cuboid, or another shape. This is not limited in this embodiment of this application. It should be noted that FIG. 8 is merely a schematic diagram in which a flat cylinder is used as a low-frequency sound box, instead of limiting features such as specific shapes of the low-frequency sound box and the first communication part.

In some embodiments, the second fastening part is a second sheet-like part connected to the low-frequency sound box body, and the second sheet-like part is configured to physically connect to or detach from a first sheet-like part of the full-frequency sound box body. Alternatively, the second fastening part is a convex part disposed in a preset fastening region of the low-frequency sound box body, and the concave part is configured to physically connect to or detach from a convex part of the full-frequency sound box body.

In some embodiments, the low-frequency sound box further includes a charging port. The charging port is configured to: connect to an external power supply to supply power to the low-frequency sound box, or charge the full-frequency sound box by using the low-frequency sound box when the low-frequency sound box is connected to the full-frequency sound box. Specifically, the first communication part is connected to the second communication part after the first fastening part is connected to the second fastening part, so that the low-frequency sound box charges the full-frequency sound box.

In some embodiments, the low-frequency sound box provided in this embodiment of this application further includes a camera or a microphone. The camera is configured to capture an image of a user (e.g., a listener), to determine a location of the user based on the image of the user. Similarly, the microphone is configured to capture a sound signal of a user, to determine a location of the user based on the sound signal of the user.

According to the low-frequency sound box provided in this embodiment of this application, one or more speakers of the low-frequency sound box play a low-frequency component of audio data. This can improve bass quality of the audio data. Further, the low-frequency sound box may be connected to the full-frequency sound box by using the second communication part, and is used with the full-frequency sound box in a combined manner. The low-frequency sound box sends a medium-frequency component and/or a high-frequency component of audio data obtained through sound field extension processing to the full-frequency sound box, and the full-frequency sound box plays the audio data. The full-frequency sound box and the low-frequency sound box are used cooperatively. This can improve audio data playing effect. In addition, the user may choose to play the audio data by using the full-frequency sound box, or to play the audio data by using the full-frequency sound box and the low-frequency sound box. This can satisfy different requirements of the user.

Figure 9:
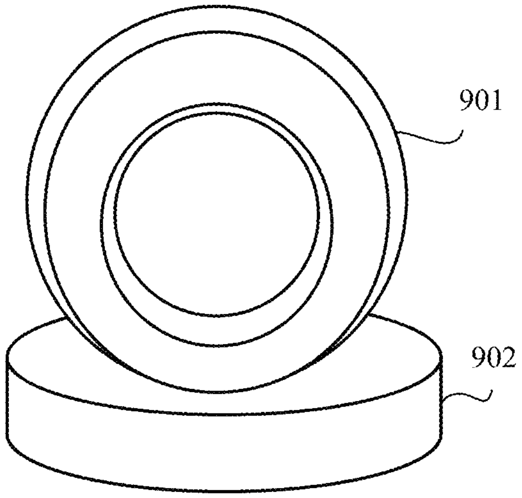
FIG. 9 is a schematic diagram of a structure of a sound box system according to an embodiment of this application.

An embodiment of this application provides a sound box system. As shown in FIG. 9, the sound box system includes a full-frequency sound box 901 and a low-frequency sound box 902. The full-frequency sound box 901 is the full-frequency sound box described in the foregoing embodiments. The low-frequency sound box 902 is the low-frequency sound box described in the foregoing embodiments. For descriptions of structures of the full-frequency sound box 901 and the low-frequency sound box 902, refer to the foregoing embodiments. Details are not described herein again.

It may be understood that the full-frequency sound box 901 is physically connected to the low-frequency sound box 902 by using the first fastening part and the second fastening part, and the first fastening part and the second fastening part are a group of paired connection parts. It can be learned, from the foregoing embodiments, that the first fastening part includes the first communication part, the second fastening part includes the second communication part, and the first communication part is connected to the second communication part after the first fastening part is physically connected to the second fastening part. In this way, the full-frequency sound box 901 can communicate with the low-frequency sound box 902, and the first communication part and the second communication part are a group of paired communication parts (for example, transmitting audio data or control signaling), or the low-frequency sound box charges the full-frequency sound box. It should be noted that the low-frequency sound box is connected to a power supply when the low-frequency sound box charges the full-frequency sound box.

It should be noted that FIG. 8 is merely a schematic diagram of possible composition of a sound box system. In FIG. 8, the full-frequency sound box is ring-shaped, the low-frequency sound box is flat cylindrical, and the full-frequency sound box is connected to the low-frequency sound box in a stacked mode. In FIG. 8, the first fastening part, the second fastening part, the first communication part, and the second communication part are invisible because the full-frequency sound box and the low-frequency sound box are in a connected state. In some embodiments, the full-frequency sound box and the low-frequency sound box each may be in another shape. A mode of connection between the full-frequency sound box and the low-frequency sound box may alternatively be in another connection mode. This is not limited in this embodiment of this application.

The full-frequency sound box 901 is configured to play target audio data, or play a high-frequency component and/or a medium-frequency component of target audio data. The low-frequency sound box 902 is configured to play a low-frequency component of the target audio data, low-frequency playing effect of the low-frequency sound box is superior to low-frequency playing effect of the full-frequency sound box, and a frequency band range of the full-frequency sound box is greater than a frequency band range of the low-frequency sound box.

In some embodiments, the full-frequency sound box is connected to the low-frequency sound box in a stacked or mounting mode by using the first fastening part and the second fastening part.

Figure 10:
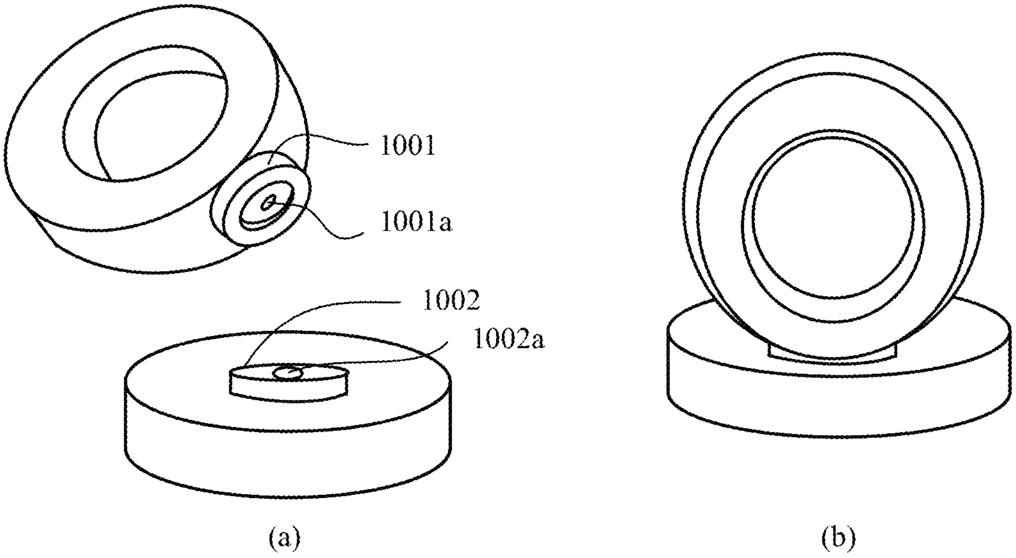
FIG. 10 is a schematic diagram of connecting a full-frequency sound box to a low-frequency sound box in a stacked mode according to an embodiment of this application.

In an embodiment, as shown in (a) in FIG. 10, when the first fastening part is a first sheet-like part 1001 connected to the full-frequency sound box body, the second fastening part is a second sheet-like part 1002 connected to the low-frequency sound box body, and the first sheet-like part is in contact with and coupled to the second sheet-like part, the full-frequency sound box is connected to the low-frequency sound box in a stacked mode. Specifically, the first sheet-like part 1001 includes a first communication part 1001*a*, and the first communication part 1001*a* is located within a vertical projection of the full-frequency sound box body. The second sheet-like part 1002 is located on the low-frequency sound box body, and the second sheet-like part 1002 includes a second communication part 1002*a*. The second communication part 1002*a* is disposed on the second sheet-like part 1002. The first sheet-like part 1001 is in contact with and coupled to the second sheet-like part 1002, so that the full-frequency sound box is connected to the low-frequency sound box in a stacked mode. (b) in FIG. 10 is a schematic diagram of effect of connecting the full-frequency sound box to the low-frequency sound box in a stacked mode.

In some embodiments, the first sheet-like part 1001*a* is connected to the second sheet-like part 1002*a* in a buckle coupling or magnetic coupling mode. Certainly, the first sheet-like part 1001*a* may alternatively be connected to the second sheet-like part 1001*a* in another implementable manner. This is not limited in this embodiment of this application.

Figure 11:
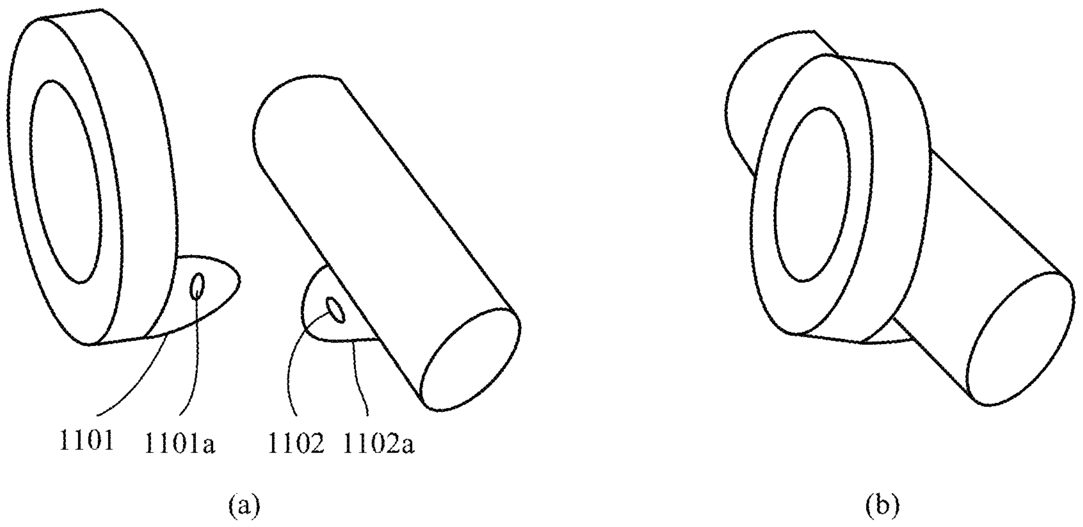
FIG. 11 is a schematic diagram of connecting a full-frequency sound box to a low-frequency sound box in a mounting mode according to an embodiment of this application.

In another embodiment, as shown in (a) in FIG. 11, when the first fastening part is a first sheet-like part 1101 that extends outward along one side of the full-frequency sound box body, the second fastening part is a second sheet-like part 1102 that extends outward along one side of the low-frequency sound box body, and the first sheet-like part 1101 is in contact with and coupled to the second sheet-like part 1102, the full-frequency sound box is connected to the low-frequency sound box in a mounting mode. Specifically, the first sheet-like part 1101 includes a first communication part 1101*a*, the first communication part 1101*a* is located outside the vertical projection of the full-frequency sound box body, the second sheet-like part 1102 includes a second communication part 1102*a*, and the second communication part 1102*a* is located outside the vertical projection of the low-frequency sound box body. (b) in FIG. 11 is a schematic diagram of effect of connecting the full-frequency sound box to the low-frequency sound box in a mounting mode.

Figure 12:
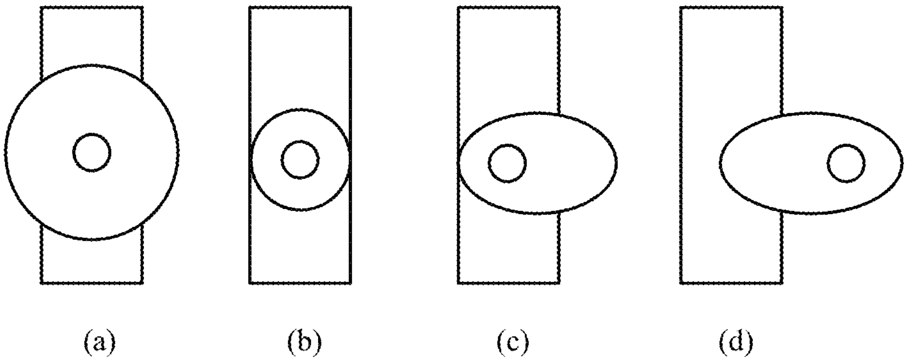
FIG. 12 is a schematic top view of a full-frequency sound box according to an embodiment of this application.

With reference to the foregoing two modes of connecting the full-frequency sound box to the low-frequency sound box, the first fastening part is connected to the full-frequency sound box body, and the first fastening part includes the first communication part. When the first communication part is located within the vertical projection of the full-frequency sound box body, for example, (a) in FIG. 12 to (c) in FIG. 12, and the second fastening part is located on the low-frequency sound box body, the full-frequency sound box is connected to the low-frequency sound box in a stacked mode. When the first communication part is located outside the vertical projection of the full-frequency sound box body, for example, (d) in FIG. 12, and the second fastening part is located outside the vertical projection of the low-frequency sound box body, the full-frequency sound box is connected to the low-frequency sound box in a mounting mode.

Figure 13:
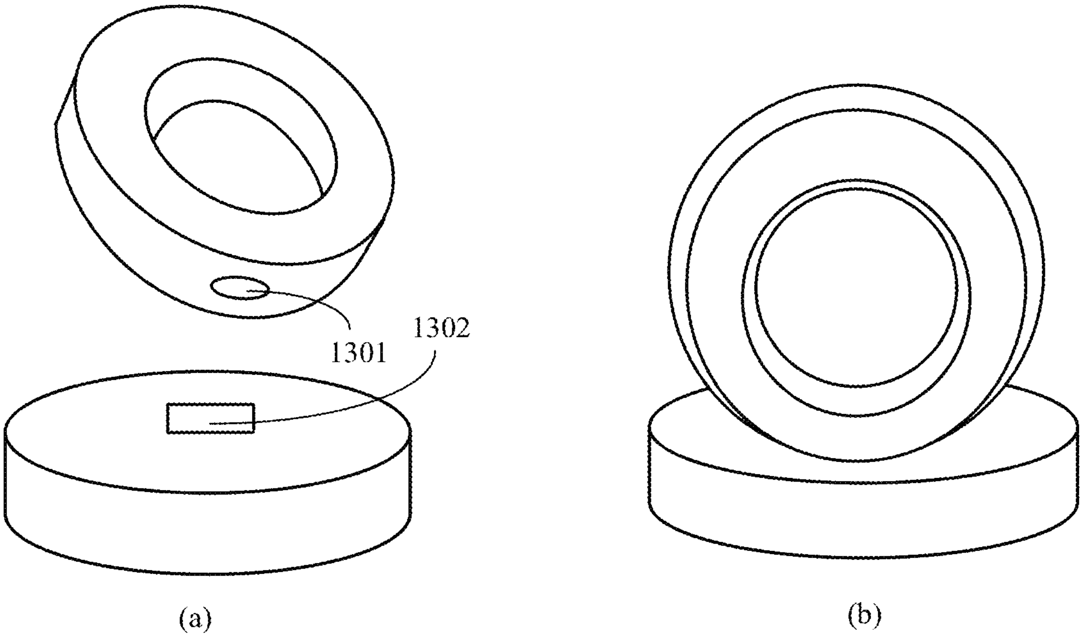
FIG. 13 is a schematic diagram of connecting a full-frequency sound box to a low-frequency sound box in a stacked mode according to an embodiment of this application.

In still another embodiment, as shown in (a) in FIG. 13, when the first fastening part is a concave part 1301 disposed in a preset fastening region of the full-frequency sound box body, the second fastening part is a convex part 1302 disposed in a preset fastening region of the low-frequency sound box body, and the concave part 1301 is in contact with and coupled to the convex part 1302, the full-frequency sound box is connected to the low-frequency sound box in a stacked mode. (b) in FIG. 13 is a schematic diagram of effect of connecting the full-frequency sound box to the low-frequency sound box in a stacked mode.

In some embodiments, the concave part 1301 may be connected to the convex part 1302 in a buckle coupling mode, a threaded coupling mode, or another implementable manner. This is not limited in this embodiment of this application.

In conclusion, in some embodiments, the first communication part is a magnetic suction female connector of a magnetic suction interface, and the second communication part is a magnetic suction male connector of a magnetic suction interface. Alternatively, the first communication part is a plug of a USB interface, and the second communication part is a socket of the USB interface. Alternatively, the first communication part and the second communication part may be other communication parts that have a matching relationship and have a detachable feature. This is not limited in this embodiment of this application.

In some embodiments, the sound box system provided in this embodiment of this application further includes at least one full-frequency sound box, and a structure of the at least one full-frequency sound box is similar to a structure of the full-frequency sound box in the foregoing embodiments. The at least one full-frequency sound box and one full-frequency sound box in the sound box system constitute at least two full-frequency sound boxes in the sound box system, and the at least two full-frequency sound boxes included in the sound box system may operate cooperatively. A manner in which the at least two full-frequency sound boxes operate cooperatively is described in detail in the following embodiments.

In some embodiments, the sound box system provided in this embodiment of this application further includes at least one full-frequency sound box and at least one low-frequency sound box. In the sound box system, one full-frequency sound box corresponds to one low-frequency sound box to constitute one full-frequency sound box subsystem. In this case, the sound box system includes at least two subsystems, and the at least two subsystems may operate cooperatively. A manner in which the at least two full-frequency sound box subsystems operate cooperatively is described in detail in the following embodiments.

In this embodiment of this application, the full-frequency sound box is small-sized and light-weighted, and is easy to carry. For example, a ring-shaped full-frequency sound box has a diameter of about 25 centimeters (cm), a thickness of about 3 centimeters, and a weight of less than 500 grams. Compared with the full-frequency sound box, the low-frequency sound box has a slightly larger size and a larger weight. For example, a flat cylindrical low-frequency sound box has a bottom-surface diameter of about 30 cm, a height of about 10 cm, and a weight of more than 2000 grams.

According to the sound box system provided in this embodiment of this application, the full-frequency sound box in the sound box system may operate independently, or the full-frequency sound box and the low-frequency sound box operate cooperatively. Therefore, a user may flexibly choose to play audio data by using the full-frequency sound box, or to play audio data by using the full-frequency sound box and the low-frequency sound box. This can satisfy different requirements of the user.

Further, when the full-frequency sound box operates independently, playing the medium-frequency component and/or the high-frequency component of the target audio data by using the full-frequency sound box can improve sound quality because the full-frequency sound box has good playing effects on a medium frequency and a high frequency. When the full-frequency sound box and the low-frequency sound box operate cooperatively, playing the low-frequency component of the target audio data by using the low-frequency sound box can improve bass quality of the audio data because the low-frequency playing effect of the low-frequency sound box is superior to the low-frequency playing effect of the full-frequency sound box. In addition, playing the medium-frequency component and/or the high-frequency component of the target audio data by using the full-frequency sound box can improve playing effects of the medium-frequency component and/or the high-frequency component of the target audio data because the full-frequency sound box has good playing effects on the medium frequency and the high frequency. In this way, playing effect of the audio data can be improved in a full frequency band of the audio data.

The following separately describes hardware structures of the full-frequency sound box and the low-frequency sound box that are included in the sound box system provided in embodiments of this application.

Figure 14:
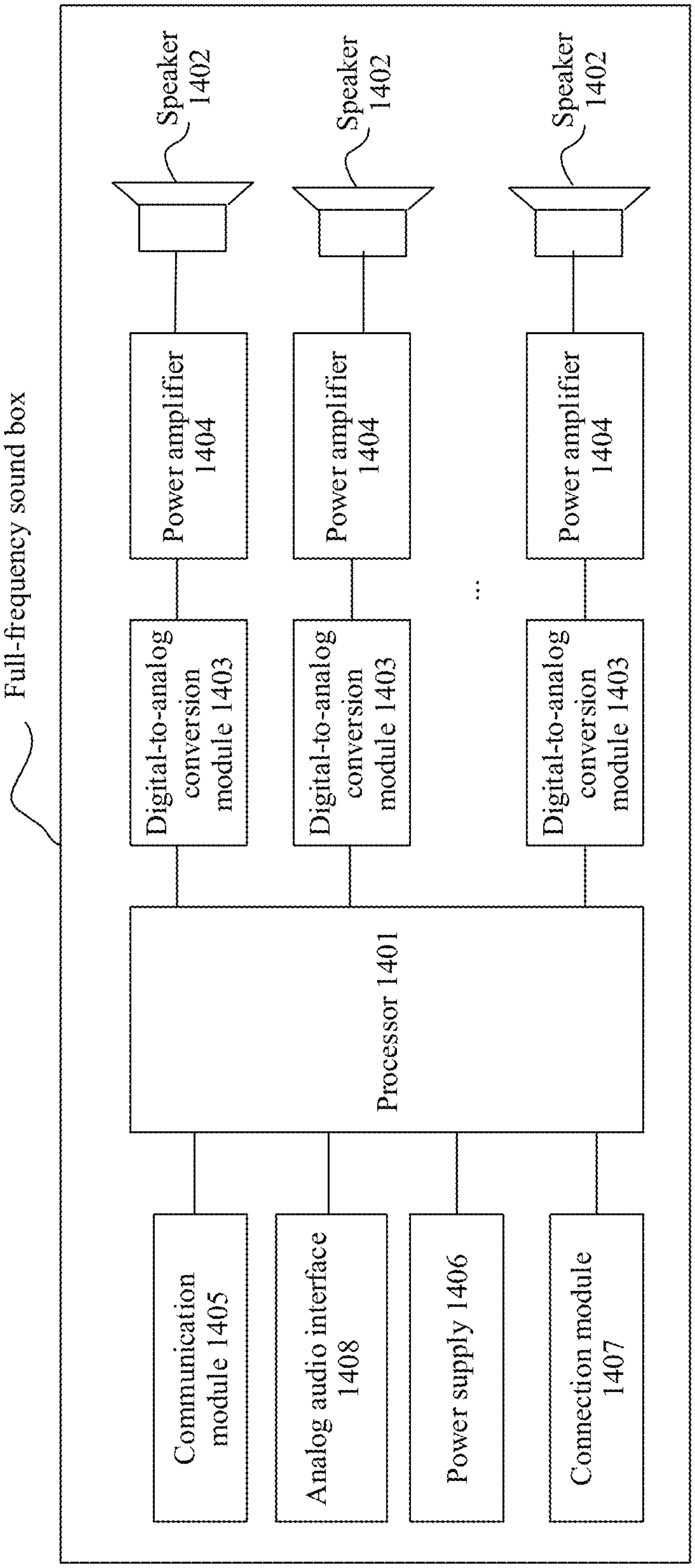
FIG. 14 is a schematic diagram of a hardware structure of a full-frequency sound box according to an embodiment of this application.

FIG. 14 is a schematic diagram of a hardware structure of a full-frequency sound box according to an embodiment of this application. As shown in FIG. 14, the full-frequency sound box includes a processor 1401, one or more speakers 1402, one or more digital-to-analog conversion modules 1403, one or more power amplifiers 1404, a communication module 1405, a power supply 1406, and a connection module 1407, where the digital-to-analog conversion modules 1403 and the power amplifiers 1404 correspond to the speakers 1402.

The processor 1401 is a core control and processing unit of the full-frequency sound box, and has functions such as signal flow control and processing. For example, the processor 1401 processes audio data.

The one or more speakers 1402 are playback devices of the full-frequency sound box, and are configured to play audio data processed by the processor 1401. In some embodiments, the one or more speakers 1402 may be full-frequency speakers, and a part of the one or more speakers 802 may be medium- and high-frequency speakers. This is not specifically limited in this embodiment of this application.

The one or more digital-to-analog conversion modules 1403 are configured to convert the audio data processed by the processor 1401 from a digital signal form into an analog signal form.

The one or more power amplifiers 1404 are configured to amplify power of audio data in an analog signal form, and then the one or more speakers 1402 play the audio data.

The communication module 1405 is configured to support the full-frequency sound box to communicate with another device. For example, the communication module 1405 may be a Bluetooth module. The Bluetooth module is used to establish connection between the full-frequency sound box and a mobile phone, to transmit the audio data. The communication module 1405 may be a transceiver.

The power supply 1406 is configured to supply power to the full-frequency sound box, and the power supply 1406 may be a battery.

The connection module 1407 is configured to detachably connect the full-frequency sound box to the low-frequency sound box. Contactable connection between the full-frequency sound box and the low-frequency sound box is implemented by using the connection module 1407, to charge the full-frequency sound box or implement communication between the full-frequency sound box and the low-frequency sound box. The connection module 1407 includes a communication part, and the communication part may be a USB interface or a magnetic suction interface. The transceiver of the full-frequency sound box may send the audio data to the low-frequency sound box by using the communication part.

In some embodiments, the full-frequency sound box provided in this embodiment of this application may further include an analog audio interface 1408. The analog audio interface 1408 is configured to receive or send analog audio data.

Figure 15:
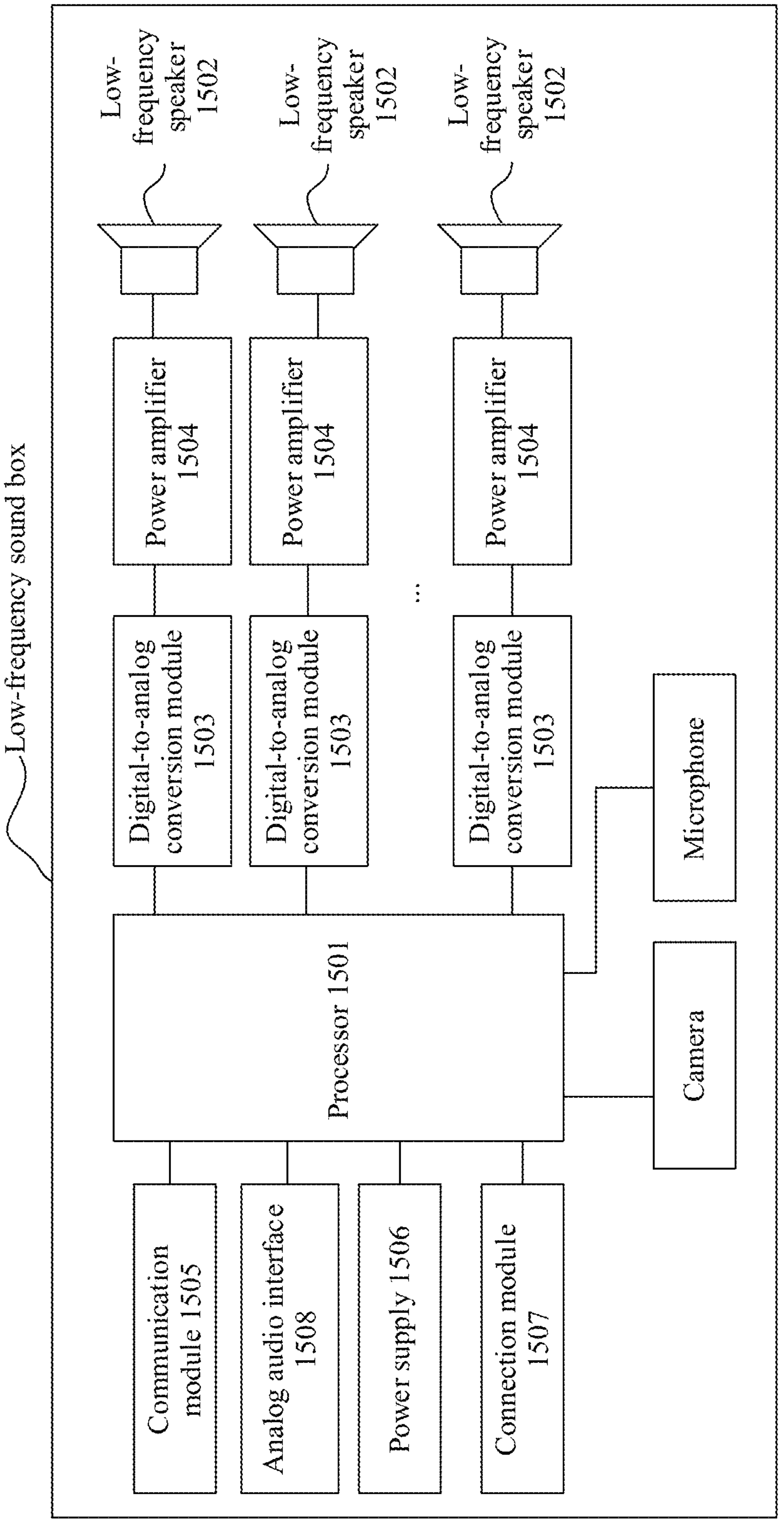
FIG. 15 is a schematic diagram of hardware of a low-frequency sound box according to an embodiment of this application.

FIG. 15 is a schematic diagram of a hardware structure of a low-frequency sound box according to an embodiment of this application. As shown in FIG. 15, the low-frequency sound box includes a processor 1501, one or more low-frequency speakers 1502, one or more digital-to-analog conversion modules 1503, one or more power amplifiers 1504, a communication module 1505, a power supply 1506, and a connection module 1507, where the digital-to-analog conversion modules 1503 and the power amplifiers 1504 correspond to the low-frequency speakers 1502.

The processor 1501 is a core control and processing unit of an entire full-frequency sound box (including a full-frequency sound box and a low-frequency sound box), and has functions such as signal flow control and processing. In addition, compared with the processor 1401 of the full-frequency sound box, the processor 1501 of the low-frequency sound box has stronger computing and storage capability, and computing resources.

The one or more speakers 1502 are bass playback devices, and are configured to play a low-frequency component of audio data processed by the processor 1501.

The one or more digital-to-analog conversion modules 1503 are configured to convert the audio data processed by the processor 1501 from a digital signal form into an analog signal form.

The one or more power amplifiers 1504 are configured to amplify power of audio data in an analog signal form, and then the one or more speakers 1502 play the audio data.

The communication module 1505 is configured to support the full-frequency sound box to communicate with another device. For example, the communication module 1505 is used to establish connection between the full-frequency sound box and a mobile phone, to transmit the audio data. The communication module 1405 may be a transceiver. In some embodiments, the communication module 1505 may be a Bluetooth module or a Wi-Fi module. This is not limited in this embodiment of this application.

The power supply 1506 is a wired power supply, and supplies power to the low-frequency sound box and the full-frequency sound box.

The connection module 1507 is configured to detachably connect the low-frequency sound box to the full-frequency sound box. Contactable connection between the full-frequency sound box and the low-frequency sound box is implemented by using the connection module 1507, to charge the full-frequency sound box or implement communication between the full-frequency sound box and the low-frequency sound box. The connection module 1507 includes a communication part, and the communication part may be a USB interface or a magnetic suction interface. The transceiver of the low-frequency sound box may send the audio data to the full-frequency sound box by using the communication part.

In some embodiments, the low-frequency sound box provided in this embodiment of this application further includes another extensible unit. For example, the low-frequency sound box further includes a camera or a microphone array.

Figure 16:
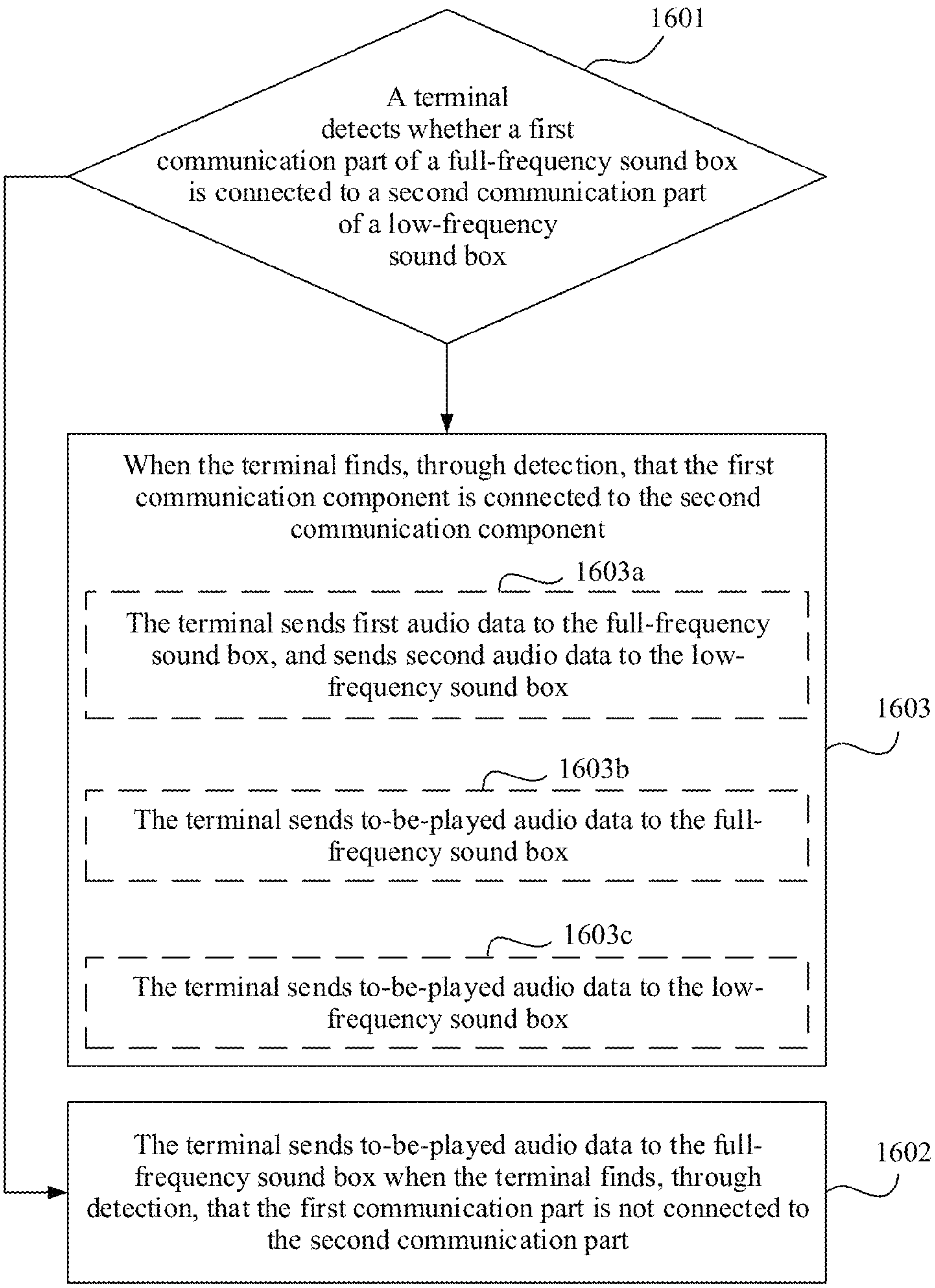
FIG. 16 is a schematic diagram of an audio data processing method according to an embodiment of this application.

Based on the full-frequency sound box and the low-frequency sound box in the sound box system in the foregoing embodiments, an embodiment of this application provides an audio data processing method. As shown in FIG. 16, the method includes operation 1601 to operation 1603.

Operation 1601: A terminal detects whether the first communication part of the full-frequency sound box is connected to the second communication part of the low-frequency sound box.

Based on descriptions of the foregoing embodiments, the full-frequency sound box includes the first fastening part, and the first communication part is disposed on the first fastening part. The low-frequency sound box includes the second fastening part, and the second communication part is disposed on the second fastening part. The full-frequency sound box is physically connected to or detached from the low-frequency sound box by using the first fastening part and the second fastening part. The full-frequency sound box may communicate with the low-frequency sound box when the first communication part is connected to the second communication part. In addition, the first communication part and the second communication part support multi-channel audio data transmission, low-frequency playing effect of the low-frequency sound box is superior to low-frequency playing effect of the full-frequency sound box, and a frequency band range of the full-frequency sound box is greater than a frequency band range of the low-frequency sound box.

For related descriptions of structures of the full-frequency sound box and the low-frequency sound box, refer to detailed content in the foregoing embodiments.

In some embodiments, the terminal may detect, through interaction with the full-frequency sound box, whether the first communication part is connected to the second communication part. For example, the terminal obtains, from the full-frequency sound box, status information of a first port that corresponds to the first communication part and that is of the full-frequency sound box; and determines, based on the status information of the first port, whether the first communication part is connected to the second communication part. The status information of the first port is "0" when the first communication part is not connected to the second communication part. In this case, after obtaining the status "0", the terminal determines that the first communication part is not connected to the second communication part. When the first communication part is connected to the second communication part, the status information of the first port is "1". In this case, after obtaining the status "1", the terminal determines that the first communication part is connected to the second communication part.

It should be noted that the terminal may alternatively detect, by using another implementable method, whether the first communication part is connected to the second communication part. This is not limited in this embodiment of this application.

Operation 1602: The terminal sends to-be-played audio data to the full-frequency sound box when the terminal finds, through detection, that the first communication part is not connected to the second communication part.

With reference to descriptions of the to-be-played audio data in the foregoing embodiments, it can be learned that the to-be-played audio data may be raw audio data or target audio data. In this way, that the terminal sends to-be-played audio data to the full-frequency sound box may include the following two cases.

Case 1: The terminal sends the raw audio data to the full-frequency sound box.

It should be understood that when the terminal sends the raw audio data to the full-frequency sound box, the full-frequency sound box performs frequency division on the original data, and performs sound field extension processing on components of different frequency bands, to obtain target audio data and play the target audio data.

Case 2: The terminal sends the target audio data to the full-frequency sound box.

It should be understood that when the terminal sends the target audio data to the full-frequency sound box, the target audio data may be obtained by another device by performing frequency division and sound field extension processing on the raw audio data, and is sent to the full-frequency sound box. Then, the full-frequency sound box plays the target audio data. The another device may be the terminal, the low-frequency sound box, or a device other than the two devices. This is not limited in this embodiment of this application.

Operation 1603: The terminal sends audio data in one of the following manners of operation 1603*a* to operation 1603*c* when the terminal finds, through detection, that the first communication part is connected to the second communication part.

Operation 1603*a*: The terminal sends first audio data to the full-frequency sound box, and sends second audio data to the low-frequency sound box.

The first audio data is a medium-frequency component and/or a high-frequency component of the to-be-played audio data, and the second audio data is a low-frequency component of the to-be-played audio data.

Similarly, that the terminal sends audio data to the full-frequency sound box and the low-frequency sound box includes the following several cases.

Case 1: The terminal sends a medium-frequency component and/or a high-frequency component of the raw audio data to the full-frequency sound box, and sends a low-frequency component of the raw audio data to the low-frequency sound box.

In some embodiments, the terminal may perform frequency division on the raw audio data to obtain the medium-frequency component and/or the high-frequency component, and the low-frequency component of the raw audio data, then the terminal sends the medium-frequency component and/or the high-frequency component of the raw audio data to the full-frequency sound box, and the full-frequency sound box performs sound field extension processing on the medium-frequency component and/or the high-frequency component of the original data to obtain a medium-frequency component and/or a high-frequency component of the target audio data. In addition, the terminal sends the low-frequency component of the raw audio data to the low-frequency sound box, the low-frequency sound box performs sound field extension processing on the low-frequency component of the raw audio data to obtain a low-frequency component of the target audio data, and the low-frequency sound box plays the low-frequency component of the target audio data.

Case 2: The terminal sends a medium-frequency component and/or a high-frequency component of the target audio data to the full-frequency sound box, and sends a low-frequency component of the target audio data to the low-frequency sound box.

In some embodiments, the terminal or another device may perform frequency division on the raw audio data, separately perform sound field extension processing on a medium-frequency component and/or a high-frequency component, and a low-frequency component that are obtained through frequency division, send the medium-frequency component and/or the high-frequency component of the target audio data to the full-frequency sound box, and send the low-frequency component of the target audio data to the low-frequency sound box. Then the full-frequency sound box plays the medium-frequency component and/or the high-frequency component of the target audio data, and the low-frequency sound box plays the low-frequency component of the target audio data.

Operation 1603*b*: The terminal sends to-be-played audio data to the full-frequency sound box.

There are also two cases in which the terminal sends the to-be-played audio data to the full-frequency sound box. For details, refer to the foregoing operation 1602. Details are not described herein again.

It should be noted that when the to-be-played audio data sent by the terminal to the full-frequency sound box is the raw audio data, the full-frequency sound box performs frequency division on the raw audio data, and performs sound field extension processing to obtain the target audio data.

In some embodiments, after the full-frequency sound box obtains the target audio data, a manner of playing the target audio data includes the following two manners:

Manner 1: The full-frequency sound box plays the target audio data.

Manner 2: The full-frequency sound box plays the medium-frequency component and/or the high-frequency component of the target audio data, the full-frequency sound box sends the low-frequency component of the target audio data to the low-frequency sound box, and the low-frequency sound box plays the low-frequency component of the target audio data.

Operation 1603*c*: The terminal sends to-be-played audio data to the low-frequency sound box.

That the terminal sends the to-be-played audio data to the low-frequency sound box may include the following two cases.

Case 1: The terminal sends the raw audio data to the low-frequency sound box.

It should be understood that when the terminal sends the raw audio data to the low-frequency sound box, the low-frequency sound box performs frequency division on the original data, and performs sound field extension processing on components of different frequency bands, to obtain the target audio data. Then the low-frequency sound box plays the low-frequency component of the target audio data, and sends the medium-frequency component and/or the high-frequency component of the target audio data to the full-frequency sound box, and the full-frequency sound box plays the medium-frequency component and/or the high-frequency component.

Case 2: The terminal sends the target audio data to the low-frequency sound box.

It should be understood that when the terminal sends the target audio data to the low-frequency sound box, the target audio data may be obtained by another device by performing frequency division and sound field extension processing on the raw audio data, and is sent to the low-frequency sound box. Then, the low-frequency sound box plays the low-frequency component of the target audio data, the low-frequency sound box sends the medium-frequency component and/or the high-frequency component of the target audio data to the full-frequency sound box, and the full-frequency sound box plays the medium-frequency component and/or the high-frequency component, and sends the medium-frequency component and/or the high-frequency component to the full-frequency sound box.

According to the audio data processing method provided in this embodiment of this application, the terminal determines, by detecting whether the first communication part of the full-frequency sound box of the terminal is connected to the second communication part of the low-frequency sound box, to send the audio data to the full-frequency sound box and/or the low-frequency sound box, so that the full-frequency sound box processes the audio data and/or the low-frequency sound box processes the audio data. This achieves good sound field extension effect and improves sound quality.

Figure 17:
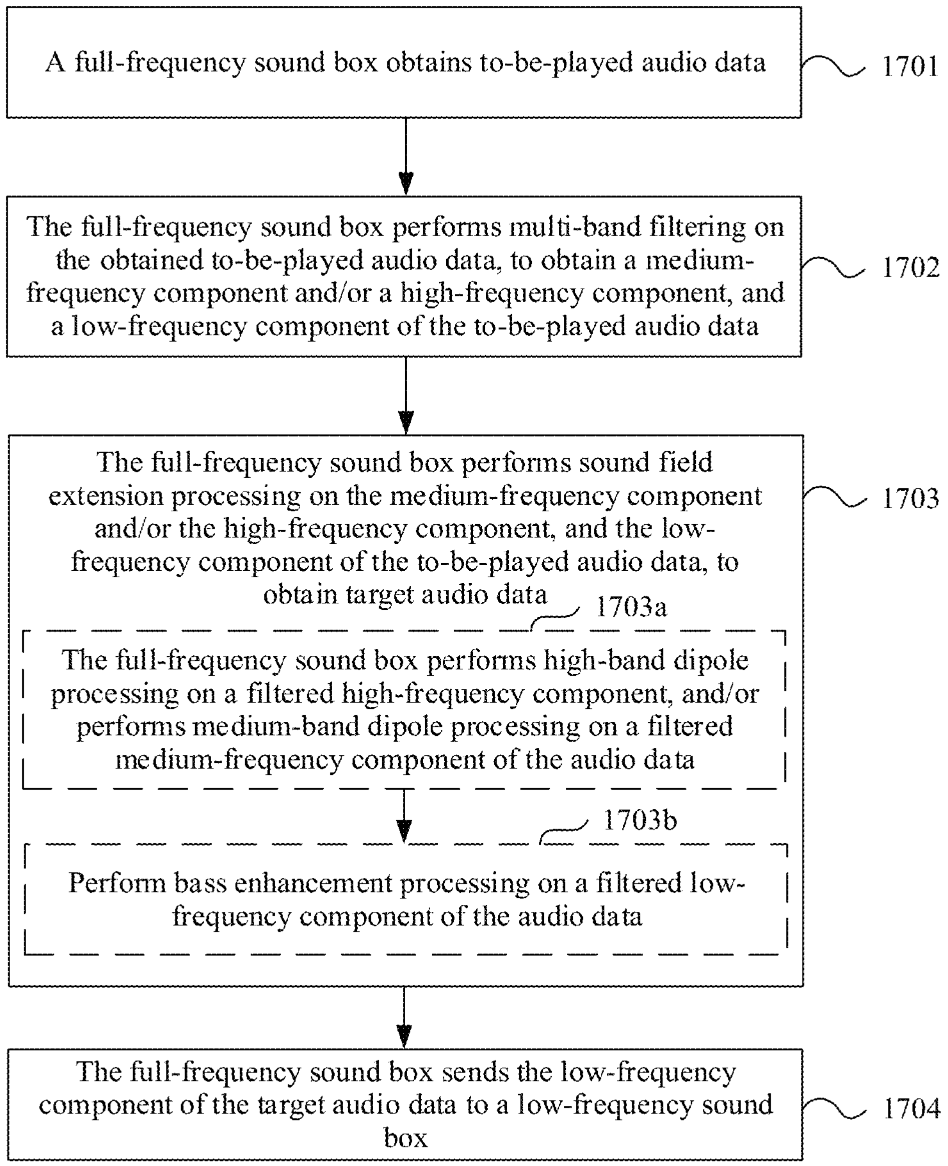
FIG. 17 is a schematic diagram of an audio data processing method according to an embodiment of this application.

As shown in FIG. 17, an embodiment of this application provides an audio data processing method. The method is applied to the foregoing full-frequency sound box, and includes operation 1701 to operation 1704.

Operation 1701: The full-frequency sound box obtains to-be-played audio data.

It should be understood that the to-be-played audio data is raw audio data. In some embodiments, the to-be-played audio data may be audio data received by the full-frequency sound box from the terminal, or audio data obtained by the full-frequency sound box from another device. This is not limited in this embodiment of this application.

Operation 1702: The full-frequency sound box performs multi-band filtering on the obtained to-be-played audio data, to obtain a medium-frequency component and/or a high-frequency component, and a low-frequency component of the to-be-played audio data.

In some embodiments, in this embodiment of this application, the multi-band filtering may include high-frequency filtering, band-pass filtering, and low-frequency filtering, and/or the multi-band filtering includes high-frequency filtering and low-frequency filtering. It should be understood that high-frequency filtering is performed on audio data to obtain a high-frequency component of the audio data, band-pass filtering is performed on the audio data to obtain a medium-frequency component of the audio data, and low-frequency filtering is performed on the audio data to obtain a low-frequency component of the audio data.

It should be noted that in this embodiment of this application, when multi-band filtering is performed on audio data, settings of a filtering frequency band are related to a distance between two speakers that are in a speaker pair constituting a dipole and that are in the full-frequency sound box. The filtering frequency band determines frequency bands corresponding to a filtered high-frequency component, medium-frequency component, and low-frequency component.

Operation 1703: The full-frequency sound box performs sound field extension processing on the medium-frequency component and/or the high-frequency component, and the low-frequency component of the to-be-played audio data, to obtain target audio data.

Operation 1703 includes operation 1703*a* and operation 1703*b*.

Operation 1703*a*: The full-frequency sound box performs high-band dipole processing on the high-frequency component of filtered audio data, and/or performs medium-band dipole processing on a medium-frequency component of the filtered audio data.

It may be understood that a sweet point region exists in a sound field of a speaker of a full-frequency sound box. The sweet point region is a region in which good sound effect can be achieved. Generally, the sweet point region is a region deviating from the center of the full-frequency sound box by a preset angle. A user (or a listener) has good listening experience when the user is located in the sweet point region. Binaural crosstalk occurs when the user is away from the sweet point region (for example, an included angle between the user and the center of the full-frequency sound box is greater than the preset angle). As a result, the user's listening experience becomes poor.

In this embodiment of this application, one pair of acoustic dipoles correspond to one pair of speakers, and signals with a same amplitude but different phases are played by using a pair of speakers. A horizontal direction is used as an example. A right channel corresponds to one acoustic dipole, and a left channel corresponds to one acoustic dipole. For example, when a right channel signal has large energy upon arrival at the left ear of the user, crosstalk occurs in the left and right ears, that is, the right channel signal interferes with the left ear. As a result, the sound field becomes narrowed. Crosstalk between the left and right ears is small when energy of the right channel signal upon arrival at the left ear of the user is small.

In this embodiment of this application, sound field extension processing is performed on the high-frequency component of the audio data according to a high-band dipole algorithm, and sound field extension processing is performed on the medium-frequency component of the audio data according to a medium-band dipole algorithm. For the right channel signal, the energy of the right channel signal upon arrival at the left ear can be decreased while it is ensured that energy of the right channel signal upon arrival at the right ear is not decreased. For a left channel signal, energy of the left channel signal upon arrival at the right ear can be decreased while it is ensured that energy of the left channel signal upon arrival at the left ear is not decreased. In this way, binaural crosstalk is canceled. In this embodiment of this application, the energy of the right channel signal upon arrival at the right ear of the user is larger if the energy of the right channel signal upon arrival at the left ear of the user is smaller. In this case, better binaural crosstalk cancellation effect is achieved. Similarly, the energy of the left channel signal upon arrival at the left ear is greater if the energy of the left channel signal upon arrival at the right ear is smaller. In this case, better binaural crosstalk cancellation effect is achieved.

Figure 18:
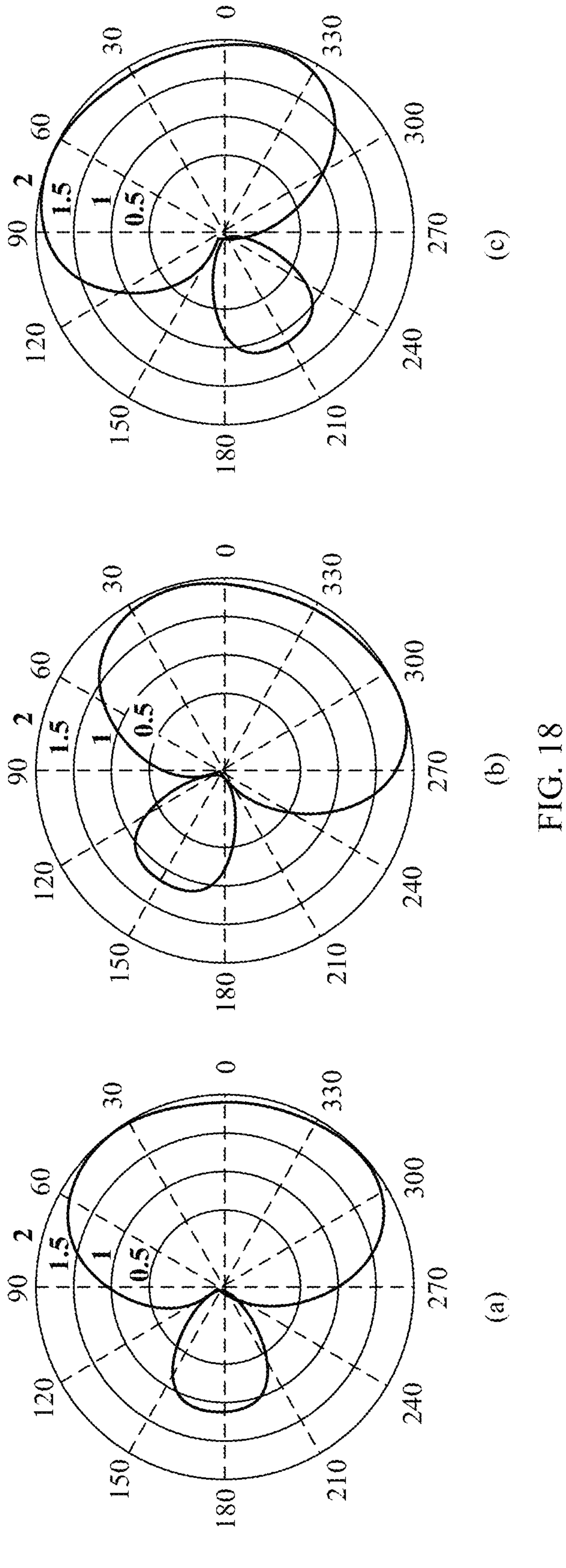
FIG. 18 is a diagram of directivity of a dipole corresponding to a right channel in an audio data processing method according to an embodiment of this application.

Directivity of a dipole changes after processing is performed according to a dipole algorithm. FIG. 18 is a directivity diagram of a dipole corresponding to a right channel. Crosstalk cancellation effect may be further displayed by using the directivity diagram of the dipole. The directivity diagram of the acoustic dipole corresponding to the right channel may be represented according to the following formula:

$$\left|2*\sin\left(\frac{w}{2}*\left(t_{delay}+\frac{d_{spk}*\cos(\varphi+\theta)}{c}\right)\right)\right|$$

where $w=2\pi f$;f is a frequency of the right channel signal; $t_{delay}$ is a difference between time of arrival, at the left and right ears, of a signal played by a speaker corresponding to a dipole; $d_{spk}$ is a distance between two speakers constituting a pair of acoustic dipoles; φ is a traversal angle of the directivity diagram; θ is a configuration parameter in a dipole processing algorithm, where the configuration parameter is a difference between phases for playing a signal by two speakers constituting a pair of acoustic dipoles; and C is a sound speed. The phase difference θ is related to a location of the user. Specifically, θ may be adjusted based on a location of the user to implement optimal crosstalk cancellation, that is, sound field extension effect.

(a) in FIG. 18 is used as an example. It should be noted that an angle on a circumference is φ (0 degrees to 360 degrees), and different circumferences correspond to different energy (for example, 0.5, 1, 1.5, and 2). (a) in FIG. 18 is a directivity diagram of the dipole corresponding to a case in which θ is 0 degrees. With reference to the directivity diagram, it can be learned that energy of a right channel signal upon arrival at the left ear is small, and energy of the right channel signal upon arrival at the right ear is large. Specifically, in (a) in FIG. 18, the user is located in front of the full-frequency sound box (in a 270-degree direction). If an included angle between the left ear of the user and the center of the full-frequency sound box is 30 degrees, a 240-degree direction in the figure is a direction in which the left ear of the user is located. In this case, corresponding θ is 0 degrees. It can be learned that energy of the right channel signal upon arrival at the left ear is small at around 240 degrees, and energy of the right channel signal upon arrival at the right ear is large at around 240 degrees.

(b) in FIG. 18 is a directivity diagram of the dipole corresponding to a case in which θ is 30 degrees, and (c) in FIG. 18 is a directivity diagram of the dipole corresponding to a case in which θ is −30 degrees. Similarly, in this case, energy of the right channel signal upon arrival at the left ear is small, and energy of the right channel signal upon arrival at the right ear is large.

In some embodiments, in this embodiment of this application, one frequency band corresponds to one or more pairs of acoustic dipoles. For example, a high frequency band corresponds to a plurality of pairs of acoustic dipoles. In this way, after being processed according to a high-band dipole algorithm, a high-frequency component obtained through high-frequency filtering is played by using speakers corresponding to the plurality of pairs of dipoles.

Operation 1703*b*: Perform bass enhancement processing on a low-frequency component of the filtered audio data.

In this embodiment of this application, the low-frequency component of the filtered audio data is processed according to the bass enhancement algorithm. In this way, energy of a low-frequency signal (that is, the low-frequency component) is dynamically increased without damaging a speaker (without exceeding a maximum displacement of a diaphragm), and therefore bass quality of the audio data is significantly improved.

It should be understood that, according to the bass enhancement algorithm, a parameter (e.g., a TS parameter) of a speaker is obtained in advance, and modeling is performed based on the parameter of the speaker, to obtain a processing model. For details, refer to an existing method. Details are not described in this embodiment of this application.

In some embodiments, after processing the raw audio data, the full-frequency sound box obtains the target audio data (which specifically includes a medium-frequency component and/or a high-frequency component, and a low-frequency component of the target audio data). The medium-frequency component and/or the high-frequency component of the target audio data are or is played by the full-frequency sound box.

Operation 1704: The full-frequency sound box sends the low-frequency component of the target audio data to the low-frequency sound box.

In this way, the low-frequency component of the target audio data is played by the low-frequency sound box, and low-frequency playing effect of the low-frequency sound box is superior to low-frequency playing effect of the full-frequency sound box.

In an embodiment, the full-frequency sound box may play the target audio data (including the medium-frequency component and/or the high-frequency component, and the low-frequency component) instead of sending the low-frequency component of the target audio data to the low-frequency sound box.

According to the audio data processing method provided in this embodiment of this application, after the full-frequency sound box completes sound field extension processing on audio data, in one aspect, the full-frequency sound box plays a high-frequency component and/or a medium-frequency component of audio data obtained through sound field extension processing. Sound quality of the medium-frequency component and/or the high-frequency component can be improved because the full-frequency sound box has good playing effects on a medium frequency and a high frequency. In another aspect, the full-frequency sound box sends a low-frequency component of the audio data obtained through sound field extension processing to the low-frequency sound box, and the low-frequency sound box plays the low-frequency component. Bass quality of the audio data can be improved because low-frequency playing effect of the low-frequency sound box is superior to low-frequency playing effect of the full-frequency sound box.

Figure 19:
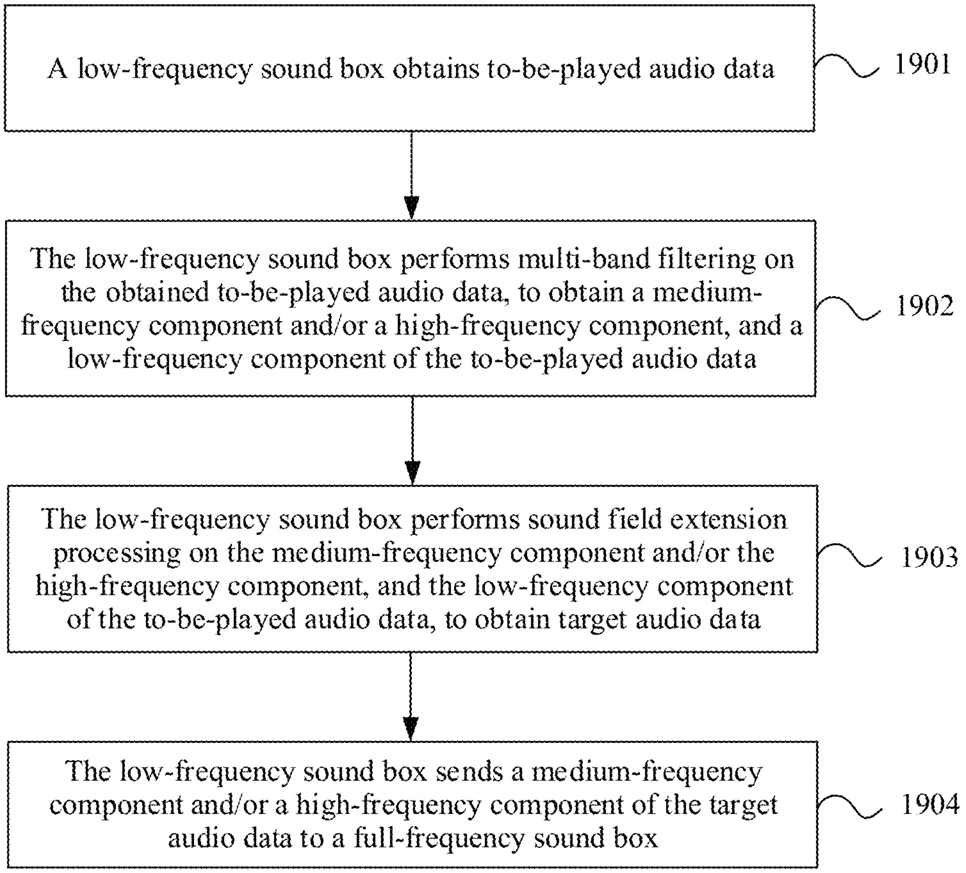
FIG. 19 is a schematic diagram of an audio data processing method according to an embodiment of this application.

As shown in FIG. 19, an embodiment of this application provides an audio data processing method. The method is applied to a low-frequency sound box, and includes operation 1901 to operation 1904.

Operation 1901: A low-frequency sound box obtains to-be-played audio data.

It should be understood that the to-be-played audio data is raw audio data. In some embodiments, the to-be-played audio data may be audio data received by the low-frequency sound box from a terminal, or audio data obtained by the low-frequency sound box from another device. This is not limited in this embodiment of this application.

Operation 1902: The low-frequency sound box performs multi-band filtering on the obtained to-be-played audio data, to obtain a medium-frequency component and/or a high-frequency component, and a low-frequency component of the to-be-played audio data.

Operation 1903: The low-frequency sound box performs sound field extension processing on the medium-frequency component and/or the high-frequency component, and the low-frequency component of the to-be-played audio data, to obtain target audio data.

It should be noted that the method for performing multi-band filtering and sound field extension processing on the to-be-played audio data by the low-frequency sound box is the same as the method for performing multi-band filtering and sound field extension processing on the to-be-played audio data by a full-frequency sound box. For details, refer to descriptions in the foregoing embodiments. Details are not described herein again.

Operation 1904: The low-frequency sound box sends a medium-frequency component and/or a high-frequency component of the target audio data to the full-frequency sound box.

In this embodiment of this application, after the low-frequency sound box completes sound field extension processing on the audio data, in one aspect, a low-frequency component obtained through bass enhancement processing is played by using a woofer of the low-frequency sound box. Bass quality of the audio data can be improved because the low-frequency component of the audio data is played by a dedicated low-frequency speaker in the low-frequency sound box. In another aspect, the low-frequency sound box sends a high-frequency component and/or a medium-frequency component of audio data obtained through sound field extension processing to the full-frequency sound box, and then the full-frequency sound box plays the high-frequency component and/or the medium-frequency component. Sound quality of the medium-frequency component and/or the high-frequency component can be improved because the full-frequency sound box has good playing effects on a medium frequency and a high frequency.

According to the audio data processing method provided in this embodiment of this application, layout of a speaker of the full-frequency sound box in the sound box system and the foregoing sound field extension algorithm (which includes the high-band dipole algorithm, the medium-band dipole algorithm, and the bass enhancement algorithm) cooperate with each other to achieve wider sound field effect.

In some embodiments, in this embodiment of this application, the audio data is multi-channel audio data. For example, multi-channel is dual-channel, including a left channel (L) and a right channel (R). For another example, multi-channel includes a left channel (L), a left surround channel (Ls), a left rear channel (Lb), an upper left channel (Lh), a right channel (R), a right surround channel (Rs), a right rear channel (Rb), an upper right channel (Rh), a center channel (C).

For example, the full-frequency sound box in the sound box system is a ring-shaped full-frequency sound box including eight speakers. For layout of the eight speakers of the ring-shaped full-frequency sound box, refer to (a) in FIG. 2. The following separately describes how the speakers and the sound field extension algorithm cooperate with each other by using examples in which the audio data is dual-channel audio data and multi-channel audio data.

Figure 20:
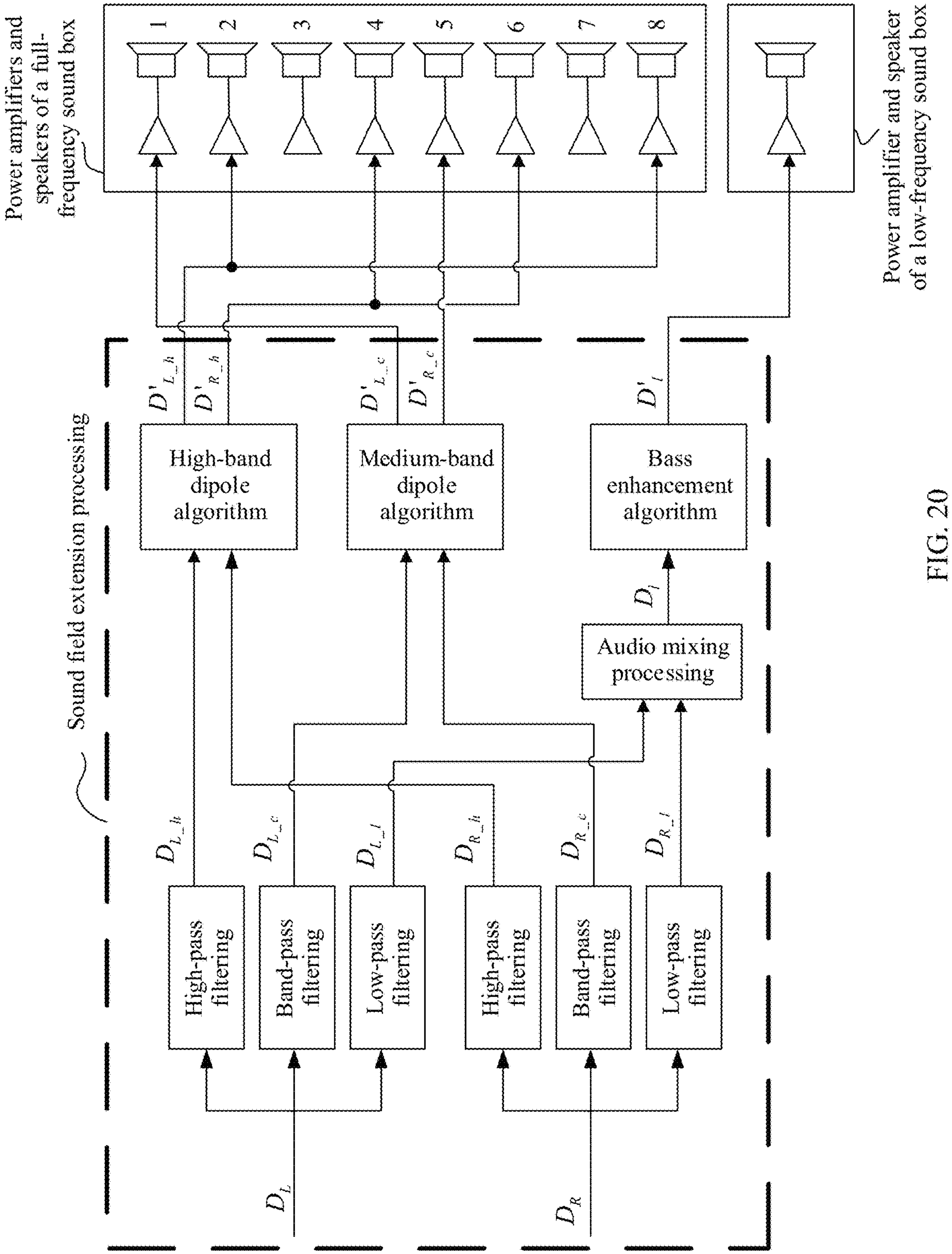
FIG. 20 is a schematic flowchart of dual-channel audio data processing according to an embodiment of this application.

When a first communication part of the full-frequency sound box in the sound box system is connected to a second communication part of the low-frequency sound box, after the low-frequency sound box obtains to-be-played dual-channel audio data (including a left channel signal and a right channel signal), with reference to FIG. 20, a processing procedure of the dual-channel audio data includes:

Operation 2001: The low-frequency sound box performs high-frequency filtering, medium-frequency filtering, and low-frequency filtering on the left channel (L) signal, to obtain a high-frequency component of the left channel signal, a medium-frequency component of the left channel signal, and a low-frequency component of the left channel signal.

Operation 2002: The low-frequency sound box performs high-frequency filtering, medium-frequency filtering, and low-frequency filtering on the right channel (R) audio signal, to obtain a high-frequency component of the right channel signal, a medium-frequency component of the right channel signal, and a low-frequency component of the right channel signal.

For ease of description, in this embodiment of this application, the left channel signal is denoted as $D_L$, the high-frequency component of the left channel signal is denoted as $D_{L\_h}$, the medium-frequency component of the left channel signal is denoted as $D_{L\_c}$, and the low-frequency component of the left channel signal is denoted as $D_{L\_l}$. The right channel signal is denoted as $D_R$, the high-frequency component of the right channel signal is denoted as $D_{R\_h}$, the medium-frequency component of the left channel signal is denoted as $D_{R\_c}$, and the low-frequency component of the left channel signal is denoted as $D_{R\_l}$.

Operation 2003: The low-frequency sound box performs high-band dipole processing on the high-frequency component $D_{L-h}$ of the left channel signal and the high-frequency component $D_{R\_h}$ of the right channel signal, to obtain a processed high-frequency component $D'_{L\_h}$ of the left channel signal and a processed high-frequency component $D'_{R\_h}$ of the right channel signal.

Operation 2004: The low-frequency sound box performs medium-band dipole processing on the medium-frequency component $D_{L\_c}$ of the left channel signal and the medium-frequency component $D_{R\_c}$ of the right channel signal, to obtain a processed medium-frequency component $D'_{L\_c}$ of the left channel signal and a medium-frequency component $D'_{R\_c}$ of the right channel signal.

Operation 2005: The low-frequency sound box performs audio mixing processing on the low-frequency component $D_{L\_l}$ of the left channel signal and the low-frequency component $D_{R\_l}$ of the right channel signal to obtain a mixed low-frequency component $D_l$, and then performs bass enhancement processing on the low-frequency component $D_l$ to obtain a low-frequency component $D'_l$ of processed audio data; and the low-frequency sound box plays a low-frequency component $D'_l$ of the processed audio data.

In this embodiment of this application, a mixed low-frequency component obtained through audio mixing processing satisfies: $D_l = D_{L\_l} + D_{R\_l}$.

Operation 2006: The low-frequency sound box sends a high-frequency component $D'_{L\_h}$ and a medium-frequency component $D'_{L\_c}$ of a left channel signal obtained through sound field extension processing, and a high-frequency component $D'_{R\_h}$ and a medium-frequency component $D'_{R\_c}$ of a right channel signal obtained through sound field extension processing to the full-frequency sound box.

It should be understood that the high-frequency components and the medium-frequency components are played by corresponding speakers of the full-frequency sound box.

In this embodiment of this application, that a corresponding speaker of the full-frequency sound box plays audio data means that a speaker pair constituting an acoustic dipole in a horizontal direction plays audio data (including a high-frequency component and a medium-frequency component) obtained through sound field extension in the horizontal direction. Specifically, a closer speaker pair plays the high-frequency component, and a farther speaker pair plays the medium-frequency component.

For example, with reference to (a) in FIG. 2, in this embodiment of this application, the speaker 2 and the speaker 4 constitute a pair of acoustic dipoles in the horizontal direction, and are configured to play a high-frequency component obtained through sound field extension in the horizontal direction. The speaker 6 and the speaker 8 constitute a pair of acoustic dipoles in the horizontal direction, and are configured to play a high-frequency component obtained through sound field extension in the horizontal direction. The speaker 1 and the speaker 5 constitute a pair of acoustic dipoles in the horizontal direction, and are configured to play a medium-frequency component obtained through sound field extension in the horizontal direction.

In some embodiments, one frequency band corresponds to one or more speaker pairs. For example, a high frequency band (that is, the foregoing high-frequency component) corresponds to two speaker pairs.

Correspondingly, Table 1 is an example of a correspondence between each component of audio data and a speaker of the full-frequency sound box.

TABLE 1

| Speaker | Audio data |
|---|---|
| 1 | $D'_{L\_c}$ |
| 2 | $D'_{L\_h}$ |
| 3 | — |
| 4 | $D'_{L\_h}$ |
| 5 | $D'_{R\_c}$ |
| 6 | $D'_{R\_h}$ |
| 7 | — |
| 8 | $D'_{L\_h}$ |

It should be noted that "/" in Table 1 indicates that there is no data, that is, the speaker 3 and the speaker 7 do not play audio data.

In conclusion, it can be learned that performing sound field extension processing on the dual-channel audio data is performing sound field extension processing on the audio data in the horizontal direction.

Figure 21:
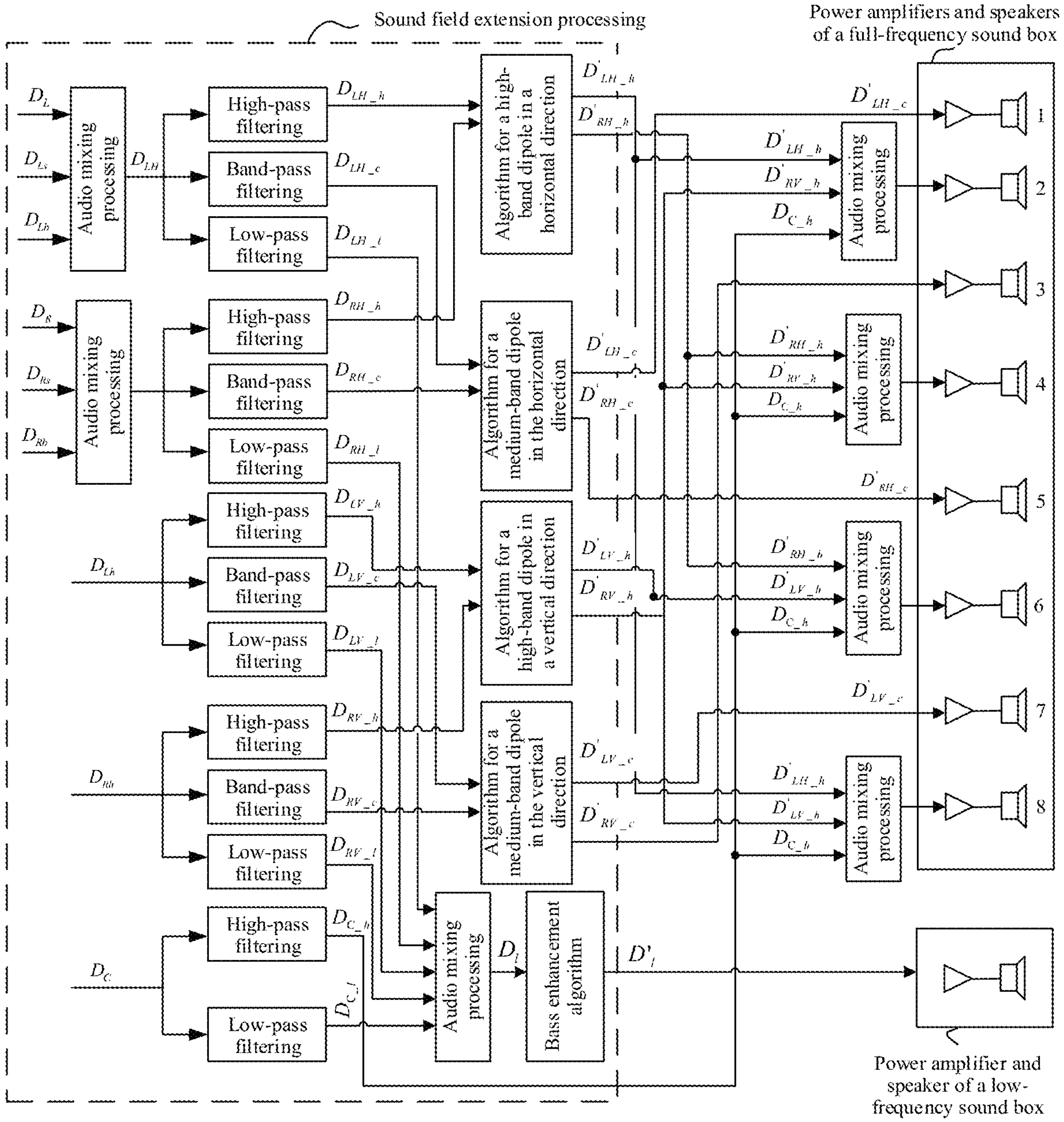
FIG. 21 is a schematic flowchart of multi-channel audio data processing according to an embodiment of this application.

When a first communication part of the full-frequency sound box in the sound box system is connected to a second communication part of the low-frequency sound box, after the low-frequency sound box receives to-be-played multi-channel (including a left channel, a left surround channel, a left rear channel, an upper left channel, a right channel, a right surround channel, a right rear channel, an upper right channel, and a center channel) audio data, with reference to FIG. 21, a processing procedure of the multi-channel audio data includes the following operations.

Operation 2101: The low-frequency sound box mixes audio data of the left channel (L), the left surround channel (Ls), and the left rear channel (Lb) to obtain a horizontal left channel signal.

In this embodiment of this application, the left channel signal is denoted as $D_L$, the audio data of the left surround channel is denoted as $D_{15}$, and the audio data of the left rear channel is denoted as $D_{Lb}$. In this case, the horizontal left channel signal is $D_{LH}=D_L+D_{Ls}+D_{Lb}$.

Operation 2102: The low-frequency sound box performs high-frequency filtering, medium-frequency filtering, and low-frequency filtering on the horizontal left channel signal $D_{LH}$ to obtain a high-frequency component $D_{LH\_h}$ of the horizontal left channel signal, a medium-frequency component $D_{LH\_c}$ of the horizontal left channel signal, and a low-frequency component $D_{LH\_1}$ of the horizontal left channel signal.

Operation 2103: The low-frequency sound box mixes the audio data of the right channel (R), the right surround channel (Rs), and the right rear channel (Rb) to obtain a horizontal right channel signal.

In this embodiment of this application, the right channel signal is denoted as $D_R$, the audio data of the right surround channel is denoted as $D_{Rs}$, and the audio data of the right rear channel is denoted as $D_{Rb}$. In this case, the horizontal right channel signal is $D_{RH}=D_R+D_{Rs}+D_{Rb}$.

Operation 2104: The low-frequency sound box performs high-frequency filtering, medium-frequency filtering, and low-frequency filtering on the horizontal right channel signal $D_{RH}$ to obtain a high-frequency component $D_{RH\_c}$ of the horizontal right channel signal, a medium-frequency component $D_{RH\_c}$ of the horizontal right channel signal, and a low-frequency component $D_{RH\_l}$ of the horizontal right channel signal.

Operation 2105: The low-frequency sound box performs high-frequency filtering, medium-frequency filtering, and low-frequency filtering on the audio data D Lh of the upper left channel (Lh), to obtain a high-frequency component $D_{LV\_h}$ of a vertical left channel signal, a medium-frequency component $D_{LV\_c}$ of the vertical left channel signal, and a low-frequency component $D_{LV\_l}$ of the vertical left channel signal.

It should be understood that the audio data of the upper left channel is a left channel signal in a vertical direction, which is a vertical left channel signal for short below.

Operation 2106: The low-frequency sound box performs high-frequency filtering, medium-frequency filtering, and low-frequency filtering on the audio data $D_{Rh}$ of the upper right channel (Rh), to obtain a high-frequency component $D_{RV\_h}$ of a vertical right channel signal, a medium-frequency component $D_{RV\_c}$ of the vertical right channel signal, and a low-frequency component $D_{RV\_l}$ of the vertical right channel signal.

It should be understood that the audio data of the upper right channel is a right channel signal in a vertical direction, which is a vertical right channel signal for short below.

Operation 2107: The low-frequency sound box performs high-frequency filtering and low-frequency filtering on the audio data $D_c$ of the center channel (C), to obtain a high-frequency component $D_{C\_h}$ of the audio data of the center channel and a low-frequency component $D_{C\_l}$ of the audio data of the center channel.

Operation 2108: The low-frequency sound box performs high-band dipole processing on the high-frequency component $D_{LH\_h}$ of the horizontal left channel signal and the high-frequency component $D_{RH\_h}$ of the horizontal right channel signal in a horizontal direction, to obtain a processed high-frequency component $D'_{LH\_h}$ of the horizontal left channel signal and a processed high-frequency component $D'_{RH\_h}$ of the horizontal right channel signal.

Operation 2109: The low-frequency sound box performs medium-band dipole processing on the medium-frequency component $D_{LH\_c}$ of the horizontal left channel signal and the medium-frequency component $D_{RH\_c}$ of the horizontal right channel signal in the horizontal direction, to obtain a processed medium-frequency component $D'_{LH\_c}$ of the horizontal left channel signal and a processed medium-frequency component $D'_{RH\_c}$ of the horizontal right channel signal.

Operation 2110: The low-frequency sound box performs high-band dipole processing on the high-frequency component $D_{LV\_h}$ of the vertical left channel signal and the high-frequency component $D_{RV\_h}$ of the vertical right channel signal in a vertical direction, to obtain a processed high-frequency component $D'_{LV\_h}$ of the vertical left channel signal and a processed high-frequency component $D'_{RV\_h}$ of the vertical right channel signal.

Operation 2111: The low-frequency sound box performs medium-band dipole processing on the medium-frequency component $D_{LV\_c}$ of the vertical left channel signal and the medium-frequency component $D_{RV\_c}$ of the vertical right channel signal in the vertical direction, to obtain a processed medium-frequency component $D'_{LV\_c}$ of the vertical left channel signal and a processed medium-frequency component $D'_{RV\_c}$ of the vertical right channel signal.

Operation 2112: The low-frequency sound box performs audio mixing processing on the low-frequency component $D_{LH\_l}$ of the horizontal left channel signal, the low-frequency component $D_{RH\_l}$ of the horizontal right channel signal, the low-frequency component $D_{LV\_l}$ of the vertical left channel signal, the low-frequency component $D_{RV\_l}$ of the vertical right channel signal, and the low-frequency component $D_{C\_l}$ of the audio data of the center channel, to obtain a mixed low-frequency component $D_l$; and then performs bass enhancement processing on the low-frequency component $D_l$ to obtain a low-frequency component $D'_l$ of processed audio data.

It should be understood that the low-frequency component of the processed audio data is played by the low-frequency sound box.

In this embodiment of this application, a mixed low-frequency component obtained through audio mixing processing satisfies:

$$D_l=D_{LH\_l}+D_{RH\_l}+D_{LV\_l}+D_{RV\_l}+D_{C\_l}$$

Operation 2113: The low-frequency sound box performs audio mixing processing on a high-frequency component and a medium-frequency component of audio data obtained through sound field extension processing, and sends audio data obtained through audio mixing processing to the full-frequency sound box.

Operation 2114: The full-frequency sound box receives audio data that is obtained through audio mixing processing and that is sent by the low-frequency sound box.

It should be understood that the audio data obtained through audio mixing processing is played by a corresponding speaker of the full-frequency sound box.

In this embodiment of this application, that a corresponding speaker of the full-frequency sound box plays the audio data means that a speaker pair constituting an acoustic dipole in the horizontal direction plays audio data (including a high-frequency component and a medium-frequency component) obtained through sound field extension in the horizontal direction. Specifically, a closer speaker pair plays the high-frequency component, and a farther speaker pair plays the medium-frequency component, and in addition, a speaker pair constituting an acoustic dipole in the vertical direction plays audio data (including a high-frequency component and a medium-frequency component) obtained through sound field extension in the vertical direction. Specifically, a closer speaker pair plays the high-frequency component, and a farther speaker pair plays the medium-frequency component.

For example, with reference to (a) in FIG. 2, in this embodiment of this application, the speaker 4 and the speaker 6 constitute a pair of acoustic dipoles in the vertical direction, and are configured to play a high-frequency component obtained through sound field extension in the vertical direction. The speaker 2 and the speaker 8 constitute a pair of acoustic dipoles in the vertical direction, and are configured to play a high-frequency component obtained through sound field extension in the vertical direction. The speaker 3 and the speaker 7 constitute a pair of acoustic dipoles in the vertical direction, and are configured to play a medium-frequency component obtained through sound field extension in the vertical direction. In addition, the speaker 2 and the speaker 4 constitute a pair of acoustic dipoles in the horizontal direction, and are configured to play a high-frequency component obtained through sound field extension in the horizontal direction. The speaker 6 and the speaker 8 constitute a pair of acoustic dipoles in the horizontal direction, and are configured to play a high-frequency component obtained through sound field extension in the horizontal direction. The speaker 1 and the speaker 5 constitute a pair of acoustic dipoles in the horizontal direction, and are configured to play a medium-frequency component obtained through sound field extension in the horizontal direction.

Similarly, one frequency band corresponds to one or more speaker pairs.

Correspondingly, Table 2 is an example of a correspondence between each component of audio data and a speaker of the full-frequency sound box.

TABLE 2

| Speaker | Audio data |
|---|---|
| 1 | $D'_{LH\_c}$ |
| 2 | $D'_{LH\_h} + D'_{RV\_h} + D'_{C\_h}$ |
| 3 | $D'_{RV\_c}$ |
| 4 | $D'_{RH\_h} + D'_{RV\_h} + D'_{C\_h}$ |
| 5 | $D'_{RH\_c}$ |
| 6 | $D'_{RH\_h} + D'_{LV\_h} + D'_{C\_h}$ |
| 7 | $D'_{LV\_c}$ |
| 8 | $D'_{LH\_h} + D'_{LV\_h} + D'_{C\_h}$ |

So far, it may be understood that the foregoing audio mixing processing is specifically: mixing the high-frequency component $D'_{LH\_h}$ of the horizontal left channel signal, the high-frequency component $D'_{RV\_h}$ of the vertical right channel signal, and the high-frequency component $D_{C\_h}$ of the center channel; mixing the high-frequency component $D'_{RH\_h}$ of the horizontal right channel signal, the high-frequency component $D'_{RV\_h}$ of the vertical right channel signal, and the high-frequency component $D_{C\_h}$ of the center channel; mixing the high-frequency component $D'_{RH\_h}$ of the horizontal right channel signal, the high-frequency component $D'_{LV\_h}$ of the vertical left channel signal, and the high-frequency component $D_{C\_h}$ of the center channel; and mixing the high-frequency component $D'_{LH\_h}$ of the horizontal left channel signal, the high-frequency component $D'_{LV\_h}$ of the vertical left channel signal, and the high-frequency component $D_{C\_h}$ of the center channel.

In conclusion, it can be learned that performing sound field extension processing on the multi-channel audio data is performing sound field extension processing in the horizontal direction and sound field extension processing in the vertical direction on the audio data. In this way, three-dimensional sound field effect can be generated.

Similarly, in the sound box system, the first communication part of the full-frequency sound box is not connected to the second communication part of the low-frequency sound box, or the first communication part of the full-frequency sound box is connected to the second communication part of the low-frequency sound box, but the full-frequency sound box independently processes audio data. When the low-frequency sound box does not participate in audio data processing, how a speaker and a sound field extension algorithm cooperate with each other is described by using the dual-channel audio data and the multi-channel audio data as examples.

Figure 22:
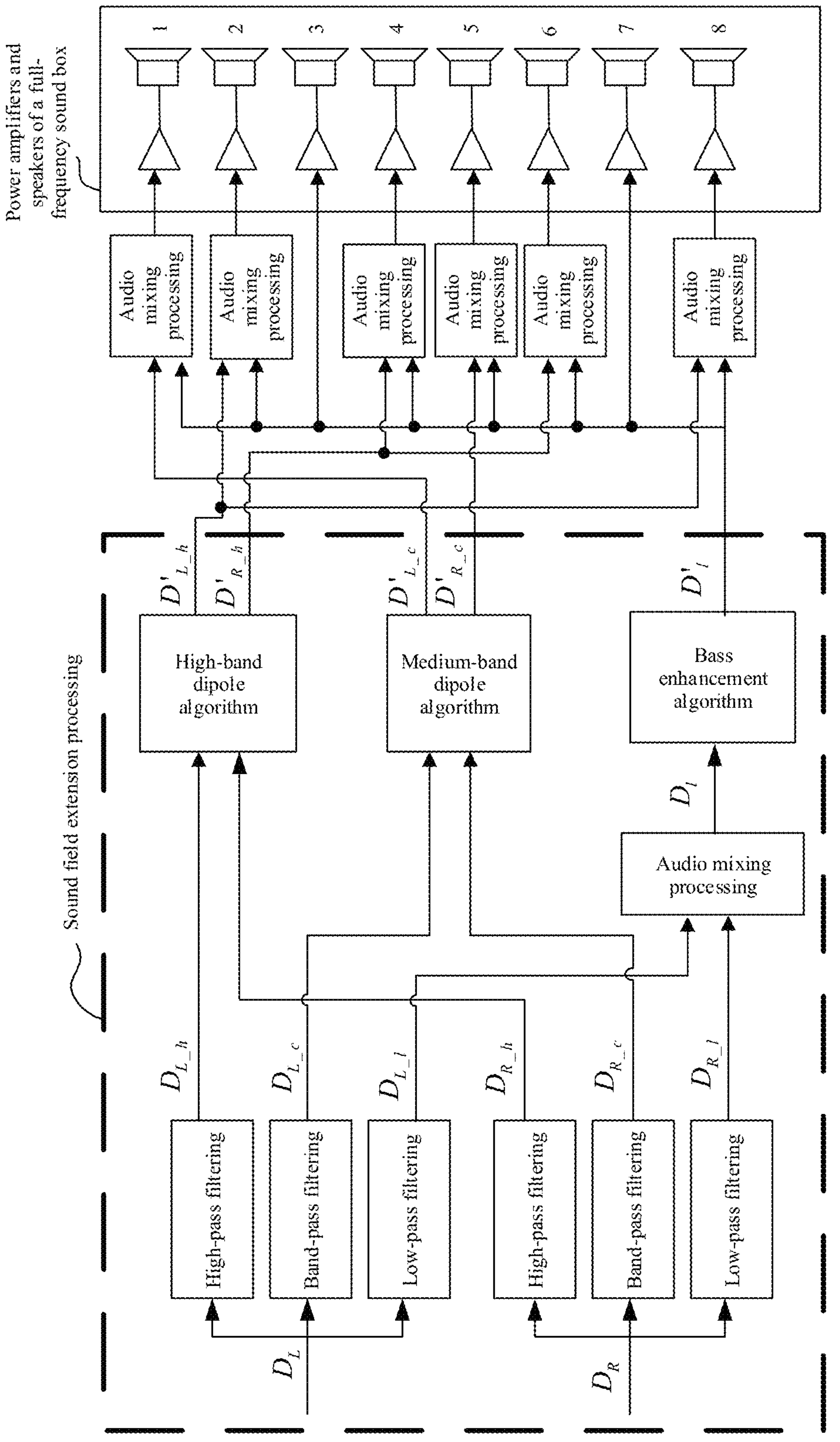
FIG. 22 is a schematic flowchart of dual-channel audio data processing according to an embodiment of this application.

When the audio data is dual-channel audio data (including a left channel signal and a right channel signal), the full-frequency sound box performs sound field extension processing on the dual-channel audio data, and plays audio data obtained through sound field extension processing. With reference to (a) in FIG. 2 and FIG. 22, the speaker 2 and the speaker 4 constitute a pair of acoustic dipoles in the horizontal direction, and are configured to play a high-frequency component obtained through sound field extension in the horizontal direction. The speaker 6 and the speaker 8 constitute a pair of acoustic dipoles in the horizontal direction and are configured to play a high-frequency component obtained through sound field extension in the horizontal direction. The speaker 1 and the speaker 5 constitute a pair of acoustic dipoles in the horizontal direction, and are configured to play a medium-frequency component obtained through sound field extension in the horizontal direction.

It should be noted that, different from that in FIG. 20, a low-frequency component of audio data obtained through bass enhancement processing is mixed with another high-frequency component or medium-frequency component, and is played by a speaker of the full-frequency sound box. Correspondingly, with reference to FIG. 22, Table 3 is an example of a correspondence between each component of audio data and a speaker of the full-frequency sound box.

TABLE 3

| Speaker | Audio data |
|---|---|
| 1 | $D'_{L\_c} + D'_l$ |
| 2 | $D'_{L\_h} + D'_l$ |
| 3 | $D'_l$ |
| 4 | $D'_{L\_h} + D'_l$ |
| 5 | $D'_{R\_c} + D'_l$ |
| 6 | $D'_{R\_h} + D'_l$ |
| 7 | $D'_l$ |
| 8 | $D'_{L\_h} + D'_l$ |

The audio data is multi-channel audio data (including the left channel, the left surround channel, the left rear channel, the upper left channel, the right channel, the right surround channel, the right rear channel, the upper right channel, and the center channel), the full-frequency sound box performs sound field extension processing on the multi-channel audio data, and plays audio data obtained through sound field extension processing. With reference to (a) in FIG. 2 and FIG. 23, the speaker 4 and the speaker 6 constitute a pair of acoustic dipoles in the vertical direction, and are configured to play a high-frequency component obtained through sound field extension in the vertical direction. The speaker 2 and the speaker 8 constitute a pair of acoustic dipoles in the vertical direction, and are configured to play a high-frequency component obtained through sound field extension in the vertical direction. The speaker 3 and the speaker 7 constitute a pair of acoustic dipoles in the vertical direction, and are configured to play a medium-frequency component obtained through sound field extension in the vertical direction. In addition, the speaker 2 and the speaker 4 constitute a pair of acoustic dipoles in the horizontal direction, and are configured to play a high-frequency component obtained through sound field extension in the horizontal direction. The speaker 6 and the speaker 8 constitute a pair of acoustic dipoles in the horizontal direction, and are configured to play a high-frequency component obtained through sound field extension in the horizontal direction. The speaker 1 and the speaker 5 constitute a pair of acoustic dipoles in the horizontal direction, and are configured to play a medium-frequency component obtained through sound field extension in the horizontal direction.

It should be noted that, different from that in FIG. 21, a low-frequency component of audio data obtained through bass enhancement processing is mixed with another high-frequency component or medium-frequency component, and is played by a speaker of the full-frequency sound box.

Figure 23:
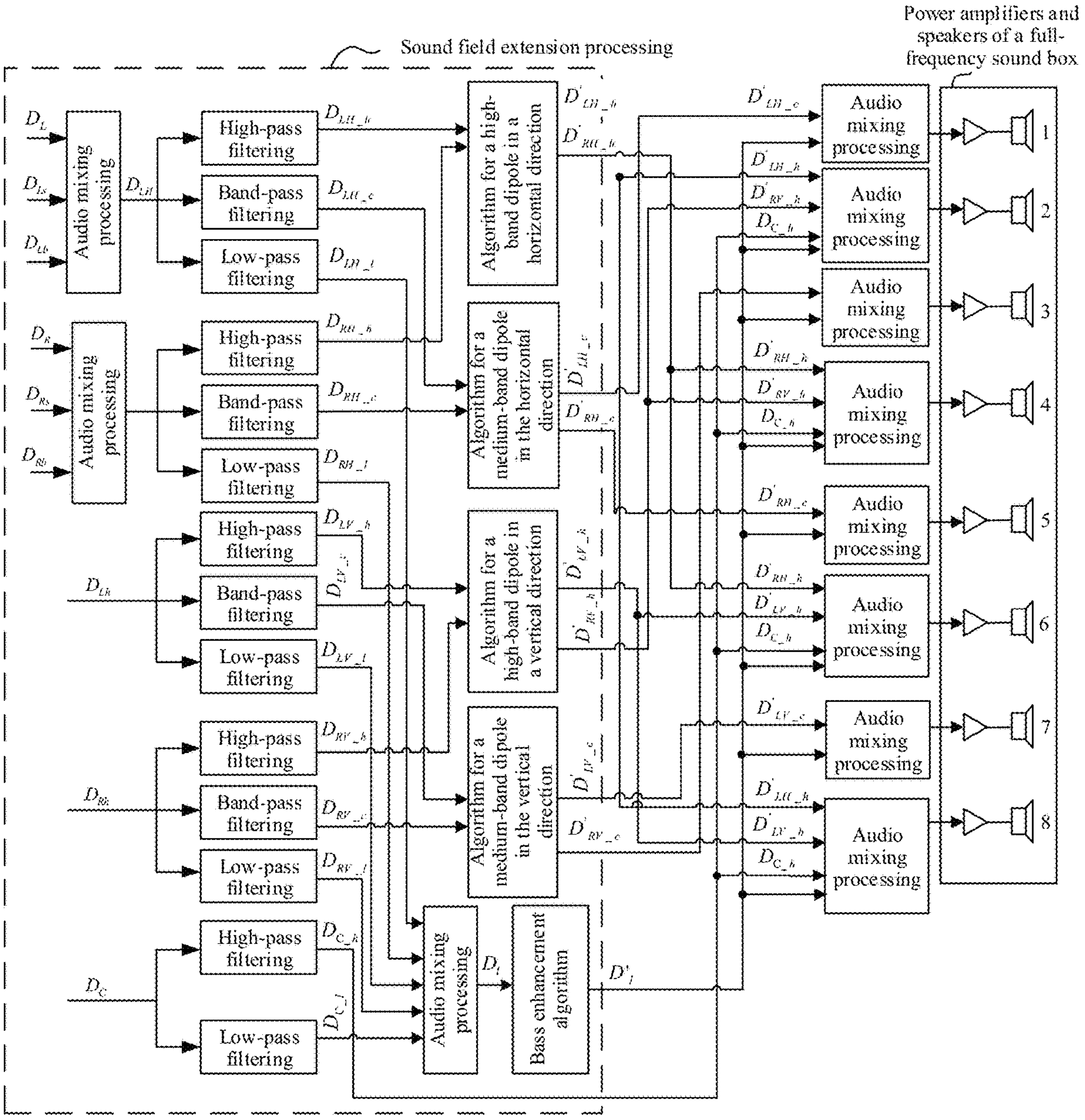
FIG. 23 is a schematic flowchart of multi-channel audio data processing according to an embodiment of this application.

Correspondingly, with reference to FIG. 23, Table 4 is an example of a correspondence between each component of audio data and a speaker of the full-frequency sound box.

TABLE 4

| Speaker | Audio data |
|---|---|
| 1 | $D'_{LH\_c} + D'_l$ |
| 2 | $D'_{LH\_h} + D'_{RV\_h} + D'_{C\_h} + D'_l$ |
| 3 | $D'_{RV\_c} + D'_l$ |
| 4 | $D'_{RH\_h} + D'_{RV\_h} + D'_{C\_h} + D'_l$ |
| 5 | $D'_{RH\_c} + D'_l$ |
| 6 | $D'_{RH\_h} + D'_{LV\_h} + D'_{C\_h} + D'_l$ |
| 7 | $D'_{LV\_c} + D'_l$ |
| 8 | $D'_{LH\_h} + D'_{LV\_h} + D'_{C\_h} + D'_l$ |

Figure 24:
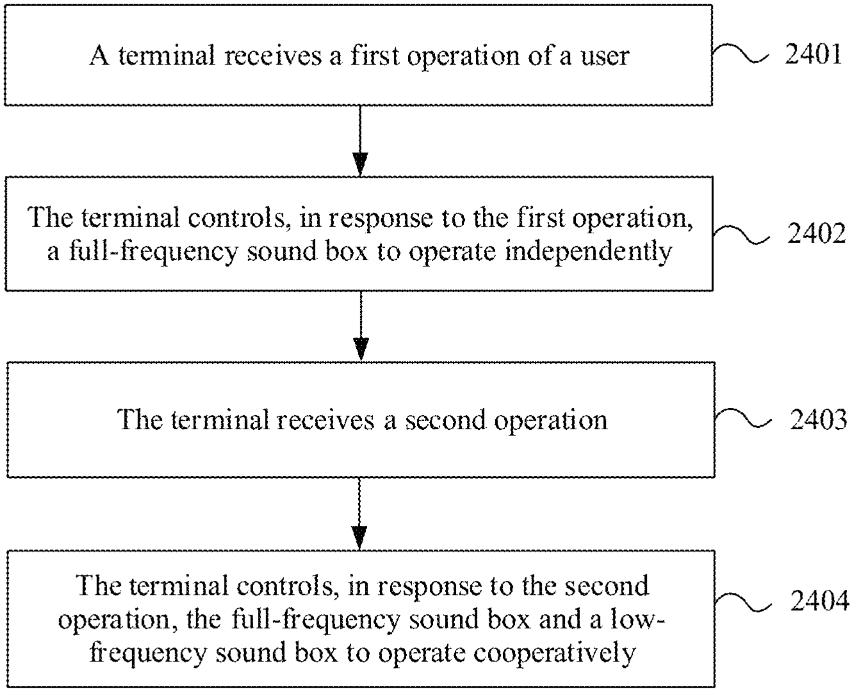
FIG. 24 is a schematic diagram of an audio data processing method according to an embodiment of this application.

In another embodiment, an embodiment of this application provides an audio data processing method. The method is applied to a scenario in which a terminal establishes communication connection to the foregoing sound box system. The sound box system includes a full-frequency sound box and a low-frequency sound box. A first communication part of the full-frequency sound box is connected to a second communication part of the low-frequency sound box. The full-frequency sound box includes a first fastening part, the first communication part is disposed on the first fastening part, the low-frequency sound box includes a second fastening part, the second communication part is disposed on the second fastening part, and the full-frequency sound box is physically connected to or detached from the low-frequency sound box by using the first fastening part and the second fastening part. The full-frequency sound box and the low-frequency sound box are enabled to communicate with each other by using the first communication part and the second communication part. The first communication part and the second communication part support multi-channel audio data transmission. As shown in FIG. 24, the method includes operation 2401 to operation 2404.

Operation 2401: The terminal receives a first operation of a user.

Operation 2402: The terminal controls, in response to the first operation, the full-frequency sound box to operate independently.

The first operation is a selection operation performed by the user on a first option in a first interface of the terminal, and the first option corresponds to that the full-frequency sound box operates independently. That the full-frequency sound box operates independently means that the full-frequency sound box plays target audio data.

In some embodiments, the first operation may be a touchscreen operation, a button-pressing operation, or the like. This is not specifically limited in this embodiment of the present invention. For example, the touchscreen operation is a pressing operation, a touch and hold operation, a slide operation, a tap operation, a floating operation (an operation performed by the user near a touchscreen), or the like performed by the user on the touchscreen of the terminal. The button-pressing operation corresponds to an operation, for example, a click operation, a double-click operation, a touch and hold operation, or a combined button-pressing operation performed by the user on a button, for example, a power button, a volume button, or a home button of the terminal.

In an application scenario of this embodiment of this application, a full-frequency sound box application is installed on the terminal. After the user starts the full-frequency sound box application and establishes communication connection to the sound box system, the terminal displays the first interface, and the user may perform a corresponding operation in the first interface, to control the sound box system to operate in different operating modes. Herein, the operating modes of the sound box system include: The full-frequency sound box operates independently, and the full-frequency sound box and the low-frequency sound box operate cooperatively.

Figure 25A:
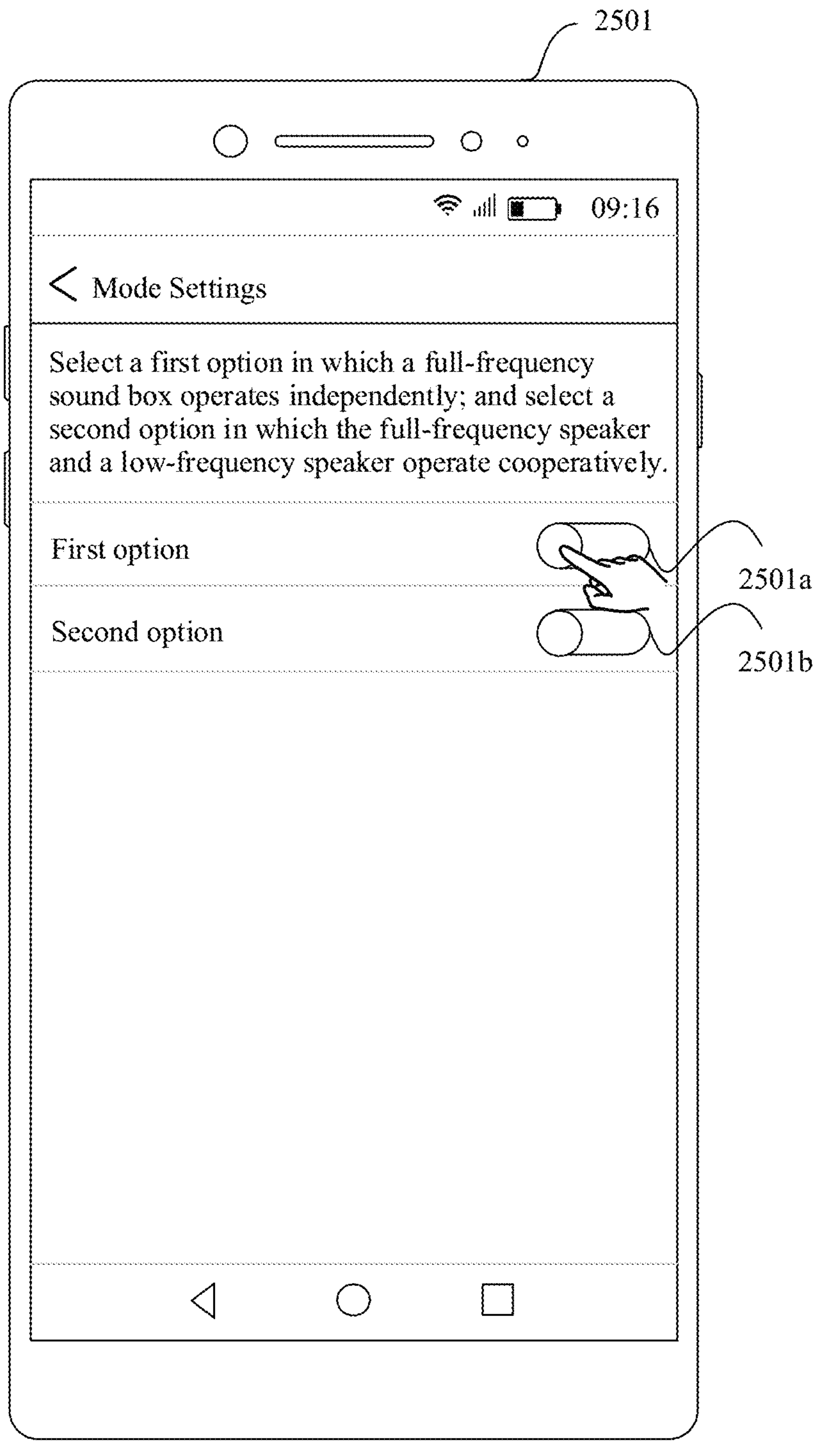
FIG. 25(*a*) and FIG. 25(*b*) are a schematic diagrams of displaying effect in an audio data processing method according to an embodiment of this application.
Figure 25B:
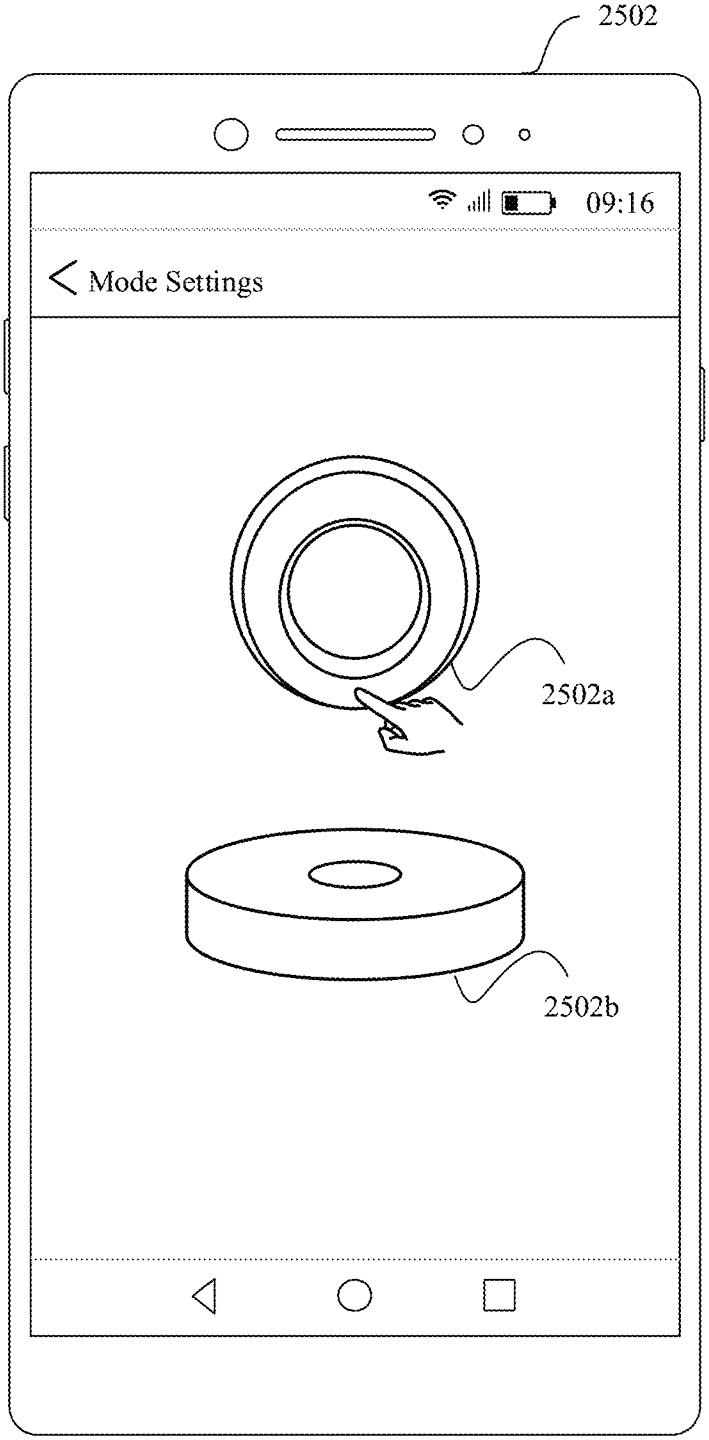

For example, the first interface is an interface 2501 shown in FIG. 25(*a*). The first interface 2501 includes the first option 2501*a* and a second option 2501*b*. The first option 2501*a* corresponds to that the full-frequency sound box operates independently. The second option 2501*b* corresponds to that the full-frequency sound box and the low-frequency sound box operate cooperatively. The user may select a corresponding option in the interface 2501 based on an actual requirement. For example, the user taps the first option 2501*a*; in this case, the full-frequency sound box may be controlled to operate independently.

For another example, the first interface is an interface 2502 shown in FIG. 25(*b*). The first interface 2502 includes a full-frequency sound box icon 2502*a* and a low-frequency sound box icon 2502*b*. For example, the user taps the full-frequency sound box icon 2501*a*; in this case, the full-frequency sound box can be controlled to operate independently.

Operation 2402 may specifically include operation 2402*a*.

Operation 2402*a*: The terminal sends a first instruction to the sound box system in response to the first operation, where the first instruction is used to control the full-frequency sound box to operate independently.

Specifically, when the full-frequency sound box in the sound box system is connected to the low-frequency sound box (the first fastening part is connected to the second fastening part, and the first communication part is connected to the second communication part), the low-frequency sound box controls and manages the entire sound box system, that is, that the terminal sends a first instruction to the sound box system means sending the first instruction to the low-frequency sound box in the sound box system.

In some embodiments, in another embodiment, the terminal may also send the first instruction to the full-frequency sound box, to control the full-frequency sound box to operate independently.

It should be noted that when the terminal sends the first instruction to the low-frequency sound box, the low-frequency sound box and the full-frequency sound box of the sound box system perform operation A1 to operation A4.

Operation A1: The low-frequency sound box sends a control instruction to the full-frequency sound box, where the control instruction is used to instruct the full-frequency sound box to play the target audio data.

Operation A2: The full-frequency sound box receives the control instruction, and obtains to-be-played audio data.

The control instruction is further used to instruct the full-frequency sound box to perform multi-band filtering on the to-be-played audio data, and perform sound field extension processing on filtered to-be-played audio data.

In some embodiments, the full-frequency sound box may establish communication connection to the terminal after the full-frequency sound box receives the control instruction from the low-frequency sound box, so that the full-frequency sound box obtains the to-be-played audio data (which is raw audio data) from the terminal. Alternatively, the low-frequency sound box obtains the to-be-played audio data from the terminal, and sends the to-be-played audio data to the full-frequency sound box. Alternatively, the full-frequency sound box may obtain the to-be-played audio data from another device. This is not limited in this embodiment of this application.

Operation A3: The full-frequency sound box performs multi-band filtering on the obtained to-be-played audio data to obtain a medium-frequency component and/or a high-frequency component, and a low-frequency component of the to-be-played audio data.

Operation A4: The full-frequency sound box performs sound field extension processing on the medium-frequency component and/or the high-frequency component, and the low-frequency component of the to-be-played audio data, to obtain the target audio data.

For detailed descriptions of content of processing the to-be-played audio data by the full-frequency sound box in operation A2 to operation A4, refer to the related descriptions in the foregoing embodiment. Details are not described herein again.

In some embodiments, after processing the raw audio data, the full-frequency sound box obtains the target audio data (which specifically includes a medium-frequency component and/or a high-frequency component, and a low-frequency component of the target audio data). The target audio data may be played by the full-frequency sound box. It should be noted, in this case, the low-frequency sound box of the sound box system does not participate in processing and playing of audio data.

Operation 2403: The terminal receives a second operation.

Operation 2404: The terminal controls, in response to the second operation, the full-frequency sound box and the low-frequency sound box to operate cooperatively.

The second operation is a selection operation performed by the user on the second option in the first interface of the terminal, and the second option corresponds to that the full-frequency sound box and the low-frequency sound box operate cooperatively. That the full-frequency sound box and the low-frequency sound box operate cooperatively means: The full-frequency sound box plays the medium-frequency component and/or the high-frequency component of the target audio data, and the low-frequency sound box plays the low-frequency component of the target audio data.

In some embodiments, the second operation may be a touchscreen operation, a button-pressing operation, or the like. This is not specifically limited in this embodiment of the present invention. For example, the touchscreen operation is a pressing operation, a touch and hold operation, a slide operation, a tap operation, a floating operation (an operation performed by the user near a touchscreen), or the like performed by the user on the touchscreen of the terminal. The button-pressing operation corresponds to an operation, for example, a click operation, a double-click operation, a touch and hold operation, or a combined button-pressing operation performed by the user on a button, for example, a power button, a volume button, or a home button of the terminal.

Figure 26A:
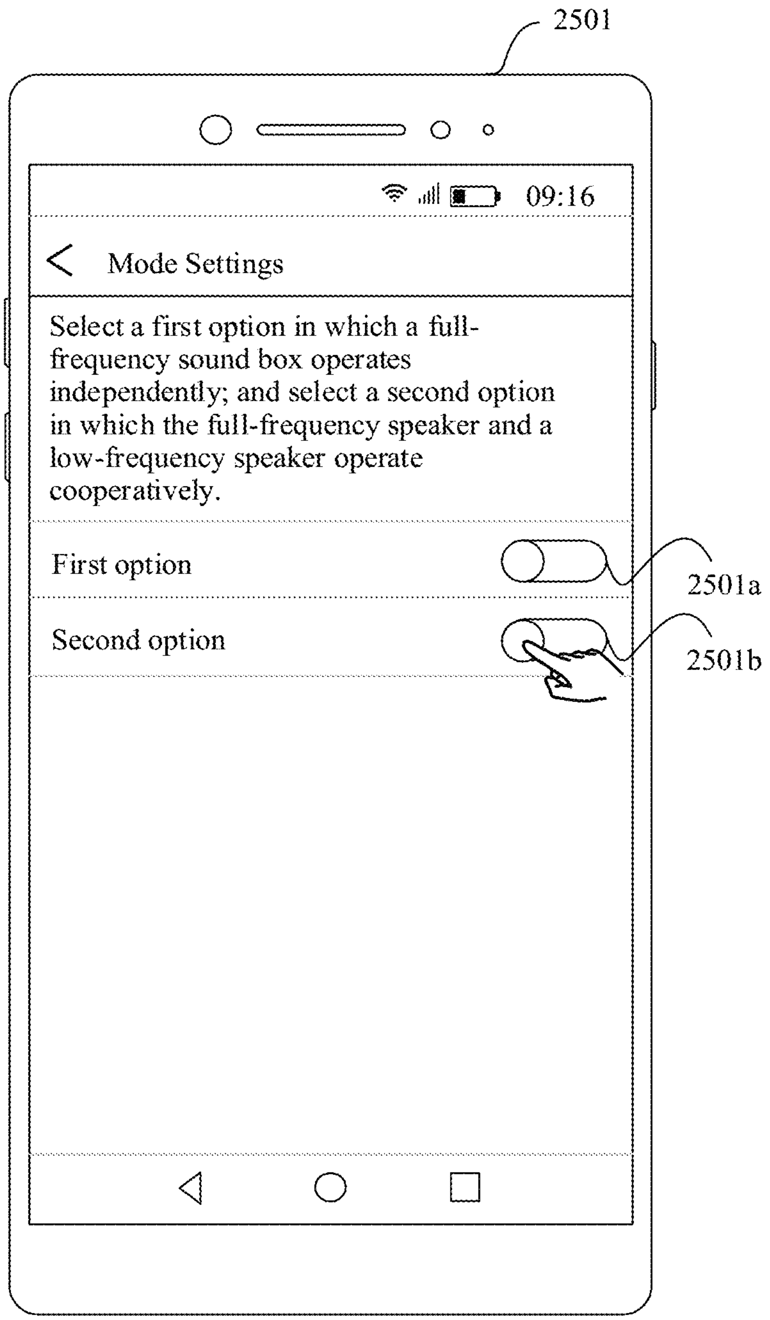
FIG. 26(*a*) and FIG. 26(*b*) are a schematic diagrams of displaying effect in an audio data processing method according to an embodiment of this application.
Figure 26B:
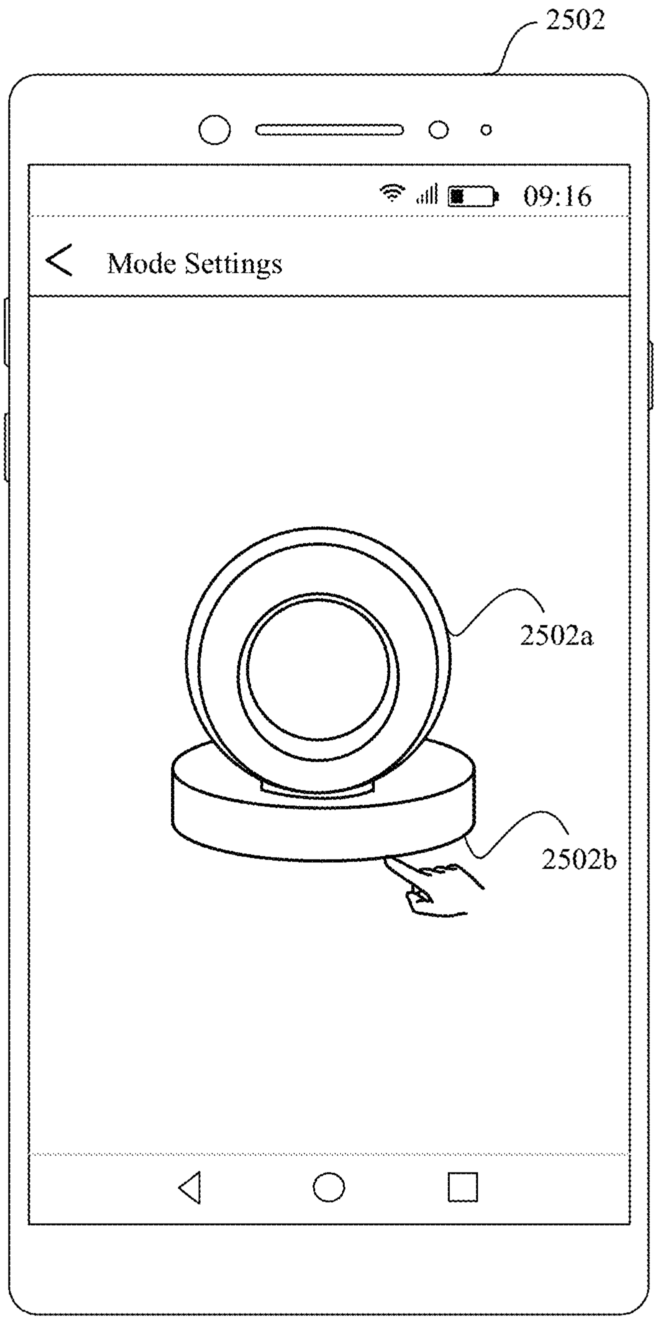

With reference to FIG. 25(*a*), as shown in FIG. 26(*a*), the second option 2501*b* corresponds to that the full-frequency sound box and the low-frequency sound box operate cooperatively, and the user may select a corresponding option in the interface 2501 based on an actual requirement. For example, the user taps the second option 2501*b*; in this case, the full-frequency sound box and the low-frequency sound box may be controlled to operate cooperatively.

With reference to FIG. 25(*b*), as shown in FIG. 26(*b*), the user may drag the low-frequency sound box icon 2502*b* to be below the full-frequency sound box icon 2501*a*, so that the full-frequency sound box and the low-frequency sound box achieve stack effect. In this way, the full-frequency sound box and the low-frequency sound box can be controlled to operate cooperatively.

Operation 2404 may specifically include operation 2404*a*.

Operation 2404*a*: The terminal sends a second instruction to the sound box system in response to the second operation, where the second instruction is used to control the full-frequency sound box system and the low-frequency sound box system to operate.

Specifically, the terminal sends the second instruction to the low-frequency sound box.

It should be noted that when the terminal sends the second instruction to the low-frequency sound box, the low-frequency sound box performs operation B1 to operation B3.

Operation B1: The low-frequency sound box performs multi-band filtering on the obtained to-be-played audio data, to obtain the medium-frequency component and/or the high-frequency component, and the low-frequency component of the to-be-played audio data.

In some embodiments, after the low-frequency sound box receives the second instruction, the low-frequency sound box may obtain the to-be-played audio data (which is raw audio data) from the terminal, or the low-frequency sound box may obtain the to-be-played audio data from another device. This is not limited in this embodiment of this application.

Operation B2: The low-frequency sound box performs sound field extension processing on the medium-frequency component and/or the high-frequency component, and the low-frequency component of the to-be-played audio data, to obtain the target audio data.

Operation B3: The low-frequency sound box sends a medium-frequency component and/or a high-frequency component of the target audio data to the full-frequency sound box.

It should be understood that, in this case, the medium-frequency component and/or the high-frequency component of the target audio data are or is played by the full-frequency sound box, and a low-frequency component of the target audio data is played by the low-frequency sound box.

For detailed descriptions of content of processing the to-be-played audio data by the low-frequency sound box in operation B1 to operation B3, refer to related descriptions in the foregoing embodiment. Details are not described herein again.

It should be noted that in the foregoing operation 2401 to operation 2404, the terminal chooses to perform operation 2401 and operation 2402 or perform operation 2403 and operation 2404 based on a specific operation of the user.

In some embodiments, when the full-frequency sound box and the low-frequency sound box in the sound box system operate cooperatively, the audio data processing method provided in this embodiment of this application further includes the following operation C1 to operation C4.

Operation C1: The terminal receives a third operation of the user; and controls, in response to the third operation, a camera or a microphone of the low-frequency sound box to start.

Specifically, the terminal may send the third instruction to the low-frequency sound box in response to the third operation. The third instruction is used to instruct to start the camera or the microphone of the low-frequency sound box.

Operation C2: The low-frequency sound box starts the camera or the microphone.

Operation C3: The low-frequency sound box captures, by using the camera, image information of a listener; or captures, by using the microphone, a sound signal of a listener.

The image information of the listener or the sound signal of the listener is used to perform sound field extension processing on the filtered to-be-played audio data.

Operation C4: The low-frequency sound box performs sound field extension processing on the filtered to-be-played audio data based on the image information or the sound signal of the listener.

Specifically, the low-frequency sound box analyzes the image information or the sound signal of the listener, to determine location information of the listener. The location information of the user includes an included angle between the user and the central axis of the sound box system. In addition, a difference between phases (that is, the foregoing phase difference θ) for playing a signal by two speakers constituting a pair of acoustic dipoles is adjusted based on the location information of the listener. The phase difference is a configuration parameter for high-band dipole processing and/or medium-band dipole processing.

In this embodiment of this application, to improve listening experience of the user, a configuration parameter (that is, the configuration parameter is the difference between the phases for playing the signal by the two speakers that constitute the pair of acoustic dipoles) in a high-band dipole algorithm or a medium-band dipole algorithm may be adjusted in a process of performing sound field extension on the audio data. In this way, binaural crosstalk cancellation effect is improved, so that the user achieves good listening experience at a current location. Specifically, because the phase difference is related to the current location of the user, the phase difference is adjusted by performing the foregoing operation A to operation C. In this way, sound field extension processing is performed on audio data by using an adjusted phase difference, to eliminate binaural crosstalk. In this way, sound field extension is performed at the current location of the user, and listening experience of the user is improved in real time.

In some embodiments, when the sound box system includes a plurality of full-frequency sound boxes, the plurality of full-frequency sound boxes are separately connected to the low-frequency sound box, and the plurality of full-frequency sound boxes may operate cooperatively.

In a cooperative operating mode, after the low-frequency sound box performs sound field extension processing on the to-be-played audio data to obtain the target audio data, the low-frequency sound box sends the high-frequency component and the medium-frequency component of the target audio data to each of the plurality of full-frequency sound boxes, and plays the high-frequency component and the medium-frequency component of the target audio data by using corresponding speakers of the plurality of full-frequency sound boxes.

In some embodiments, there are a plurality of modes in which the plurality of full-frequency sound boxes operate cooperatively. For example, a correspondence between each speaker of each full-frequency sound box and a corresponding frequency band of audio data is a case shown in Table 1. Alternatively, a part of speakers of the full-frequency sound box play the high-frequency component, and another part of speakers play the medium-frequency component. Specifically, a cooperative operating mode may be set based on an actual use requirement. This is not limited in this embodiment of this application.

In another cooperative operating mode, a plurality of full-frequency sound boxes separately obtain to-be-played audio data, and perform sound field extension processing on the to-be-played audio data to obtain target audio data, and then the plurality of full-frequency sound boxes separately play the target audio data. Similarly, there may be a plurality of modes in which the plurality of full-frequency sound boxes operate cooperatively. For example, different full-frequency sound boxes process audio data of different channels. Specifically, a cooperative operating mode may be set based on an actual use requirement. This is not limited in this embodiment of this application.

In some embodiments, when the sound box system includes a plurality of sound box subsystems (For descriptions of the speaker subsystem, refer to the foregoing embodiment), the plurality of full-frequency sound box subsystems can operate cooperatively. For example, a low-frequency sound box in each sound box subsystem performs sound field extension processing on to-be-played audio data to obtain target audio data, plays a low-frequency component of the target audio data, and separately sends a medium-frequency component and/or a high-frequency component of the target audio data to a corresponding full-frequency sound box. The full-frequency sound box plays the medium-frequency component and/or the high-frequency component. There may be a plurality of modes in which the plurality of sound box subsystems operate cooperatively. For example, different sound box subsystems process audio data of different channels. Specifically, a cooperative operating mode may be set based on an actual use requirement. This is not limited in this embodiment of this application.

According to the audio data processing method provided in this embodiment of this application, the user performs a corresponding operation on the terminal. In this case, in response to the operation of the user, the terminal controls the full-frequency sound box in the sound box system to operate independently, or controls the full-frequency sound box and the low-frequency sound box to operate cooperatively. This can improve user experience.

Figure 27:
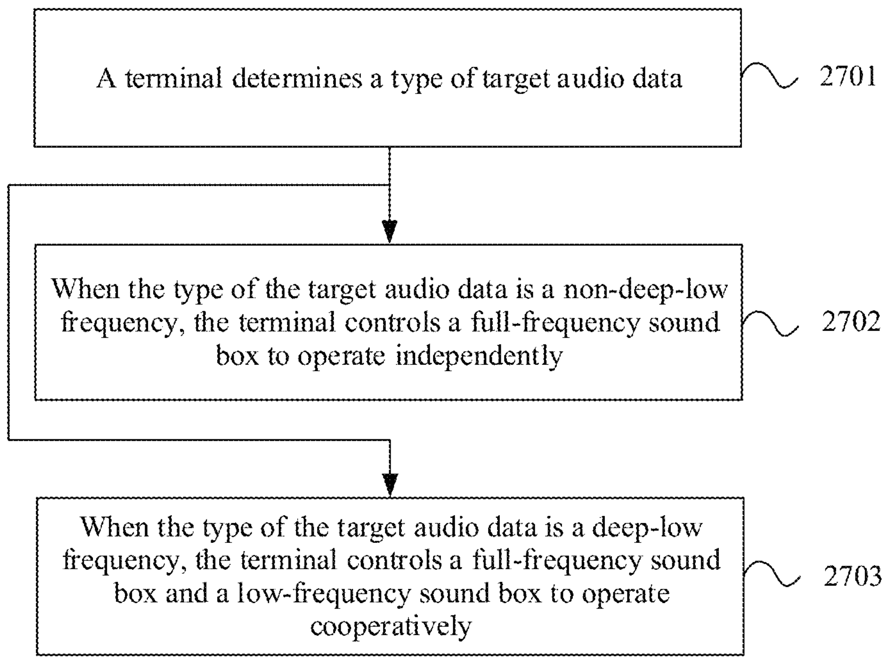
FIG. 27 is a schematic diagram of an audio data processing method according to an embodiment of this application.

In still another embodiment, an embodiment of this application provides an audio data processing method. The method is applied to a scenario in which a terminal establishes communication connection to a sound box system. The sound box system includes a full-frequency sound box and a low-frequency sound box. A first communication part of the full-frequency sound box is connected to a second communication part of the low-frequency sound box. The full-frequency sound box includes a first fastening part, the first communication part is disposed on the first fastening part, the low-frequency sound box includes a second fastening part, the second communication part is disposed on the second fastening part, and the full-frequency sound box is physically connected to or detached from the low-frequency sound box by using the first fastening part and the second fastening part. The full-frequency sound box and the low-frequency sound box are enabled to communicate with each other by using the first communication part and the second communication part. The first communication part and the second communication part support multi-channel audio data transmission. As shown in FIG. 27, the method includes operation 2701 to operation 2703.

Operation 2701: The terminal determines a type of target audio data.

The type of the target audio data includes a deep-low frequency or a non-deep-low frequency. The deep-low frequency is a frequency less than 200 Hz. For example, music of musical instruments such as a bass, a cello, a low-frequency violin, and a bass drum or the bass part each belongs to the deep-low frequency.

Operation 2702: When the type of the target audio data is the non-deep-low frequency, the terminal controls the full-frequency sound box to operate independently.

That the full-frequency sound box operates independently means that the full-frequency sound box plays the target audio data.

Similarly, the terminal sends a first instruction to the sound box system (to be specific, a low-frequency sound box), to control the full-frequency sound box to operate independently. The first instruction is used to control the full-frequency sound box to operate independently. The low-frequency sound box and the full-frequency sound box of the sound box system perform the foregoing operation A1 to operation A4 when the terminal sends the first instruction to the low-frequency sound box. For details, refer to descriptions in the foregoing embodiments. Details are not described herein again.

Operation 2703: When the type of the target audio data is the deep-low frequency, the terminal controls the full-frequency sound box and the low-frequency sound box to operate cooperatively.

That the full-frequency sound box and the low-frequency sound box operate cooperatively means: The full-frequency sound box plays a medium-frequency component and/or a high-frequency component of the target audio data, and the low-frequency sound box plays a low-frequency component of the target audio data.

Similarly, the terminal sends a second instruction to the sound box system (to be specific, a low-frequency sound box), to control the full-frequency sound box and the low-frequency sound box to operate cooperatively. The second instruction is used to control the full-frequency sound box and the low-frequency sound box system to operate. The low-frequency sound box of the sound box system performs the foregoing operation B1 to operation B3 when the terminal sends the second instruction to the low-frequency sound box. For details, refer to descriptions in the foregoing embodiments. Details are not described herein again.

Figure 28:
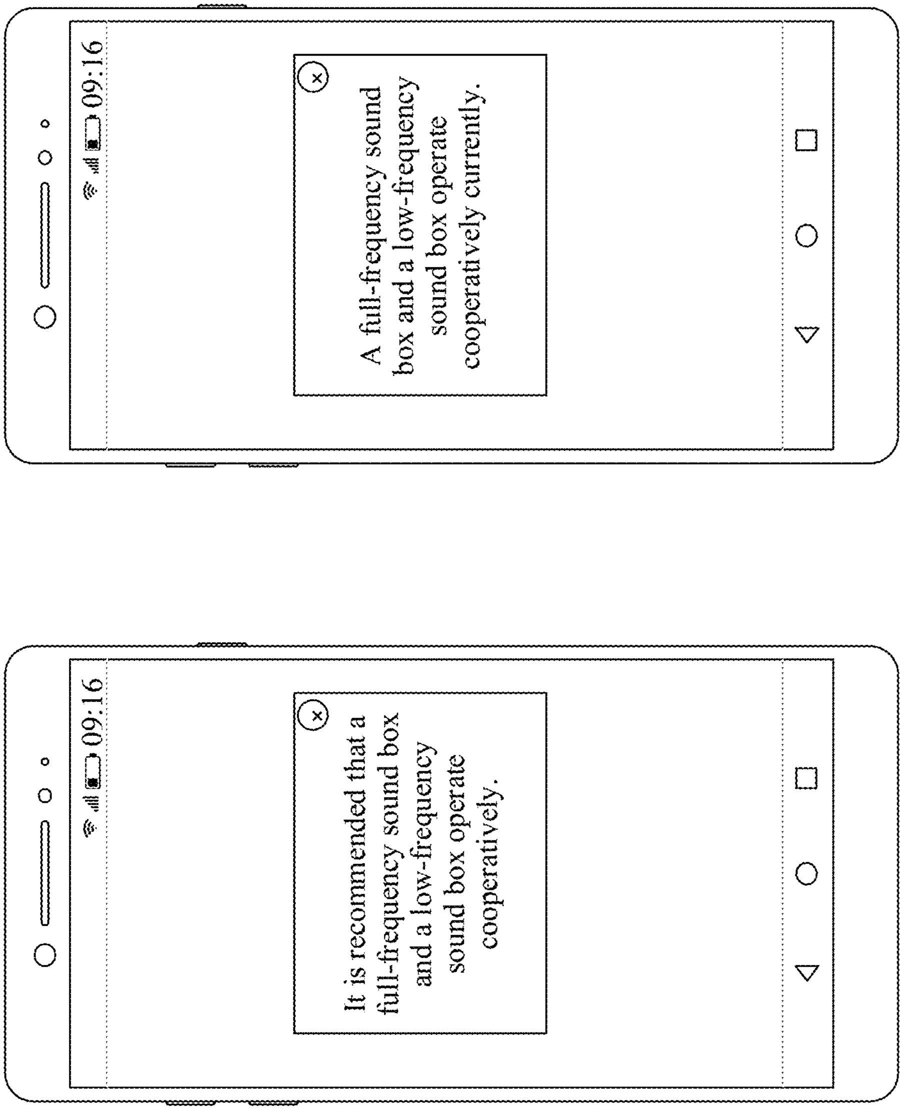
FIG. 28 is a schematic diagram of displaying effect in an audio data processing method according to an embodiment of this application.

In this embodiment of this application, when the full-frequency sound box operates independently, if the terminal determines that audio data to be played currently is deep-low-frequency audio data, the audio data processing method provided in this embodiment of this application further includes: The terminal displays first prompt information. The first prompt information is used to prompt that the full-frequency sound box and the low-frequency sound box operate cooperatively. For example, when the terminal determines that the audio data to be played currently is deep-low-frequency audio data, the terminal displays the first prompt information. In this case, the user performs a corresponding operation on the terminal according to the first prompt information to switch an operating mode of the sound box system to a mode in which the full-frequency sound box and the low-frequency sound box operate cooperatively. For example, (a) in FIG. 28 is a schematic diagram of displaying effect of the first prompt information. Alternatively, when the terminal determines that the to-be-played audio data is deep-low-frequency audio data, the terminal automatically switches an operating mode of the sound box system, and then displays the first prompt information on a display of the terminal to notify the user that the operating mode of the sound box system has been switched to a mode in which the full-frequency sound box and the low-frequency sound box operate cooperatively. For example, (b) in FIG. 28 is a schematic diagram of displaying effect of the first prompt information.

Figure 29:
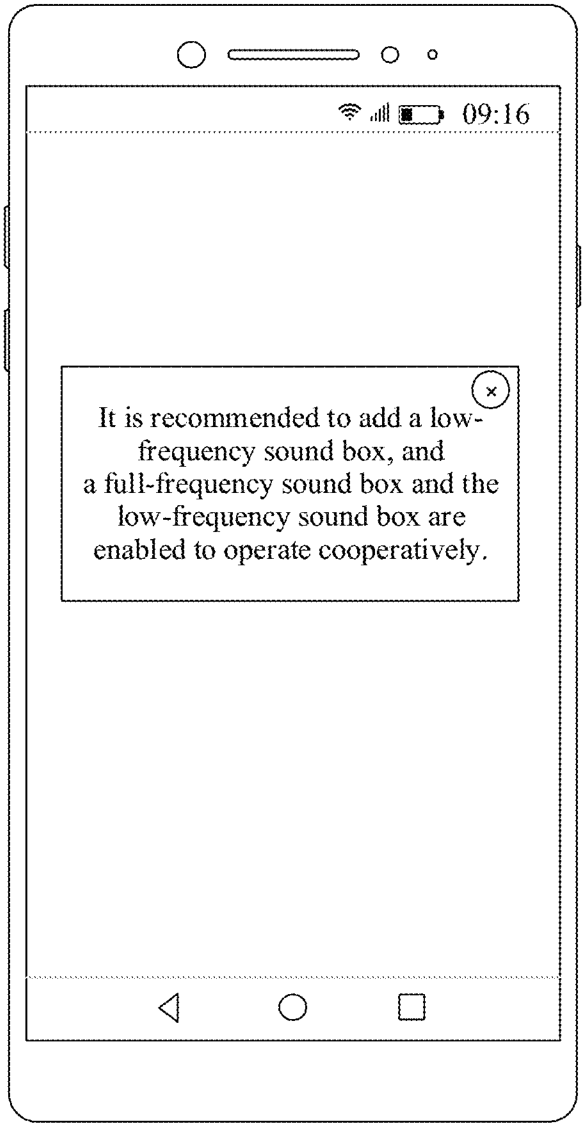
FIG. 29 is a schematic diagram of displaying effect in an audio data processing method according to an embodiment of this application.

It should be noted that when the full-frequency sound box is not connected to the low-frequency sound box, the terminal determines that audio data to be played currently is deep-low-frequency audio data. In this case, the terminal may display second prompt information on a display of the terminal. The second prompt information is used to prompt the user to add the low-frequency sound box to the full-frequency sound box, that is, prompt the user to physically connect the full-frequency sound box to the low-frequency sound box, so that the full-frequency sound box and the low-frequency sound box operate cooperatively: The low-frequency sound box processes the audio data, the low-frequency sound box plays a low-frequency component of processed audio data, and the full-frequency sound box plays a medium-frequency component and/or a high-frequency component of the processed audio data. For example, FIG. 29 is a schematic diagram of displaying effect of the second prompt information.

In some embodiments, the terminal may present the first prompt information or the second prompt information in a manner of a fixed bar, a floating window, or a bubble. This is not limited in this embodiment of this application.

In some embodiments, the terminal may further display at least one type of the following information: a quantity of channels of audio data currently played by the sound box system, a rendering mode of audio data, or information about a correspondence between a channel of audio data and a speaker of the full-frequency sound box.

In this embodiment of this application, the rendering mode of the audio data includes a 2D mode or a 3D mode. The terminal displays the foregoing information in a process in which the terminal establishes communication connection to the full-frequency sound box and the terminal interacts with the full-frequency sound box to play audio data. In this way, the user can learn of some detailed statuses of the currently played audio data, to improve subjective experience of the user.

In some embodiments, when the sound box system includes a plurality of full-frequency sound boxes, the audio data processing method provided in this embodiment of this application further includes: The terminal determines a correspondence between a channel of the audio data and a plurality of full-frequency sound boxes based on location information of the plurality of full-frequency sound boxes, and displays information about the correspondence between the channel of the audio data and the plurality of full-frequency sound boxes.

Figure 30:
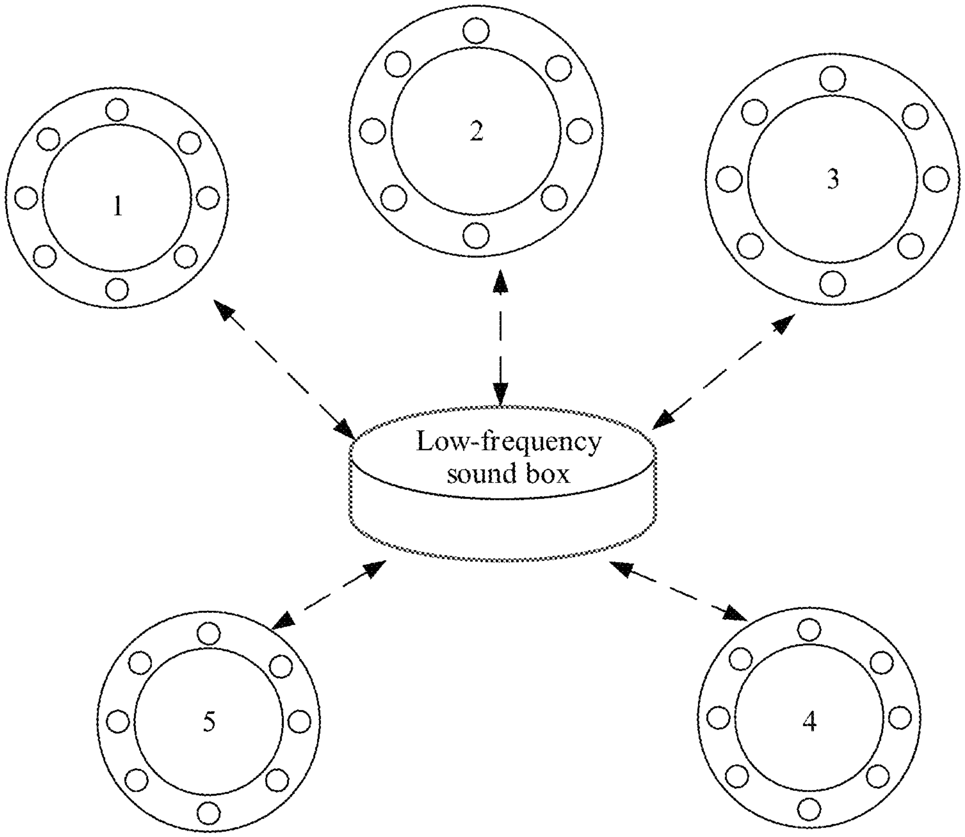
FIG. 30 is a schematic diagram of networking of a sound box system according to an embodiment of this application.

For example, when the sound box system includes five full-frequency sound boxes, channels of audio data corresponding to the five full-frequency sound boxes are allocated based on locations of the five full-frequency sound boxes. For example, as shown in FIG. 30, channels corresponding to a full-frequency sound box 1 to a full-frequency sound box 5 are: a left channel, a center channel, a right channel, a right surround channel, and a left surround channel. In some embodiments, the correspondence between the channel of the audio data and the plurality of full-frequency sound boxes may be set based on an actual requirement. This is not limited in this embodiment of this application.

Based on the sound box system provided in this embodiment of this application, an audio data processing method is provided. The terminal controls the full-frequency sound box to operate independently, or controls the full-frequency sound box and the low-frequency sound box to operate cooperatively, to achieve good sound field extension effect. In addition, when the full-frequency sound box operates independently, playing the medium-frequency component and/or the high-frequency component of the target audio data by using the full-frequency sound box can improve sound quality because the full-frequency sound box has good playing effects on a medium frequency and a high frequency. When the full-frequency sound box and the low-frequency sound box system operate, playing the low-frequency component of the target audio data by using the low-frequency sound box can improve bass quality of the audio data because low-frequency playing effect of the low-frequency sound box is superior to low-frequency playing effect of the full-frequency sound box. In addition, playing the medium-frequency component and/or the high-frequency component of the target audio data by using the full-frequency sound box can improve playing effects of the medium-frequency component and/or the high-frequency component of the target audio data because the full-frequency sound box has good playing effects on the medium frequency and the high frequency. In this way, playing effect of the audio data can be improved in a full frequency band of the audio data.

Figure 31:
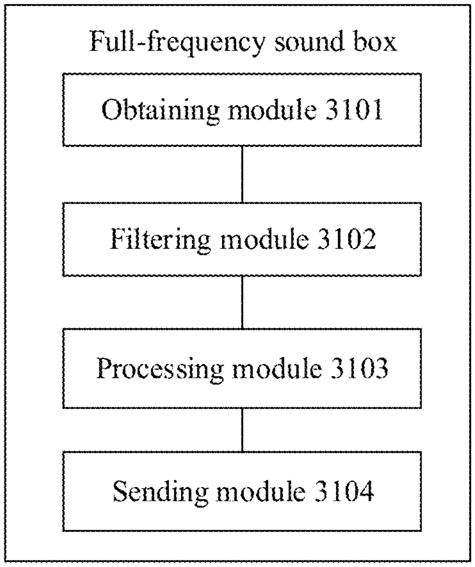
FIG. 31 is a schematic diagram of a structure of a full-frequency sound box according to an embodiment of this application.

Correspondingly, an embodiment of this application provides a full-frequency sound box. As shown in FIG. 31, the full-frequency sound box includes an obtaining module 3101, a filtering module 3102, and a processing module 3103. The obtaining module 3101 is configured to obtain to-be-played audio data. For example, the obtaining module 3101 is configured to perform operation 1701 in the foregoing method embodiment. The filtering module 3102 is configured to perform multi-band filtering on the to-be-played audio data obtained by the obtaining module 3101, to obtain a medium-frequency component and/or a high-frequency component, and a low-frequency component of the to-be-played audio data. For example, the filtering module 3102 is configured to perform operation 1702 in the foregoing method embodiment. The processing module 3103 is configured to perform sound field extension processing on the medium-frequency component and/or the high-frequency component, and the low-frequency component of the to-be-played audio data, to obtain target audio data. For example, the processing module 3103 is configured to perform operation 1703 (including operation 1703*a* and operation 1703*b*) in the foregoing method embodiment.

In some embodiments, the full-frequency sound box further includes a sending module 3104. The sending module 3104 is configured to send the low-frequency component of the target audio data to the low-frequency sound box. For example, the sending module 3104 is configured to perform operation 1704 in the foregoing method embodiment.

Each of the foregoing modules may further perform other related actions in the foregoing method embodiments. For details, refer to descriptions in the foregoing embodiments. Details are not described herein again.

Similarly, the apparatus embodiment described in FIG. 31 is merely an example. For example, division into the units (or modules) is merely logical function division and may be other division in actual embodiment. For example, a plurality of units or components may be combined or integrated into another system, or some features may be ignored or not performed. Functional units in embodiments of this application may be integrated into one module, each of the modules may exist independently physically, or two or more units are integrated into one module. The foregoing modules in FIG. 31 may be implemented in a form of hardware, or may be implemented in a form of a software functional unit. For example, when being implemented by using software, the filtering module 3102 and the processing module 3103 may be implemented by software functional modules generated after the processor of the full-frequency sound box reads program code stored in the memory. The foregoing modules may alternatively be implemented by different hardware of the full-frequency sound box. For example, the filtering module 3102 is implemented by a part of processing resources in the processor (for example, one or two cores in a multi-core processor) of the full-frequency sound box, while the processing module 3103 is implemented by using a remaining part of processing resources in the processor (for example, another core in the multi-core processor) of the full-frequency sound box, or by using a programmable device such as a field-programmable gate array (FPGA) or a coprocessor. The sending module 3104 is implemented by a network interface or the like of the full-frequency sound box. It is clear that the foregoing functional modules may alternatively be implemented by a combination of software and hardware. For example, the filtering module 3102 is implemented by a hardware programmable device, and the processing module 3103 is a software functional module generated after a central processing unit (CPU) reads program code stored in the memory.

For more details about implementing the foregoing functions by the obtaining module 3101, the filtering module 3102, the processing module 3103, and the sending module 3104, refer to descriptions in the foregoing method embodiments. Details are not repeated herein.

Embodiments in this specification are all described in a progressive manner. For same or similar parts in embodiments, refer to these embodiments. Each embodiment focuses on a difference from other embodiments.

Figure 32:
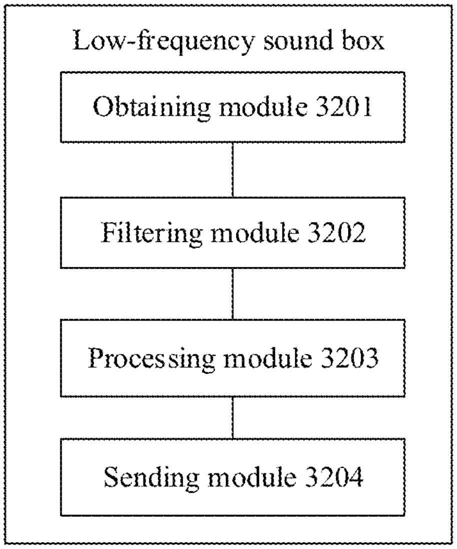
FIG. 32 is a schematic diagram of a structure of a low-frequency sound box according to an embodiment of this application.

An embodiment of this application provides a low-frequency sound box. As shown in FIG. 32, the low-frequency sound box includes an obtaining module 3201, a filtering module 3202, a processing module 3203, and a sending module 3204. The obtaining module 3201 is configured to obtain to-be-played audio data. For example, the obtaining module 3201 is configured to perform operation 1901 in the foregoing method embodiment. The filtering module 3202 is configured to perform multi-band filtering on the to-be-played audio data obtained by the obtaining module 3101, to obtain a medium-frequency component and/or a high-frequency component, and a low-frequency component of the to-be-played audio data. For example, the filtering module 3202 is configured to perform operation 1902 in the foregoing method embodiment. The processing module 3203 is configured to perform sound field extension processing on the medium-frequency component and/or the high-frequency component, and the low-frequency component of the to-be-played audio data, to obtain target audio data. For example, the processing module 3203 is configured to perform operation 1903 in the foregoing method embodiment. The sending module 3204 is configured to send the medium-frequency component and/or the high-frequency component of the target audio data to the full-frequency sound box. For example, the sending module 3204 is configured to perform operation 1904 in the foregoing method embodiment.

In some embodiments, the low-frequency sound box may further include another module, for example, an image capture module or an audio capture module. The image capture module is configured to capture image information of a listener. The audio capture module is configured to capture a sound signal of the listener.

Each of the foregoing modules may further perform other related actions in the foregoing method embodiments. For details, refer to descriptions in the foregoing embodiments. Details are not described herein again.

Similarly, the apparatus embodiment described in FIG. 32 is merely an example. For example, division into the units (or modules) is merely logical function division and may be other division in actual embodiment. For example, a plurality of units or components may be combined or integrated into another system, or some features may be ignored or not performed. Functional units in embodiments of this application may be integrated into one module, each of the modules may exist independently physically, or two or more units are integrated into one module. The foregoing modules in FIG. 32 may be implemented in a form of hardware, or may be implemented in a form of a software functional unit. For example, when being implemented by using software, the filtering module 3202 and the processing module 3203 may be implemented by software functional modules generated after the processor of the low-frequency sound box reads program code stored in the memory. The foregoing modules may alternatively be implemented by different hardware of the low-frequency sound box. For example, the filtering module 3202 is implemented by a part of processing resources in the processor (for example, one or two cores in a multi-core processor) of the low-frequency sound box, while the processing module 3203 is implemented by using a remaining part of processing resources in the processor (for example, another core in the multi-core processor) of the low-frequency sound box, or by using a programmable device such as a field-programmable gate array (FPGA) or a coprocessor. The sending module 3204 is implemented by a network interface or the like of the low-frequency sound box. It is clear that the foregoing functional modules may alternatively be implemented by a combination of software and hardware. For example, the filtering module 3202 is implemented by a hardware programmable device, and the processing module 3203 is a software functional module generated after a CPU reads program code stored in the memory.

For more details about implementing the foregoing functions by the obtaining module 3201, the filtering module 3202, the processing module 3203, and the sending module 3204, refer to descriptions in the foregoing method embodiments. Details are not repeated herein.

Embodiments in this specification are all described in a progressive manner. For same or similar parts in embodiments, refer to these embodiments. Each embodiment focuses on a difference from other embodiments.

Figure 33:
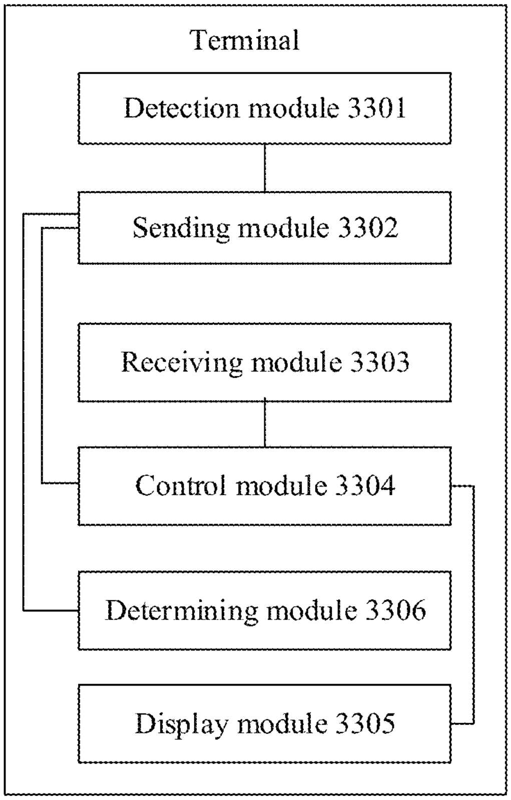
FIG. 33 is a schematic diagram of a structure of a terminal according to an embodiment of this application.

An embodiment of this application further provides a terminal. As shown in FIG. 33, the terminal includes a detection module 3301 and a sending module 3302. The detection module 3301 is configured to detect whether a first communication part of a full-frequency sound box is connected to a second communication part of a low-frequency sound box. For example, the detection module 3301 is configured to perform operation 1601 in the foregoing method embodiment. The sending module 3302 is configured to send to-be-played audio data to the full-frequency sound box when it is found, through detection, that the first communication part is not connected to the second communication part. For example, the sending module 3302 is configured to perform operation 1602 in the foregoing method embodiment. The sending module 3302 is further configured to: when it is found, through detection, that the first communication part is connected to the second communication part, send first audio data to the full-frequency sound box, and send second audio data to the low-frequency sound box, where for example, the sending module 3302 is configured to perform operation 1603*a* in the foregoing method embodiment, the first audio data is a medium-frequency component and/or a high-frequency component of to-be-played audio data, and the second audio data is a low-frequency component of the to-be-played audio data; send to-be-played audio data to the full-frequency sound box, where for example, the sending module 3302 is configured to perform operation 1603*b* in the foregoing method embodiment; or send to-be-played audio data to the low-frequency sound box, where for example, the sending module 3302 is configured to perform operation 1603*c* in the foregoing method embodiment.

The terminal provided in this embodiment of this application further includes a receiving module 3303 and a control module 3304. The receiving module is configured to receive a first operation or a second operation of a user. For example, the receiving module 3303 is configured to perform operation 2401 and operation 2403 in the foregoing method embodiment. The control module 3304 is further configured to: control, in response to the first operation, the full-frequency sound box to operate independently; or control the full-frequency sound box and the low-frequency sound box to operate cooperatively. For example, the control module 3304 is configured to perform operation 2402 or operation 2404 in the foregoing method embodiment.

Specifically, the control module 3304 is specifically configured to control the sending module 3302 to send a first instruction to a sound box system, for example, control the sending module 3302 to perform operation 2402*a* or operation 2404*a* in the foregoing method embodiment.

In some embodiments, the terminal provided in this embodiment of this application further includes a display module 3305. The display module 3305 is configured to display first prompt information. The first prompt information is used to prompt that the full-frequency sound box and the low-frequency sound box operate cooperatively. The display module 3305 may further display other content. For details, refer to related content in the foregoing method embodiment. It should be understood that the display module 3305 may display related content under control of the control module 3304.

The terminal provided in this embodiment of this application further includes a determining module 3306. The determining module 3306 is configured to determine a type of target audio data. The type of the target audio data includes a deep-low frequency or a non-deep-low frequency. For example, the determining module 3306 is configured to perform operation 2701 in the foregoing method embodiment. The control module 3304 is further configured to: when the type of the target audio data is the non-deep-low frequency, control the full-frequency sound box to operate independently; or when the type of the target audio data is deep-low frequency, control the full-frequency sound box and the low-frequency sound box to operate cooperatively. For example, the control module 3304 is configured to perform operation 2702 or operation 2403 in the foregoing method embodiment.

Each of the foregoing modules may further perform other related actions in the foregoing method embodiments. For details, refer to descriptions in the foregoing embodiments. Details are not described herein again.

Similarly, the apparatus embodiment described in FIG. 33 is merely an example. For example, division into the units (or modules) is merely logical function division and may be other division in actual embodiment. For example, a plurality of units or components may be combined or integrated into another system, or some features may be ignored or not performed. Functional units in embodiments of this application may be integrated into one module, each of the modules may exist independently physically, or two or more units are integrated into one module. The foregoing modules in FIG. 33 may be implemented in a form of hardware, or may be implemented in a form of a software functional unit. For example, when being implemented by software, the detection module 3301 and the determining module 3306 may be implemented by software functional modules generated after the processor of the terminal reads program code stored in the memory. The foregoing modules may alternatively be implemented by different hardware of the terminal. For example, the detection module 3301 is implemented by a part of processing resources in the processor (for example, one or two cores in a multi-core processor) of the terminal, while the determining module 3306 is implemented by using a remaining part of processing resources in the processor (for example, another core in the multi-core processor) of the terminal, or by using a programmable device such as a field-programmable gate array (FPGA) or a coprocessor. The sending module 3302 and the receiving module 3303 are implemented by a network interface or the like of the terminal. The display module 3305 is implemented by a display of the terminal. It is clear that the foregoing functional modules may alternatively be implemented by a combination of software and hardware. For example, the determining module 3306 is implemented by a hardware programmable device, and the detection module 3301 is a software functional module generated after a CPU reads the program code stored in the memory.

For more details about implementing the foregoing functions by the detection module 3301, the sending module 3302, the receiving module 3303, the control module 3304, the display module 3305, and the determining module 3306, refer to descriptions in the foregoing method embodiments. Details are not repeated herein.

Embodiments in this specification are all described in a progressive manner. For same or similar parts in embodiments, refer to these embodiments. Each embodiment focuses on a difference from other embodiments.

All or a part of the foregoing embodiments may be implemented by using software, hardware, firmware, or any combination thereof. When a software program is used to implement embodiments, all or a part of embodiments may be implemented in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

The foregoing descriptions about embodiments allow a person skilled in the art to understand that, for the purpose of convenient and brief description, division into the foregoing functional modules is taken as an example for illustration. In actual application, the foregoing functions can be allocated to different modules and implemented according to a requirement, that is, an inner structure of an apparatus is divided into different functional modules to implement all or a part of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Apart or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in a form of the software functional unit and sold or used as an independent product, the integrated unit may be stored in a computer-readable storage medium. Based on such an understanding, the technical solutions of this application essentially, or the part contributing to the prior art, or all or a part of the technical solutions may be implemented in a form of a software product. The computer software product is stored in a storage medium and includes several instructions for instructing a computer device (which may be a personal computer, a server, a network device, or the like) to perform all or a part of the operations of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely specific embodiments of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A sound box system, comprising:

a full-frequency sound box physically connected to a low-frequency sound box using a first fastening part and a second fastening part, and the full-frequency sound box communicates with the low-frequency sound box using a first communication part and a second communication part, wherein the first fastening part and the second fastening part are a group of paired connection parts, and the first communication part and the second communication part are a group of paired communication parts;

wherein the full-frequency sound box comprises a full-frequency sound box body and the first fastening part, wherein the full-frequency sound box body comprises M speakers, the M speakers are planarly distributed in the full-frequency sound box body, and the M speakers constitute K pairs of acoustic dipoles, wherein M is a positive integer greater than 2, and K is a positive integer greater than or equal to 2; and the first fastening part is disposed in a preset fastening region of the full-frequency sound box body, the first fastening part is configured to physically connect to or detach from the low-frequency sound box, the first fastening part comprising the first communication part, the first communication part is configured to enable the full-frequency sound box to communicate with the low-frequency sound box, and the first communication part supports multi-channel audio data transmission;

wherein the low-frequency sound box comprises a low-frequency sound box body and the second fastening part, wherein the low-frequency sound box body comprises one or more low-frequency speakers, the second fastening part is disposed in a preset fastening region of the low-frequency sound box body, and the second fastening part is configured to physically connect to or detach from the full-frequency sound box; and the second fastening part comprises the second communication part configured to enable the low-frequency sound box to communicate with the full-frequency sound box, and the second communication part supports multi-channel audio data transmission, wherein low-frequency playing effect of the low-frequency sound box is superior to low-frequency playing effect of the full-frequency sound box, and a frequency band range of the full-frequency sound box is greater than a frequency band range of the low-frequency sound box.

2. The sound box system according to claim 1, wherein the full-frequency sound box is configured to play target audio data, or play a high-frequency component and/or a medium-frequency component of the target audio data; and the low-frequency sound box is configured to play a low-frequency component of the target audio data.

3. The sound box system according to claim 2, wherein the full-frequency sound box is connected to the low-frequency sound box in a stacked mode or mounting mode using the first fastening part and the second fastening part.

4. The sound box system according to claim 3, wherein when the first fastening part is a first sheet part, the second fastening part is a second sheet part, and the first sheet part is in contact with and coupled to the second sheet part, the full-frequency sound box is connected to the low-frequency sound box in the stacked mode.

5. The sound box system according to claim 3, wherein when the first fastening part is a first sheet part that extends outward along one side of the full-frequency sound box body, the second fastening part is a second sheet part that extends outward along one side of the low-frequency sound box body, and the first sheet part is in contact with and coupled to the second sheet part, the full-frequency sound box is connected to the low-frequency sound box in the mounting mode.

6. The sound box system according to claim 4, wherein the first fastening part is connected to the second fastening part in a buckle coupling mode or a magnetic coupling mode.

7. The sound box system according to claim 3, wherein when the first fastening part is a concave part disposed in a preset fastening region of the full-frequency sound box body, the second fastening part is a convex part disposed in a preset fastening region of the low-frequency sound box body, and the concave part is in contact with and coupled to the convex part, the full-frequency sound box is connected to the low-frequency sound box in the stacked mode.

* * * * *